United States Patent
Venkataraman et al.

(10) Patent No.: US 9,800,856 B2
(45) Date of Patent: *Oct. 24, 2017

(54) SYSTEMS AND METHODS FOR SYNTHESIZING IMAGES FROM IMAGE DATA CAPTURED BY AN ARRAY CAMERA USING RESTRICTED DEPTH OF FIELD DEPTH MAPS IN WHICH DEPTH ESTIMATION PRECISION VARIES

(71) Applicant: FotoNation Cayman Limited, San Jose, CA (US)

(72) Inventors: Kartik Venkataraman, San Jose, CA (US); Semyon Nisenzon, Palo Alto, CA (US); Priyam Chatterjee, Sunnyvale, CA (US); Gabriel Molina, Sunnyvale, CA (US)

(73) Assignee: FotoNation Cayman Limited, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,529

(22) Filed: Dec. 12, 2016

(65) Prior Publication Data

US 2017/0094243 A1    Mar. 30, 2017

Related U.S. Application Data

(63) Continuation of application No. 14/207,254, filed on Mar. 12, 2014, now Pat. No. 9,519,972.
(Continued)

(51) Int. Cl.
*H04N 13/02* (2006.01)
*H04N 5/225* (2006.01)
(Continued)

(52) U.S. Cl.
CPC ........... *H04N 13/0007* (2013.01); *G06T 1/20* (2013.01); *H04N 13/0271* (2013.01); *H04N 2013/0081* (2013.01)

(58) Field of Classification Search
CPC ................... G06T 7/0065; G06T 15/20; G06T 2207/10012; G06T 2207/10052;
(Continued)

(56) References Cited

U.S. PATENT DOCUMENTS

| | | |
|---|---|---|
| 4,124,798 A | 11/1978 | Thompson |
| 4,198,646 A | 4/1980 | Alexander et al. |

(Continued)

FOREIGN PATENT DOCUMENTS

| | | |
|---|---|---|
| CN | 1669332 A | 9/2005 |
| CN | 1839394 A | 9/2006 |

(Continued)

OTHER PUBLICATIONS

US 8,957,977, 02/2015, Venkataraman et al. (withdrawn)
(Continued)

*Primary Examiner* — Lin Ye
*Assistant Examiner* — Euel Cowan
(74) *Attorney, Agent, or Firm* — KPPB LLP

(57) ABSTRACT

Systems and methods are described for generating restricted depth of field depth maps. In one embodiment, an image processing pipeline application configures a processor to: determine a desired focal plane distance and a range of distances corresponding to a restricted depth of field for an image rendered from a reference viewpoint; generate a restricted depth of field depth map from the reference viewpoint using the set of images captured from different viewpoints, where depth estimation precision is higher for pixels with depth estimates within the range of distances corresponding to the restricted depth of field and lower for
(Continued)

pixels with depth estimates outside of the range of distances corresponding to the restricted depth of field; and render a restricted depth of field image from the reference viewpoint using the set of images captured from different viewpoints and the restricted depth of field depth map.

20 Claims, 26 Drawing Sheets

Related U.S. Application Data

(60) Provisional application No. 61/780,974, filed on Mar. 13, 2013.

(51) Int. Cl.
 H04N 13/00 (2006.01)
 G06T 1/20 (2006.01)
(58) Field of Classification Search
 CPC ........... G02B 27/0075; H04N 13/0022; H04N 13/0232; H04N 13/0242; A01B 12/006
 USPC .................... 348/44, 47, 48, 218.1
 See application file for complete search history.

(56) References Cited

U.S. PATENT DOCUMENTS

| | | | |
|---|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,899,060 A | 2/1990 | Lischke |
| 5,005,083 A | 4/1991 | Grage |
| 5,070,414 A | 12/1991 | Tsutsumi |
| 5,144,448 A | 9/1992 | Hornbaker |
| 5,157,499 A | 10/1992 | Oguma et al. |
| 5,325,449 A | 6/1994 | Burt |
| 5,327,125 A | 7/1994 | Iwase et al. |
| 5,488,674 A | 1/1996 | Burt |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,911,008 A | 6/1999 | Hamada et al. |
| 5,933,190 A | 8/1999 | Dierickx et al. |
| 5,973,844 A | 10/1999 | Burger et al. |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,340,994 B1 | 1/2002 | Margulis et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev |
| 6,795,253 B2 | 9/2004 | Shinohara |
| 6,819,328 B1 | 11/2004 | Moriwaki et al. |
| 6,819,358 B1 | 11/2004 | Kagle et al. |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,235,785 B2 | 6/2007 | Hornback et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,496,293 B2 | 2/2009 | Shamir et al. |
| 7,564,019 B2 | 7/2009 | Olsen |
| 7,606,484 B1 | 10/2009 | Richards et al. |
| 7,620,265 B1 | 11/2009 | Wolff |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,738,013 B2 | 6/2010 | Galambos et al. |
| 7,741,620 B2 | 6/2010 | Doering et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,965,314 B1 | 6/2011 | Miller et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,149,323 B2 | 4/2012 | Li |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,194,296 B2 | 6/2012 | Compton |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |

(56) References Cited

U.S. PATENT DOCUMENTS

| | | |
|---|---|---|
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,411,146 B2 | 4/2013 | Twede |
| 8,446,492 B2 | 5/2013 | Nakano et al. |
| 8,456,517 B2 | 6/2013 | Mor et al. |
| 8,493,496 B2 | 7/2013 | Freedman et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,565,547 B2 | 10/2013 | Strandemar |
| 8,576,302 B2 | 11/2013 | Yoshikawa |
| 8,577,183 B2 | 11/2013 | Robinson |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,687,087 B2 | 4/2014 | Pertsel et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,885,922 B2 | 11/2014 | Kobayashi et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 8,977,038 B2 | 3/2015 | Tian et al. |
| 9,001,226 B1 | 4/2015 | Ng et al. |
| 9,019,426 B2 | 4/2015 | Han et al. |
| 9,025,894 B2 | 5/2015 | Venkataraman |
| 9,025,895 B2 | 5/2015 | Venkataraman |
| 9,030,528 B2 | 5/2015 | Pesach et al. |
| 9,031,335 B2 | 5/2015 | Venkataraman |
| 9,031,342 B2 | 5/2015 | Venkataraman |
| 9,031,343 B2 | 5/2015 | Venkataraman |
| 9,036,928 B2 | 5/2015 | Venkataraman |
| 9,036,931 B2 | 5/2015 | Venkataraman |
| 9,041,823 B2 | 5/2015 | Venkataraman |
| 9,041,824 B2 | 5/2015 | Lelescu et al. |
| 9,041,829 B2 | 5/2015 | Venkataraman et al. |
| 9,042,667 B2 | 5/2015 | Venkataraman |
| 9,049,367 B2 | 6/2015 | Venkataraman et al. |
| 9,055,233 B2 | 6/2015 | Venkataraman et al. |
| 9,060,124 B2 | 6/2015 | Venkataraman et al. |
| 9,077,893 B2 | 7/2015 | Venkataraman et al. |
| 9,094,661 B2 | 7/2015 | Venkataraman et al. |
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,143,711 B2 | 9/2015 | McMahon |
| 9,147,254 B2 | 9/2015 | Ciurea et al. |
| 9,185,276 B2 | 11/2015 | Roda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,412,206 B2 | 8/2016 | McMahon et al. |
| 9,413,953 B2 | 8/2016 | Maeda |
| 9,426,343 B2 | 8/2016 | Rodda et al. |
| 9,426,361 B2 | 8/2016 | Venkataraman et al. |
| 9,445,003 B1 | 9/2016 | Lelescu et al. |
| 9,456,196 B2 | 9/2016 | Kim et al. |
| 9,462,164 B2 | 10/2016 | Venkataraman et al. |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 * | 12/2016 | Venkataraman ...... G06T 7/0065 |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono et al. |
| 2002/0039438 A1 | 4/2002 | Mori et al. |
| 2002/0057845 A1 | 5/2002 | Fossum |
| 2002/0063807 A1 | 5/2002 | Margulis |
| 2002/0075450 A1 | 6/2002 | Aratani |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0120634 A1 | 8/2002 | Min et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0195548 A1 | 12/2002 | Dowski, Jr. et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng et al. |
| 2003/0211405 A1 | 11/2003 | Venkataraman |
| 2004/0003409 A1 | 1/2004 | Berstis et al. |
| 2004/0008271 A1 | 1/2004 | Hagimori et al. |
| 2004/0012689 A1 | 1/2004 | Tinnerino |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0096119 A1 | 5/2004 | Williams |

(56) References Cited

U.S. PATENT DOCUMENTS

| | | |
|---|---|---|
| 2004/0100570 A1 | 5/2004 | Shizukuishi |
| 2004/0105021 A1 | 6/2004 | Hu et al. |
| 2004/0114807 A1 | 6/2004 | Lelescu et al. |
| 2004/0141659 A1 | 7/2004 | Zhang et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038891 A1 | 2/2006 | Okutomi et al. |
| 2006/0039611 A1 | 2/2006 | Rother |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210186 A1 | 9/2006 | Berkner |
| 2006/0214085 A1 | 9/2006 | Olsen et al. |
| 2006/0221250 A1 | 10/2006 | Rossbach et al. |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen |
| 2007/0008575 A1 | 1/2007 | Yu et al. |
| 2007/0009150 A1 | 1/2007 | Suwa |
| 2007/0024614 A1 | 2/2007 | Tam |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0201859 A1 | 8/2007 | Sarrat et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer et al. |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2007/0297696 A1 | 12/2007 | Hamza |
| 2008/0006859 A1 | 1/2008 | Mionetto et al. |
| 2008/0019611 A1 | 1/2008 | Larkin |
| 2008/0024683 A1 | 1/2008 | Damera-Venkata et al. |
| 2008/0025649 A1 | 1/2008 | Liu et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi et al. |
| 2008/0112059 A1 | 5/2008 | Choi et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |

(56) References Cited

U.S. PATENT DOCUMENTS

| | | |
|---|---|---|
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0211737 A1 | 9/2008 | Kim et al. |
| 2008/0218610 A1 | 9/2008 | Chapman et al. |
| 2008/0218612 A1 | 9/2008 | Border et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan |
| 2009/0128644 A1 | 5/2009 | Camp, Jr. et al. |
| 2009/0128833 A1 | 5/2009 | Yahav |
| 2009/0129667 A1 | 5/2009 | Ho |
| 2009/0140131 A1 | 6/2009 | Utagawa et al. |
| 2009/0147919 A1 | 6/2009 | Goto et al. |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0044815 A1 | 2/2010 | Chang et al. |
| 2010/0053342 A1 | 3/2010 | Hwang |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0128145 A1 | 5/2010 | Pitts et al. |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0220212 A1 | 9/2010 | Perlman et al. |
| 2010/0223237 A1 | 9/2010 | Mishra et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0281070 A1 | 11/2010 | Chan et al. |
| 2010/0289941 A1 | 11/2010 | Ito |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu et al. |
| 2010/0321640 A1 | 12/2010 | Yeh et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0033129 A1 | 2/2011 | Robinson |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0121421 A1 | 5/2011 | Charbon |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0206291 A1 | 8/2011 | Kashani et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228142 A1 | 9/2011 | Brueckner et al. |
| 2011/0228144 A1 | 9/2011 | Tian et al. |
| 2011/0234841 A1 | 9/2011 | Akeley et al. |

(56) References Cited

U.S. PATENT DOCUMENTS

| | | |
|---|---|---|
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung |
| 2011/0255745 A1 | 10/2011 | Hodder et al. |
| 2011/0261993 A1 | 10/2011 | Weiming et al. |
| 2011/0267348 A1 | 11/2011 | Lin |
| 2011/0273531 A1 | 11/2011 | Ito et al. |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim, II et al. |
| 2012/0012748 A1 | 1/2012 | Pain et al. |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0062697 A1 | 3/2012 | Treado et al. |
| 2012/0062702 A1 | 3/2012 | Jiang et al. |
| 2012/0062756 A1 | 3/2012 | Tian |
| 2012/0069235 A1 | 3/2012 | Imai |
| 2012/0081519 A1 | 4/2012 | Goma et al. |
| 2012/0105691 A1 | 5/2012 | Waqas et al. |
| 2012/0113318 A1 | 5/2012 | Galstian et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0188341 A1 | 7/2012 | Klein Gunnewiek et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0287291 A1 | 11/2012 | McMahon et al. |
| 2012/0293695 A1 | 11/2012 | Tanaka |
| 2012/0307093 A1* | 12/2012 | Miyoshi .......... G06T 5/50 348/218.1 |
| 2012/0307099 A1 | 12/2012 | Yahata et al. |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee et al. |
| 2013/0076967 A1 | 3/2013 | Brunner et al. |
| 2013/0077859 A1* | 3/2013 | Stauder .......... G06K 9/4671 382/162 |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0107061 A1 | 5/2013 | Kumar et al. |
| 2013/0113899 A1 | 5/2013 | Morohoshi et al. |
| 2013/0113939 A1 | 5/2013 | Strandemar |
| 2013/0120605 A1 | 5/2013 | Georgiev et al. |
| 2013/0121559 A1 | 5/2013 | Hu |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0176394 A1 | 7/2013 | Tian et al. |
| 2013/0208138 A1 | 8/2013 | Li |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0230237 A1 | 9/2013 | Schlosser et al. |
| 2013/0250123 A1 | 9/2013 | Zhang et al. |
| 2013/0250150 A1 | 9/2013 | Malone et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0002674 A1 | 1/2014 | Duparre et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0186045 A1 | 7/2014 | Poddar et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |

(56) References Cited

U.S. PATENT DOCUMENTS

| | | |
|---|---|---|
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0091900 A1 | 4/2015 | Yang et al. |
| 2015/0104101 A1 | 4/2015 | Bryant et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |
| 2015/0146029 A1 | 5/2015 | Venkataraman et al. |
| 2015/0146030 A1 | 5/2015 | Venkataraman et al. |
| 2015/0199841 A1 | 7/2015 | Venkataraman et al. |
| 2015/0243480 A1 | 8/2015 | Yamada et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0373261 A1 | 12/2015 | Rodda |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0195733 A1 | 7/2016 | Lelescu et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0316140 A1 | 10/2016 | Nayar et al. |

FOREIGN PATENT DOCUMENTS

| | | |
|---|---|---|
| CN | 101010619 A | 8/2007 |
| CN | 101064780 A | 10/2007 |
| CN | 101102388 A | 1/2008 |
| CN | 101147392 A | 3/2008 |
| CN | 101427372 A | 5/2009 |
| CN | 101606086 A | 12/2009 |
| CN | 101883291 A | 11/2010 |
| CN | 102037717 A | 4/2011 |
| CN | 102375199 A | 3/2012 |
| EP | 0677821 A2 | 10/1995 |
| EP | 0840502 A2 | 5/1998 |
| EP | 1201407 A2 | 5/2002 |
| EP | 1734766 A2 | 12/2006 |
| EP | 2026563 A1 | 2/2009 |
| EP | 2104334 A1 | 9/2009 |
| EP | 2244484 A1 | 10/2010 |
| EP | 2336816 A2 | 6/2011 |
| GB | 2482022 A | 1/2012 |
| JP | 59025483 | 9/1984 |
| JP | 64037177 | 7/1989 |
| JP | 02285772 A | 11/1990 |
| JP | 0715457 A | 1/1995 |
| JP | 09181913 A | 7/1997 |
| JP | 11142609 A | 5/1999 |
| JP | 11223708 A | 8/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005354124 A | 12/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008258885 A | 10/2008 |
| JP | 2009132010 A | 6/2009 |
| JP | 2009300268 A | 12/2009 |
| JP | 2011017764 A | 1/2011 |
| JP | 2011030184 A | 2/2011 |
| JP | 2011109484 A | 6/2011 |
| JP | 2013526801 A | 6/2013 |
| JP | 2014521117 A | 8/2014 |
| KR | 20110097647 A | 8/2011 |
| TW | 200828994 A | 7/2008 |
| TW | 200939739 A | 9/2009 |
| WO | 2007083579 A1 | 7/2007 |
| WO | 2008045198 A2 | 4/2008 |
| WO | 2008108271 A1 | 9/2008 |
| WO | 2008108926 A1 | 9/2008 |
| WO | 2008150817 A1 | 12/2008 |
| WO | 2009151903 A2 | 12/2009 |
| WO | 2009157273 A1 | 12/2009 |
| WO | 2011008443 A2 | 1/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |

(56) References Cited

FOREIGN PATENT DOCUMENTS

| WO | 2012057620 A2 | 5/2012 |
|---|---|---|
| WO | 2012057620 A3 | 5/2012 |
| WO | 2012057621 A1 | 5/2012 |
| WO | 2012057622 A1 | 5/2012 |
| WO | 2012057623 A1 | 5/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2015048694 A2 | 4/2015 |
| WO | 2015070105 A1 | 5/2015 |
| WO | 2015081279 A1 | 6/2015 |
| WO | 2014133974 A9 | 9/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
Extended European Search Report for EP Application No. 13810429.4, Completed Jan. 7, 2016, dated Jan. 15, 2016, 6 Pgs.
Extended European Search Report for European Application EP12782935.6, completed Aug. 28, 2014, dated Sep. 4, 2014, 7 Pgs.
Extended European Search Report for European Application EP12804266.0, Report Completed Jan. 27, 2015, dated Feb. 3, 2015, 6 Pgs.
Extended European Search Report for European Application EP12835041.0, Report Completed Jan. 28, 2015, dated Feb. 4, 2015, 7 Pgs.
Extended European Search Report for European Application EP13810229.8, Report Completed Apr. 14, 2016, dated Apr. 21, 2016, 7 pgs.
Extended European Search Report for European Application No. 13830945.5, Search completed Jun. 28, 2016, dated Jul. 7, 2016, 14 Pgs.
Extended European Search Report for European Application No. 13841613.6, Search completed Jul. 18, 2016, dated Jul. 26, 2016, 8 Pgs.
Supplementary European Search Report for EP Application No. 13831768.0, Search completed May 18, 2016, dated May 30, 2016, 13 Pgs.
International Preliminary Report on Patentability for International Application No. PCT/US2012/059813, Search Completed Apr. 15, 2014, 7 pgs.
International Preliminary Report on Patentability for International Application No. PCT/US2013/059991, dated Mar. 17, 2015, dated Mar. 26, 2015, 8 pgs.
International Preliminary Report on Patentability for International Application PCT/US13/56065, dated Feb. 24, 2015, dated Mar. 5, 2015, 4 Pgs.
International Preliminary Report on Patentability for International Application PCT/US13/62720, Report dated Mar. 31, 2015, dated Apr. 9, 2015, 8 Pgs.
International Preliminary Report on Patentability for International Application PCT/US2013/024987, dated Aug. 12, 2014, 13 Pgs.
International Preliminary Report on Patentability for International Application PCT/US2013/027146, Completed Apr. 2, 2013, dated Aug. 26, 2014, 10 pgs.
International Preliminary Report on Patentability for International Application PCT/US2013/039155, completed Nov. 4, 2014, dated Nov. 13, 2014, 10 Pgs.
International Preliminary Report on Patentability for International Application PCT/US2013/046002, dated Dec. 31, 2014, dated Jan. 8, 2015, 6 Pgs.
International Preliminary Report on Patentability for International Application PCT/US2013/048772, dated Dec. 31, 2014, dated Jan. 8, 2015, 8 Pgs.
International Preliminary Report on Patentability for International Application PCT/US2013/056502, dated Feb. 24, 2015, dated Mar. 5, 2015, 7 Pgs.
International Preliminary Report on Patentability for International Application PCT/US2013/069932, dated May 19, 2015, dated May 28, 2015, 14 Pgs.
International Preliminary Report on Patentability for International Application PCT/US2014/017766, dated Aug. 25, 2015, dated Sep. 3, 2015, 8 Pgs.
International Preliminary Report on Patentability for International Application PCT/US2014/018084, dated Aug. 25, 2015, dated Sep. 3, 2015, 11 Pgs.
International Preliminary Report on Patentability for International Application PCT/US2014/018116, dated Sep. 15, 2015, dated Sep. 24, 2015, 12 Pgs.
International Preliminary Report on Patentability for International Application PCT/US2014/021439, dated Sep. 15, 2015, dated Sep. 24, 2015, 9 Pgs.
International Preliminary Report on Patentability for International Application PCT/US2014/022118, dated Sep. 8, 2015, dated Sep. 17, 2015, 4 pgs.
International Preliminary Report on Patentability for International Application PCT/US2014/022123, dated Sep. 8, 2015, dated Sep. 17, 2015, 4 Pgs.
International Preliminary Report on Patentability for International Application PCT/US2014/022774, dated Sep. 22, 2015, dated Oct. 1, 2015, 5 Pgs.
International Preliminary Report on Patentability for International Application PCT/US2014/023762, dated Mar. 2, 2015, dated Mar. 9, 2015, 10 Pgs.
International Preliminary Report on Patentability for International Application PCT/US2014/024407, dated Sep. 15, 2015, dated Sep. 24, 2015, 8 Pgs.
International Preliminary Report on Patentability for International Application PCT/US2014/024903, dated Sep. 15, 2015, dated Sep. 24, 2015, 12 Pgs.
International Preliminary Report on Patentability for International Application PCT/US2014/024947, dated Sep. 15, 2015, dated Sep. 24, 2015, 7 Pgs.
International Preliminary Report on Patentability for International Application PCT/US2014/025100, dated Sep. 15, 2015, dated Sep. 24, 2015, 4 Pgs.
International Preliminary Report on Patentability for International Application PCT/US2014/025904, dated Sep. 15, 2015, dated Sep. 24, 2015, 5 Pgs.
International Preliminary Report on Patentability for International Application PCT/US2014/028447, dated Sep. 15, 2015, dated Sep. 24, 2015, 7 Pgs.
International Preliminary Report on Patentability for International Application PCT/US2014/030692, dated Sep. 15, 2015, dated Sep. 24, 2015, 6 Pgs.

(56) References Cited

OTHER PUBLICATIONS

International Preliminary Report on Patentability for International Application PCT/US2014/064693, dated May 10, 2016, dated May 19, 2016, 14 Pgs.
International Preliminary Report on Patentability for International Application PCT/US2014/066229, dated May 24, 2016, dated Jun. 6, 2016, 9 Pgs.
International Preliminary Report on Patentability for International Application PCT/US2014/067740, dated May 31, 2016, dated Jun. 9, 2016, 9 Pgs.
International Preliminary Report on Patentability for International Application PCT/US2015/019529, dated Sep. 13, 2016, dated Sep. 22, 2016, 9 Pgs.
International Search Report and Written Opinion for International Application No. PCT/US13/46002, completed Nov. 13, 2013, dated Nov. 29, 2013, 7 pgs.
International Search Report and Written Opinion for International Application No. PCT/US13/56065, Completed Nov. 25, 2013, dated Nov. 26, 2013, 8 pgs.
International Search Report and Written Opinion for International Application No. PCT/US13/59991, Completed Feb. 6, 2014, dated Feb. 26, 2014, 8 pgs.
International Search Report and Written Opinion for International Application No. PCT/US2011/64921, Completed Feb. 25, 2011, dated Mar. 6, 2012, 17 pgs.
International Search Report and Written Opinion for International Application No. PCT/US2013/024987, Completed Mar. 27, 2013, dated Apr. 15, 2013, 14 pgs.
International Search Report and Written Opinion for International Application No. PCT/US2013/027146, completed Apr. 2, 2013, 12 pgs.
International Search Report and Written Opinion for International Application No. PCT/US2013/039155, completed Jul. 1, 2013, dated Jul. 11, 2013, 11 Pgs.
International Search Report and Written Opinion for International Application No. PCT/US2013/048772, Completed Oct. 21, 2013, dated Nov. 8, 2013, 6 pgs.
International Search Report and Written Opinion for International Application No. PCT/US2013/056502, Completed Feb. 18, 2014, dated Mar. 19, 2014, 7 pgs.
International Search Report and Written Opinion for International Application No. PCT/US2013/069932, Completed Mar. 14, 2014, dated Apr. 14, 2014, 12 pgs.
International Search Report and Written Opinion for International Application No. PCT/US2015/019529, completed May 5, 2015, dated Jun. 8, 2015, 11 Pgs.
International Search Report and Written Opinion for International Application PCT/US11/36349, dated Aug. 22, 2011, 11 pgs.
International Search Report and Written Opinion for International Application PCT/US13/62720, completed Mar. 25, 2014, dated Apr. 21, 2014, 9 Pgs.
International Search Report and Written Opinion for International Application PCT/US14/024903, completed Jun. 12, 2014, dated, Jun. 27, 2014, 13 pgs.
International Search Report and Written Opinion for International Application PCT/US14/17766, completed May 28, 2014, dated Jun. 18, 2014, 9 Pgs.
US 9,338,332, 6/2016, Wadhwa et al. (withdrawn).
International Search Report and Written Opinion for International Application PCT/US14/18084, completed May 23, 2014, dated Jun. 10, 2014, 12 Pgs.
International Search Report and Written Opinion for International Application PCT/US14/18116, completed May 13, 2014, dated Jun. 2, 2014, 12 Pgs.
International Search Report and Written Opinion for International Application PCT/US14/21439, completed Jun. 5, 2014, dated Jun. 20, 2014, 10 Pgs.
International Search Report and Written Opinion for International Application PCT/US14/22118, completed Jun. 9, 2014, dated, Jun. 25, 2014, 5 pgs.
International Search Report and Written Opinion for International Application PCT/US14/22774 report completed Jun. 9, 2014, dated Jul. 14, 2014, 6 Pgs.
International Search Report and Written Opinion for International Application PCT/US14/24407, report completed Jun. 11, 2014, dated Jul. 8, 2014, 9 Pgs.
International Search Report and Written Opinion for International Application PCT/US14/25100, report completed Jul. 7, 2014, dated Aug 7, 2014 5 Pgs.
International Search Report and Written Opinion for International Application PCT/US14/25904 report completed Jun. 10, 2014, dated Jul. 10, 2014, 6 Pgs.
International Search Report and Written Opinion for International Application PCT/US2009/044687, completed Jan 5, 2010, dated Jan 13, 2010, 9 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US2012/37670, dated Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, dated Jun. 25, 2014, 5 pgs.
International Search Report and Written Opinion for International Application PCT/US2014/024947, Completed Jul. 8, 2014, dated Aug 5, 2014, 8 Pgs.
International Search Report and Written Opinion for International Application PCT/US2014/028447, completed Jun. 30, 2014, dated Jul. 21, 2014, 8 Pgs.
International Search Report and Written Opinion for International Application PCT/US2014/030692, completed Jul. 28, 2014, dated Aug. 27, 2014, 7 Pgs.
International Search Report and Written Opinion for International Application PCT/US2014/064693, Completed Mar. 7, 2015, dated Apr. 2, 2015, 15 pgs.
International Search Report and Written Opinion for International Application PCT/US2014/066229, Completed Mar. 6, 2015, dated Mar. 19, 2015, 9 Pgs.
International Search Report and Written Opinion for International Application PCT/US2014/067740, Completed Jan 29, 2015, dated Mar. 3 2015, 10 pgs.
International Search Report and Written Opinion for International Application PCT/US2014/23762, Completed May 30, 2014, dated Jul. 3, 2014, 6 Pgs.
Office Action for U.S. Appl. No. 12/952,106, dated Aug. 16, 2012, 12 pgs.
"File Formats Version 6", Alias Systems, 2004, 40 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bennett et al., "Multispectral Bilateral Video Fusion", 2007 IEEE Transactions on Image Processing, vol. 16, No. 5, May 2007, pp. 1185-1194.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Computational Photography (ICCP), 2009 IEEE International Conference, 9 pgs.

(56) References Cited

OTHER PUBLICATIONS

Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998, 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, pp. 2239-2248.
Boye et al., "Comparison of Subpixel Image Registration Algorithms", Proc. of SPIE—IS&T Electronic Imaging, Feb. 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", Retrieved on Nov. 10, 2012, Retrieved from the Internet at URL:<http://citeseerx.ist.psu.edu/viewdoc/download?doi=10.1.1.226.2643&rep=rep1&type=pdf>, 2001, 269 pgs.
Chan et al., "Extending the Depth of Field in a Compound-Eye Imaging System with Super-Resolution Reconstruction", Proceedings—International Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH I3D 2005, pp. 139-146.
Chen et al., "KNN Matting", IEEE Transactions on Pattern Analysis and Machine Intelligence, Sep. 2013, vol. 35, No. 9, pp. 2175-2188.
Crabb et al., "Real-time foreground segmentation via range and color imaging", Computer Vision and Pattern Recognition Workshops, 2008 CVPRW'08. IEEE Computer Society Conference on. IEEE, 2008, 5 pages.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.

Moreno-Noguer et al., "Active Refocusing of Images and Videos", ACM SIGGRAPH, Jul. 2007, vol. 26, pp. 1-10, retrieved on Jul. 8, 2015 from the Internet <URL:http://doi.acm.org/10.1145/1276377.1276461>.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Perwass et al., "Single Lens 3D-Camera with Extended Depth-of-Field", printed from www.raytrix.de, Jan. 2012, 15 pgs.
Pham et al., "Robust Super-Resolution without Regularization", Journal of Physics: Conference Series 124, 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, Jan. 1998, pp. 29 pgs., DOI: 10.1109/ICCV.1998.710696 • Source: DBLP Conference: Computer Vision, Sixth International Conference.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.

(56) References Cited

OTHER PUBLICATIONS

Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer vol. 77, No. 9, Sep. 1996, 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, article 166, Nov. 1, 2013 (Nov. 1, 2013), pp. 1-13.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pages.
Wang, "Calculation of Image Position, Size and Orientation Using First Order Properties", Dec. 29, 2010, OPTI521 Tutorial, 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", retrieved from http://en.wikipedia.org/wiki/Polarizing_filter_(photography) on Dec. 12, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", CVPR'04 Proceedings of the 2004 IEEE Computer Society Conference on Computer Vision and Pattern Recognition, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing. IEEE, 2012. 4 pages.
Yang et al., "A Real-Time Distributed Light Field Camera", Eurographics Workshop on Rendering, 2002, pp. 1-10.
Yang et al., "Superresolution Using Preconditioned Conjugate Gradient Method", Proceedings of SPIE—The International Society for Optical Engineering, Jul. 2002, 8 pgs.
Zhang et al., "A Self-Reconfigurable Camera Array", Eurographics Symposium on Rendering, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zomet et al., "Robust Super-Resolution", IEEE, 2001, pp. 1-6.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical artificial compound eyes—from design to experimental verification of two different concepts", Proc. of SPIE, Optical Design and Engineering II, vol. 5962, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng, Wei Yong et al., "Gaze correction for 3D tele-immersive communication system", IVMSP Workshop, 2013 IEEE 11th. IEEE, Jun. 10, 2003, 4 pages.
Fanaswala, "Regularized Super-Resolution of Multi-View Images", Retrieved on Nov. 10, 2012 (Nov. 10, 2012). Retrieved from the Internet at URL<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.

(56) References Cited

OTHER PUBLICATIONS

Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Hernandez-Lopez et al., "Detecting objects using color and depth segmentation with Kinect sensor", Procedia Technology, vol. 3, Jan. 1, 2012 (Jan. 1, 2012), pp. 196-204, XP055307680, ISSN: 2212-0173, DOI: 10.1016/j.protcy.2012.03.021.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D, 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG, 2011, pp. 75-80.
Joshi, et al., "Synthetic Aperture Tracking: Tracking Through Occlusions", ICCV IEEE 11th International Conference on Computer Vision; Publication [online], Oct. 2007, retrieved on Jul. 28, 2014 from the Internet: <URL: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. I-103-I-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR '94, 1994, 8 pgs.
Lai et al., "A Large-Scale Hierarchical Multi-View RGB-D Object Dataset", Proceedings—IEEE International Conference on Robotics and Automation, May 2011, 8 pgs., DOI:10.1109/ICRA.201135980382.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Levoy et al., "Light Field Rendering", Proc. ADM SIGGRAPH '96, 1996, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
"Light fields and computational photography", Stanford Computer Graphics Laboratory, Retrieved from: http://graphics.stanford.edu/projects/lightfield/, Earliest publication online: Feb. 10, 1997, 3 pgs.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Kubota et al., "Reconstructing Dense Light Field From Array of Multifocus Images for Novel View Synthesis", IEEE Transactions on Image Processing, vol. 16, No. 1, Jan. 2007, pp. 269-279.
Li et al., "Fusing Images With Different Focuses Using Support Vector Machines", IEEE Transactions on Neural Networks, vol. 15, No. 6, Nov. 8, 2004, pp. 1555-1561.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Vetro et al., "Coding Approaches for End-To-End 3D TV Systems", Mitsubishi Electric Research Laboratories, Inc., TR2004-137, Dec. 2004, 6 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Xu, Ruifeng, "Real-Time Realistic Rendering and High Dynamic Range Image Display and Compression", Dissertation, School of

(56) References Cited

OTHER PUBLICATIONS

Computer Science in the College of Engineering and Computer Science at the University of Central Florida, Orlando, Fall Term 2005, 192 pgs.

* cited by examiner

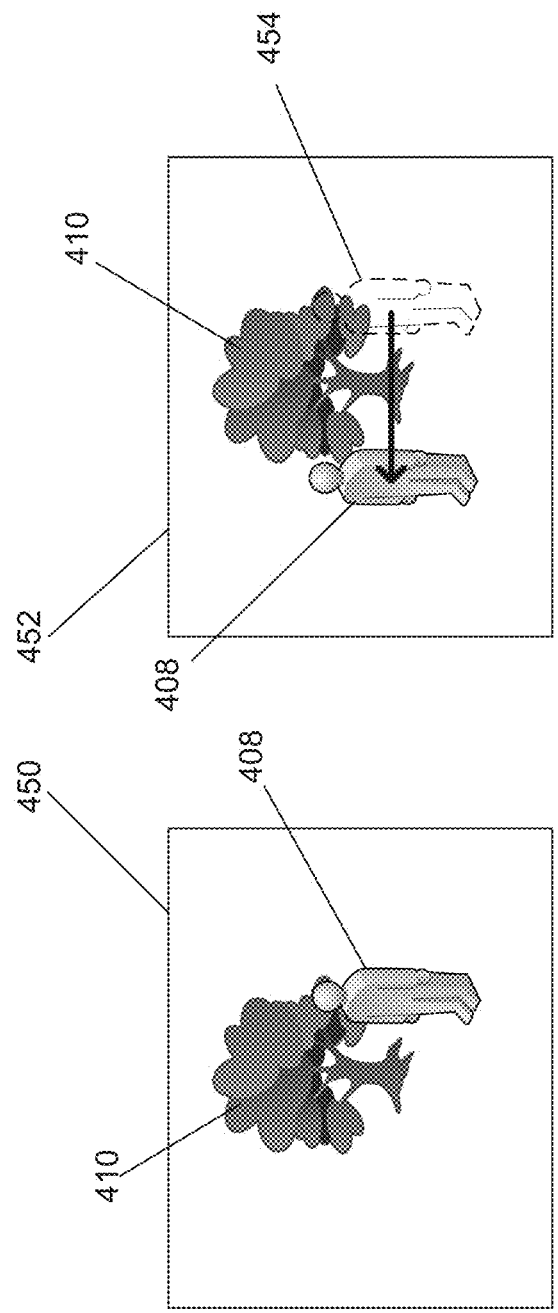

Autofocus reticle

Depth map in reticle

Edge map

SYSTEMS AND METHODS FOR SYNTHESIZING IMAGES FROM IMAGE DATA CAPTURED BY AN ARRAY CAMERA USING RESTRICTED DEPTH OF FIELD DEPTH MAPS IN WHICH DEPTH ESTIMATION PRECISION VARIES

CROSS-REFERENCE TO RELATED APPLICATION

The present invention is a continuation of U.S. patent application Ser. No. 14/207,254 entitled "Systems and Methods for Synthesizing Images from Image Data Captured by an Array Camera Using Restricted Depth of Field Depth Maps in which Depth Estimation Precision Varies" to Venkataraman et al., filed Mar. 12, 2014, which application claims priority under 35 U.S.C. §119(e) to U.S. Provisional Patent Application Ser. No. 61/780,974 entitled "Systems and Methods for Synthesizing Images from Image Data Captured by an Array Camera using Depth Maps in which Depth Estimation Precision and Spatial Resolution Vary" to Venkataraman et al., filed Mar. 13, 2013, the disclosures of which are incorporated by reference herein in their entirety.

FIELD OF THE INVENTION

The present invention generally relates to digital cameras and more specifically to systems and methods for capturing video and images using array cameras.

BACKGROUND

Binocular viewing of a scene creates two slightly different images of the scene due to the different fields of view of each eye. These differences, referred to as binocular disparity (or parallax), provide information that can be used to calculate depth in the visual scene, providing a major means of depth perception. The impression of depth associated with stereoscopic depth perception can also be obtained under other conditions, such as when an observer views a scene with only one eye while moving. The observed parallax can be utilized to obtain depth information for objects in the scene. Similar principles in machine vision can be used to gather depth information.

Two cameras separated by a distance can take pictures of the same scene and the captured images can be compared by shifting the pixels of two or more images to find parts of the images that match. The amount an object shifts between two different camera views is called the disparity, which is inversely proportional to the distance to the object. A disparity search that detects the shift of an object in the multiple images that results in the best match can be used to calculate the distance to the object based upon the baseline distance between the cameras and the focal length of the cameras involved (as well as knowledge of additional properties of the camera). The approach of using two or more cameras to generate stereoscopic three-dimensional images is commonly referred to as multi-view stereo.

More recently, researchers have used multiple cameras spanning a wider synthetic aperture to capture light field images (e.g. the Stanford Multi-Camera Array). A light field, which is often defined as a 4D function characterizing the light from all directions at all points in a scene, can be interpreted as a two-dimensional (2D) collection of 2D images of a scene. Due to practical constraints, it is typically difficult to simultaneously capture the collection of 2D images of a scene that form a light field. However, the closer in time at which the image data is captured by each of the cameras, the less likely that variations in light intensity (e.g. the otherwise imperceptible flicker of fluorescent lights) or object motion will result in time dependent variations between the captured images. Processes involving capturing and resampling a light field can be utilized to simulate cameras with large apertures. For example, an array of M×N cameras pointing at a scene can simulate the focusing effects of a lens as large as the array. In many embodiments, cameras need not be arranged in a rectangular pattern and can have configurations including circular configurations and/or any arbitrary configuration appropriate to the requirements of a specific application. Use of camera arrays in this way can be referred to as synthetic aperture photography.

The larger the aperture of a camera, the more light that is admitted, but the depth of field is reduced. Objects are well focused at a distance determined by the focal length of the camera lens. Objects at other distances are imaged as a blur, sometimes called the circle of confusion. If the object lies far enough from the imager plane that the circle of confusion is larger than some nominal diameter (called maximum acceptable circle of confusion, representing the blur size for which the image is acceptably sharp and typically defined as the size of one pixel in the camera's sensor), the object can be referred to as outside the depth of field for the current camera's settings. Depth of field is defined as the distance between the nearest and farthest objects in the scene for which the circle of confusion is less than the maximum acceptable value. Introducing an aperture stop (diaphragm) into such an optical system and partially closing it reduces the effective diameter of the lens. This reduces the circle of confusion for objects off the plane of best focus, hence increasing the camera's depth of field. Conversely, opening the diaphragm expands the circle of confusion, decreasing depth of field. If the aperture is made extremely large (e.g. as wide as the distance to the plane of best focus), the depth of field becomes so shallow that only objects lying on the plane of best focus are sharp. When an object lying outside the depth of field is small enough that for every point on the plane of best focus, at least some of its rays still reach the lens, the object no longer obscures the camera's view of these points.

SUMMARY OF THE INVENTION

Systems and methods in accordance with embodiments of the invention generate a restricted depth of field depth map from a reference viewpoint using a set of images captured from different viewpoints, where depth estimation precision is higher for pixels with depth estimates within the range of distances corresponding to the restricted depth of field and lower for pixels with depth estimates outside of the range of distances corresponding to the restricted depth of field. In a number of embodiments, restricted depth of field depth maps are utilized to render a video sequence from a set of video sequences captured from different viewpoints.

One embodiment of the invention includes a processor and memory containing a set of images captured from different viewpoints and an image processing pipeline application. In addition, the image processing pipeline application configures the processor to: determine a desired focal plane distance and a range of distances corresponding to a restricted depth of field for an image rendered from a reference viewpoint; generate a restricted depth of field depth map from the reference viewpoint using the set of images captured from different viewpoints, where depth estimation precision is higher for pixels with depth estimates within the range of distances corresponding to the restricted depth of field and lower for pixels with depth estimates outside of the range of distances corresponding to the restricted depth of field; and render a restricted depth of field image from the reference viewpoint using the set of images captured from different viewpoints and the restricted depth of field depth map.

In a further embodiment, the image processing pipeline application further configures the processor to automatically determine the desired focal plane distance and the range of distances corresponding to a restricted depth of field.

In another embodiment, the image processing pipeline application further configures the processor to automatically determine the desired focal plane distance and the range of distances corresponding to the restricted depth of field by determining a distance to a surface of a scene object using the set of images captured from different viewpoints.

In a still further embodiment, the image processing pipeline application further configures the processor to determine a distance to a surface of a scene object using the set of images captured from different viewpoints by: generating an initial depth map and a confidence map from at least a portion of the set of images captured from different viewpoints, where the confidence map indicates the reliability of pixel depth estimates in the initial depth map; and determining the depth of the surface of the scene object based upon at least one pixel depth estimate within the initial depth map marked as confident within the confidence map.

In still another embodiment, the image processing pipeline application further configures the processor to receive a user instruction identifying a surface of a scene object by: generating a preview image from the set of images captured from different viewpoints, where the preview image includes a user interface cue; and identifying a surface of a scene object visible within the set of images captured from different viewpoints based upon the location of the user interface cue.

In a yet further embodiment, the image processing pipeline application further configures the processor to automatically determine the range of distances corresponding to the restricted depth of field based upon the desired focal plane distance.

In yet another embodiment, the image processing pipeline application further configures the processor to determine the range of distances corresponding to the restricted depth of field based upon user instructions.

In a further embodiment again, each image in the set of images captured from different viewpoints forms part of a video sequence in a set of video sequences captured from different viewpoints, and the image processing pipeline application further configures the processor to determine a distance to a surface of a scene object using the set of images captured from different viewpoints by tracking an object over time within the frames of the set of video sequences captured from different viewpoints.

In another embodiment again, the image processing pipeline application further configures the processor to determine a distance to a surface of a scene object using the set of images captured from different viewpoints by selecting a previous object distance when a tracked object is occluded.

In a further additional embodiment, the image processing pipeline application further configures the processor to determine a distance to a surface of a scene object using the set of images captured from different viewpoints by performing time based filtering to smooth variations over time in the desired focal plane distance relative to variations in the distance to the surface of the scene object.

In another additional embodiment, the image processing pipeline application further configures the processor to generate a restricted depth of field depth map by: generating an initial depth map using the set of images captured from different viewpoints; determining pixel locations with depth estimates from the initial depth map indicating that the pixel locations are likely to have depths within the range of distances corresponding to the restricted depth of field; generating higher depth estimation precision depth estimates for at least some of the pixel locations that are likely to have depths within the range of distances corresponding to the restricted depth of field using the set of images captured from different viewpoints; and generating a restricted depth of field depth map using at least some of the depth estimates from the initial depth map and at least some of the higher depth estimation precision depth estimates.

In a still yet further embodiment, the image processing pipeline application further configures the processor to generate an initial depth map by: downsampling at least some of the images in the set of images captured from different viewpoints to obtain a set of lower spatial resolution images; and determining a low spatial resolution depth map using the set of lower spatial resolution images.

In still yet another embodiment, the image processing pipeline application further configures the processor to determine a low spatial resolution depth map using the set of lower spatial resolution images by performing a disparity search with respect to a given pixel location using the set of lower spatial resolution images. In addition, the disparity search is performed by searching a first set of disparities.

In a still further embodiment again, the image processing pipeline application further configures the processor to generate the higher precision depth estimates by performing a disparity search with respect to a given pixel location using the set of images captured from different viewpoints. In addition, the disparity search is performed by searching a second set of disparities, and a search performed using the second set of disparities provides greater depth estimation precision within the range of distances corresponding to the restricted depth of field than the precision of a depth estimate obtained within the same range of distances by a search performed using the first set of disparities.

In still another embodiment again, the image processing pipeline application further configures the processor to perform a disparity search with respect to a given pixel location using the set of images captured from different viewpoints by searching at least one range of disparities within the second set of disparities. In addition, the range of disparities searched is determined based upon the depth estimates in the initial depth map for pixel locations within a neighborhood of the given pixel location.

In a still further additional embodiment, the image processing pipeline application further configures the processor to generate an initial confidence map for the initial depth map. In addition the range of disparities searched is determined based upon confident depth estimates in the initial depth map for pixel locations within a neighborhood of the given pixel location.

In still another additional embodiment, the first set of disparities is not uniformly distributed with respect to disparity.

In a yet further embodiment again, the first set of disparities is uniformly distributed with respect to disparity.

In yet another embodiment again, the second set of disparities is not uniformly distributed with respect to disparity.

In a yet further additional embodiment, the second set of disparities is uniformly distributed with respect to disparity.

In yet another additional embodiment, the image processing pipeline application further configures the processor to generate an initial depth map by performing a disparity search with respect to a given pixel location using the set of images captured from different viewpoints. In addition, the disparity search is performed by searching a first set of disparities.

In a further additional embodiment again, the image processing pipeline application further configures the processor to generate depth estimates for at least some of the pixel locations determined to be likely within the range of distances corresponding to the restricted depth of field at a higher depth estimation precision than the depth estimates for the pixel locations in the initial depth map using the set of images captured from different viewpoints by performing a disparity search with respect to a given pixel location using the set of images captured from different viewpoints. In addition, the disparity search is performed by searching a second set of disparities; and a search performed using the second set of disparities provides greater depth estimation precision within the range of distances corresponding to the restricted depth of field than the precision of a depth estimate obtained within the same range of distances by a search performed using the first set of disparities.

In another additional embodiment again, the first set of disparities is not uniformly distributed with respect to disparity.

In a still yet further embodiment again, the first set of disparities is uniformly distributed with respect to disparity.

In still yet another embodiment again, the second set of disparities is not uniformly distributed with respect to disparity.

In a still yet further additional embodiment, the second set of disparities is uniformly distributed with respect to disparity.

In still yet another additional embodiment, the image processing pipeline application further configures the processor to perform a disparity search with respect to a given pixel location using the set of images captured from different viewpoints by searching a range of disparities within the second set of disparities. In addition, the range of disparities searched is determined based upon the depth estimates in the initial depth map for pixel locations within a neighborhood of the given pixel location.

In a still further additional embodiment again, the image processing pipeline application further configures the processor to generate an initial confidence map for the initial depth map. In addition, the range of disparities searched is determined based upon confident depth estimates in the initial depth map for pixel locations within a neighborhood of the given pixel location.

In another further embodiment, the image processing pipeline application further configures the processor to: generate an initial confidence map for the initial depth map; and determine pixel locations with depth estimates from the initial depth map indicating that the pixel locations are likely to have depths within the range of distances corresponding to the restricted depth of field based upon the depth estimate for the pixel location in the initial depth map and the confidence of the depth estimate for the pixel location indicated by the initial confidence map.

In still another further embodiment, the image processing pipeline application further configures the processor to determine pixel locations with depth estimates from the initial depth map indicating that the pixel locations are likely to have depths within the range of distances corresponding to the restricted depth of field based upon the depth estimate for the pixel location and a determination that the pixel is not contained within a textureless region.

In yet another further embodiment, the image processing pipeline application further configures the processor to generate a restricted depth of field depth map by performing a disparity search with respect to a given pixel location using the set of images captured from different viewpoints. In addition, the disparity search is performed using a greater density of depth samples within the range of distances corresponding to the restricted depth of field and a lower density of depth samples for distances outside the range of distances corresponding to the restricted depth of field.

In another further embodiment again, the image processing pipeline application further configures the processor to render a restricted depth of field image from the reference viewpoint using the set of images captured from different viewpoints and the restricted depth of field depth map by: compositing pixels from the set of images captured from different viewpoints having depth estimates outside the range of distances corresponding to the restricted depth of field by applying scene dependent geometric corrections determined based upon the depth estimates of the composited pixels in the restricted depth of field depth map; and performing super-resolution processing using pixels from the set of images captured from different viewpoints having depth estimates within the range of distances corresponding to the restricted depth of field to synthesize portions of the rendered image at a spatial resolution that is greater than the spatial resolution of the individual images in the set of images captured from different viewpoints.

In another further additional embodiment, the image processing pipeline application further configures the processor to perform super-resolution processing by: performing fusion of pixels from the set of images captured from different viewpoints having depth estimates within the range of distances corresponding to the restricted depth of field to obtain a set of fused pixels by applying scene dependent geometric corrections determined based upon the depth estimates of the fused pixels in the restricted depth of field depth map; and interpolating the set of fused pixels to achieve increases in spatial resolution.

In still yet another further embodiment, the super-resolution processing synthesizes portion of the rendered image at a spatial resolution that is greater than the spatial resolution of the individual images in the set of images captured from different viewpoints by a super-resolution factor; and depth estimation precision for pixels with depth estimates within the range of distances corresponding to the restricted depth of field is at least a precision with respect to disparity corresponding to the spatial resolution of the pixels of at least one of the images in the set of images captured from different viewpoints divided by the super-resolution factor.

In still another further embodiment again, the image processing pipeline application further configures the processor to generate a restricted depth of field depth map by generating an initial depth map using the set of images captured from different viewpoints by: downsampling at least some of the images in the set of images captured from different viewpoints to obtain a set of lower spatial resolution images; and determining a low spatial resolution depth map using the set of lower spatial resolution images. In addition, generating a restricted depth of field depth map includes: determining pixel locations with depth estimates from the initial depth map indicating that the pixel locations are likely to have depths within the range of distances corresponding to the restricted depth of field; generating higher depth estimation precision depth estimates for at least some of the pixel locations that are likely to have depths within the range of distances corresponding to the restricted depth of field using the set of images captured from different viewpoints; and generating a restricted depth of field depth map using at least some of the depth estimates from the initial depth map and at least some of the higher depth estimation precision depth estimates. Furthermore, the image processing pipeline application further configures the processor to composite pixels from the set of images captured from different viewpoints and pixels from the set of lower spatial resolution images by applying scene dependent geometric corrections to the pixels from the set of lower spatial resolution images determined based upon the depth estimates in the initial depth map.

In still another further additional embodiment, the set of images captured from different viewpoints comprises a plurality of subsets of images captured from different viewpoints in a plurality of different color channels. In addition, the image processing pipeline application further configures the processor to render a restricted depth of field image from the reference viewpoint using the set of images captured from different viewpoints and the restricted depth of field depth map by: rendering images from each of the plurality of different color channels using the restricted depth of field depth map; and compositing the rendered image from each of the plurality of different color channels to form a full color reduced depth of field image.

In yet another further embodiment again, the reference viewpoint is a virtual viewpoint.

In yet another further additional embodiment, the restricted depth of field depth map comprises multiple ranges of distances that each correspond to a restricted depth of field.

Another further additional embodiment again includes: an array of cameras configured to capture image data forming a set of images captured from different viewpoints; a processor; and memory containing an image processing pipeline application. In addition the image processing pipeline application configures the processor to: capture a set of images captured from different viewpoints using the array of cameras; store the set of images captured from different viewpoints in memory; determine a desired focal plane distance and a range of distances corresponding to a restricted depth of field for an image rendered from a reference viewpoint; generate a restricted depth of field depth map from the reference viewpoint using the set of images captured from different viewpoints, where depth estimation precision is higher for pixels with depth estimates within the range of distances corresponding to the restricted depth of field and lower for pixels with depth estimates outside of the range of distances corresponding to the restricted depth of field; and render a restricted depth of field image from the reference viewpoint using the set of images captured from different viewpoints and the restricted depth of field depth map.

Still yet another further embodiment again also includes a display. In addition, the image processing pipeline application further configures the processor to generate a preview image from the set of images captured from different viewpoints and display the preview image via the display.

In still yet another further additional embodiment, the display provides a touch user interface, and the image processing pipeline application further configures the processor to determine a desired focal plane distance based upon a touch gesture received via the touch user interface during the display of the preview image.

In yet another further additional embodiment again, at least one of the cameras in the array of cameras includes an autofocus module configured to determine an autofocus distance, and the image processing pipeline application configures the processor to determine a desired focal plane distance based upon the autofocus distance.

In still yet another further embodiment again, the array of cameras includes a π filter group comprising and a 3×3 array of cameras including: a reference camera at the center of the 3×3 array of cameras; two red color cameras located on opposite sides of the 3×3 array of cameras; two blue color cameras located on opposite sides of the 3×3 array of cameras; and four green color cameras surrounding the reference camera.

BRIEF DESCRIPTION OF THE DRAWINGS

FIGS. 4A-4C conceptually illustrate the disparity associated with the effects of parallax in two images of a scene captured from a reference viewpoint and an alternate viewpoint.

DETAILED DISCLOSURE OF THE INVENTION

Figure 1:
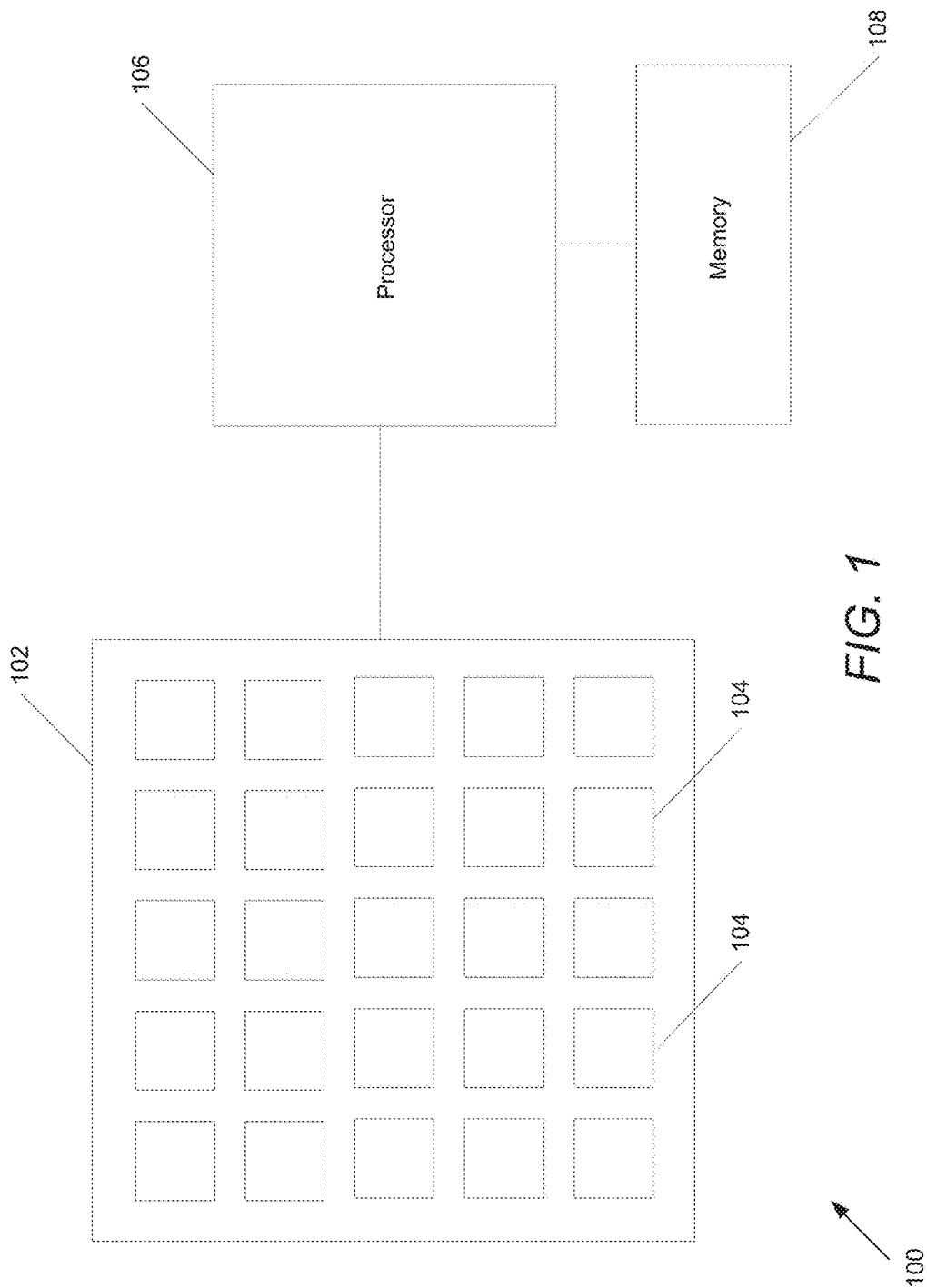
FIG. 1 is a block diagram of an array camera in accordance with an embodiment of the invention.

Turning now to the drawings, systems and methods for synthesizing images from image data captured by an array camera using restricted depth of field depth maps in accordance with embodiments of the invention are illustrated. The term restricted depth of field depth map can be used to describe a depth map in which precision of depth estimates and/or spatial resolution of depth estimates may vary based upon characteristics of the scene including (but not limited to) object distance and object characteristics. The terms depth and distance, when used to describe the depth or distance of a pixel (as expressed in a depth map or restricted depth of field depth map), typically refers to the distance to an imaged object within a scene along an axis extending from the array camera to the object. Therefore, every object located on a plane perpendicular to the axis extending from the array camera can be considered to have the same depth or distance from the array camera (despite each point on the plane technically having a different Euclidian distance from the array camera). The term depth estimation precision can be used to collectively encompass the precision with which depth is estimated (e.g. the number of disparities sampled to obtain a depth estimate and/or the spacing of the disparity samples at the estimated depth) and the spatial resolution with which depth is estimated (e.g. a depth estimate based upon a 16×16 block of pixels may have lower precision with respect to an individual pixel location within the 16×16 block than estimating depth with the same precision for each pixel individually). Therefore, restricted depth of field depth maps can be considered to be depth maps in which depth estimation precision varies based upon characteristics of the scene visible from the viewpoint of the cameras in the array camera. Array cameras including camera modules that can be utilized to capture image data from different viewpoints (i.e. light field images) are disclosed in U.S. patent application Ser. No. 12/935,504 entitled "Capturing and Processing of Images using Monolithic Camera Array with Heterogeneous Imagers" to Venkataraman et al. and U.S. Provisional Patent Application Ser. No. 61/904,947 entitled "Array Camera Modules and Methods of Manufacturing Array Camera Modules Incorporating Independently Aligned Lens Stacks" to Rodda et al. In many instances, fusion and super-resolution processes such as those described in U.S. patent application Ser. No. 12/967,807 entitled "Systems and Methods for Synthesizing High Resolution Images Using Super-Resolution Processes" to Lelescu et al., can be utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504, U.S. Provisional Patent Application Ser. No. 61/904,947, and U.S. patent application Ser. No. 12/967,807 are hereby incorporated by reference in their entirety.

Each two-dimensional (2D) image in a captured light field is from the viewpoint of one of the cameras in the array camera. Due to the different viewpoint of each of the cameras, parallax results in variations in the position of objects within the images of the scene. Processes such as those disclosed in U.S. Provisional Patent Application No. 61/691,666 entitled "Systems and Methods for Parallax Detection and Correction in Images Captured Using Array Cameras" to Venkataraman et al. can be utilized to provide an accurate account of the pixel disparity as a result of parallax between the different cameras in an array. The disclosure of U.S. Patent Application Ser. No. 61/691,666 is hereby incorporated by reference in its entirety. Array cameras can use disparity between pixels in images within a light field to generate a depth map from a reference viewpoint. A depth map indicates the distance of the surfaces of scene objects from the reference viewpoint and can be utilized to determine scene dependent geometric corrections to apply to the pixels from each of the images within a captured light field to eliminate disparity when performing fusion and/or super-resolution processing.

Capturing still images or video in real or near-real time can impose considerable processing and power demands on an array camera. One capability of array cameras with short focal lengths is that they can create high resolution images synthesized from captured lower resolution image data using super-resolution processes, where the super-resolved scene is rendered almost entirely in focus. To generate such an all-in-focus image, the image data which is captured from the array is used to form a depth map, the depth map is used to register the individual images in the array and fuse a high quality super-resolved image, and the super-resolution processing takes additional steps to recover resolution or reduce artifacts in the image. In this normal all-in-focus mode, the same processing occurs regardless of the depths of the objects in the scene. In several embodiments of the invention, a compromise can be made to reduce the computational requirements of synthesizing a satisfactory image or video. Instead of rendering a final image which is 'all-in-focus,' a synthetic effect is generated which mimics the depth-of-field effects of a larger aperture camera.

In a number of embodiments, a depth map is first calculated and examined, and objects in the image which are sufficiently far away from the desired depth of best focus (i.e. objects located at 'out-of-focus depths') are rendered to be blurred in an amount proportional to their distance from the plane of best focus. Regions of the image where objects are sufficiently near to the plane of best focus (i.e. within the range of 'in-focus depths') are rendered with sufficient precision so that they appear to be in focus when fused to synthesize a higher resolution image. In many embodiments, for these super-resolved regions of the image, the depth is estimated with precision at least as high (or higher) than the precision of a high resolution grid used for performing super-resolution processing. For example, to achieve super-resolution using a 3× resolution grid in the in-focus regions (i.e. to increase the effective number of pixels in the image by a factor of 3), the disparity between objects in the various low resolution cameras would typically be detected to a precision of at least ⅓ pixel or higher. The in-focus and out-of-focus regions synthesized above are combined into a single final output image. The aesthetic result of this effect is an image that appears to have a reduced depth-of-field which, though restricted compared to the all-in-focus image, mimics the depth-of-field and focus behavior effects of a larger aperture camera and/or a camera with a longer hyperfocal distance. In many embodiments, the method can be used to blur anything closer than a particular distance (i.e. everything beyond a specified distance can be rendered in focus).

Reducing depth of field can provide certain computational savings. Relaxed sharpness constraints allow the parallax search process to search fewer disparities in the ranges of disparities corresponding to out-of-focus depths, because multiple images do not have to be precisely registered in order to generate a blurred output. In the case that a region of the image is out-of-focus, it is sufficient to detect that the region is at an out-of-focus depth, and only then, to relatively coarse precision. The images need only be matched precisely enough that color banding does not appear when different color channels (e.g. the R, G, and B color channels) are combined in the blurred out-of-focus region during rendering. Additionally, the depths of out-of-focus pixels can be detected at reduced spatial resolution (i.e. using the result of a depth search in reduced resolution images) to save computation. Furthermore, the ability to tolerate blur in the out-of-focus regions can enable the use of less computationally complex rendering (or fusion) processes to synthesize the out-of-focus regions in the final image.

In the in-focus regions, though a high resolution, high precision search is performed to generate high precision depth estimates at a high spatial resolution, the number of depths searched can be reduced to remove depths which are out-of-focus and/or to constrain the depth search based upon the depths of pixels in the neighborhood of the in-focus pixel, where the depth so pixels in the neighborhood may have been calculated at other depth estimation precisions. This means that computational resources are directed towards high precision depth estimation with respect to depths which are to be rendered in-focus, and not across out-of-focus depths where the extra high precision depth estimation does not result in an improved final image since the out-of-focus regions are blurred in the final image. Similarly, super-resolution processes including (but not limited to) processes similar to those disclosed in U.S. patent application Ser. No. 12/967,807 need only be applied to synthesize high resolution in-focus image data. In several embodiments of the invention, captured image data is processed to synthesize a preview image and one or more regions of interest that can be used to define one or more desired depths of best focus.

In a number of embodiments, the array camera includes auto focus capabilities and the desired depth is determined using the autofocus module of the array camera. In several embodiments, a user can select a region of interest and can provide specific parameters which specify how wide the in-focus depth range should be about the desired best focus point (i.e. the range of the restricted depth of field) and how rapidly the blurring should be increased at depths which are increasingly farther away from the plane of best focus (i.e., such parameters essentially define the desired restricted depth of field effect delivered in the final image). In a number of embodiments, the parameter may be a synthetic F# setting and the blur applied as a rapid or not rapidly increasing function of depth (depending on the F#). In several embodiments, the parameter may specify or indicate a blur profile that may or may not be physically realizable by a traditional camera system. In a number of embodiments, a desired plane of best focus for an image is determined by constructing a depth map within the selected region of interest. A map which indicates which pixels in the region of interest are likely to yield confident depths may also be calculated within the same region-of-interest. In a number of embodiments, confidence can be determined based upon a high signal to noise ratio (SNR). In certain embodiments, edge maps can also be utilized to determine pixels for which confident depths can be determined. In other embodiments, any of a variety of techniques can be utilized to determine pixels that can be used with confidence to determine a desired plane of best focus. In several embodiments, the region of interest is automatically and/or continuously monitored or tracked during video capture and time based filtering can be utilized to avoid rapid jumps in the plane of best focus and/or to determine the plane of best focus in circumstances in which a plane of best focus cannot be reliably determined from a single frame. A depth map within a region of interest can be constructed by determining disparity between pixels from the region of interest in image data captured from a reference viewpoint, which may be a virtual viewpoint, and corresponding pixels from image data captured from one or more alternate viewpoints. The most confident pixels in the depth map corresponding to the region of interest can be examined to determine the depth of the object contained within the region of interest. Processes for automatically determining a plane of best focus are described further below. In another embodiment, the plane of best focus is not determined automatically, but is determined manually based on user input. The expected blur for depths other than the best focus depth can be defined based on additional blur parameters that can be predefined and/or provided via the user interface. The resulting focal depth and depth of field can then be used to define at which depths in the final image greater sharpness constraints will apply and at which depths higher levels of blur will be rendered. In a number of embodiments the resulting focal depth and depth of field can be utilized to determine image capture settings based upon the image data captured by pixels having depths falling within the range of distances corresponding to the restricted depth of field.

In the parallax stage, a single restricted depth of field depth map is calculated from the input images. In this case, the single restricted depth of field depth map can be the same size as the resolution of a single camera input (hereafter, the term 'L0' is used to signify that the final depth map or any image or data is the same resolution as an input image from a camera in the array). The parallax stage incorporates knowledge of the desired plane of best focus to reduce the computation required to form the final restricted depth of field depth map. A variety of techniques can be utilized to construct the final restricted depth of field depth map from image data captured using an array camera. The process of constructing the final restricted depth of field depth map can include, for selected pixels, searching a greater density of pixel locations along epipolar lines where the disparity corresponds to depths falling within a range of in-focus depths, and reducing number and/or density of the disparities searched that correspond to depths falling in the out-of-focus region. Although much of the discussion that follows refers to in-focus depths and out-of-focus depths, many embodiments of the invention treat transition depths outside a specified restricted depth of field in the same, or a similar, manner as in-focus depths to avoid artifacts. Therefore, the term in-focus depths should be understood to include depths outside the restricted depth of field in many implementations of the invention. In many embodiments, a hierarchy or pyramid of images is formed from the L0 input images, which are filtered and downsampled one or more times to create lower resolution versions of the L0 input images. Each level of lower resolution can be denoted by an increasing number. For example, the highest spatial resolution images are denoted L0, the next lower resolution images denoted as L1, and so forth. In one embodiment, images are calculated corresponding to each resolution level (L0, L1, L2, etc.) by filtering and downscaling the images from the previous (next-highest) resolution level to create the hierarchy of images. In one embodiment, depth maps are calculated at each resolution level using the corresponding images from that spatial resolution level, and the final depth map draws selected pixels from the different resolution depth maps to create a final combined depth map. For example, the L0 images are used for a disparity search to generate an L0 depth map, the L1 images are used for a disparity search to generate an L1 depth map, etc. To generate the final depth map (which may also be L0-sized), some pixels are drawn from the L0 depth map, some from the L1 depth map, and some from the L2 depth map according to a variety of criteria. In another embodiment, to save computations, all depths are calculated at the lowest or lower resolution levels first, but only certain pixels for which the low resolution depths are deemed unreliable or which are determined to belong to in-focus regions which require higher precision of depth estimation are calculated at the highest or higher resolution level(s) to improve the quality of the synthesized image in these regions. In many embodiments, lower precision depths generated using the lower resolution images can be utilized to modify and/or bound the higher precision disparity search performed using the higher resolution images. For example, a higher precision depth estimate can be obtained by performing a disparity search within a predetermined range of disparities relative to the disparity corresponding to a lower precision depth estimate. In several embodiments, a search is performed within a bounded range of disparities determined based upon the lower precision depth estimates of pixels in a neighborhood of the pixel location for which a higher precision depth estimate is sought. In many embodiments, a search is performed at multiple different ranges of disparities determined based upon the lower precision depth estimates of pixels in a neighborhood of the pixel location for which a higher precision depth estimate is sought. In other embodiments, any of a variety of techniques for generating restricted depth of field depth maps with depth estimation precision that varies with object distance can be utilized as appropriate to the requirements of specific applications.

In a number of embodiments, the final restricted depth of field depth map is used to synthesize images from the captured image data. As can be readily appreciated, the higher the spatial resolution and also precision of depth estimation of the depth map, the greater the accuracy with which pixels captured from different viewpoints can be assembled (i.e. fused) to synthesize a final high resolution image. During fusion, the rendering stage can use knowledge of which depths are rendered out-of-focus to reduce computation. If a region of the image is determined to be out-of-focus based on the restricted depth of field depth map, there is no need to fuse data from multiple cameras, because a high resolution rendering (i.e. super-resolution) is not required to generate the blurred out-of-focus region. A much less computationally expensive method can be used in such regions. In regions which are determined to be in-focus, the high quality fusion is used to ensure the highest quality rendering and maximum resolution in these regions, so the resulting rendering appears properly 'in-focus.' Systems and methods for synthesizing images from image data captured by array cameras using restricted depth of field depth maps to provide synthetic depth of field effects in accordance with embodiments of the invention are discussed further below.

Array Cameras

Array cameras in accordance with embodiments of the invention can include a camera module including an array of cameras and a processor configured to read out and process image data from the camera module to synthesize images. An array camera in accordance with an embodiment of the invention is illustrated in FIG. 1. The array camera 100 includes a camera module 102 with an array of individual cameras 104 where an array of individual cameras refers to a plurality of cameras in a particular arrangement, such as (but not limited to) the square arrangement utilized in the illustrated embodiment. The camera module 102 is connected to the processor 106. The processor is also configured to communicate with one or more different types of memory 108 that can be utilized to store image data and/or contain machine readable instructions utilized to configure the processor to perform processes including (but not limited to) the various processes described below.

Processors 108 in accordance with many embodiments of the invention can be implemented using a microprocessor and/or a coprocessor configured using appropriate software to take the image data within the light field and synthesize one or more high resolution images. In several embodiments, the high resolution image is synthesized from a reference viewpoint, typically that of a reference focal plane 104 within the sensor 102. In many embodiments, the processor is able to synthesize an image from one or more virtual viewpoints, which do not correspond to the viewpoints of any of the focal planes 104 in the sensor 102.

Unless all of the objects within a captured scene are a significant distance from the array camera, the images in the light field will include disparity due to the different fields of view of the focal planes used to capture the images. Processes for detecting and correcting for disparity are discussed further below. Although a specific array camera architecture is illustrated in FIG. 1, alternative architectures can also be utilized in accordance with embodiments of the invention.

Array Camera Modules

Array camera modules in accordance with embodiments of the invention can be constructed from an imager array or sensor including an array of focal planes and an optic array including a lens stack for each focal plane in the imager array. Sensors including multiple focal planes are discussed in U.S. patent application Ser. No. 13/106,797 entitled "Architectures for System on Chip Array Cameras", to Pain et al., the disclosure of which is incorporated herein by reference in its entirety. Light filters can be used within each optical channel formed by the lens stacks in the optic array to enable different cameras within an array camera module to capture image data with respect to different portions of the electromagnetic spectrum.

Figure 2:
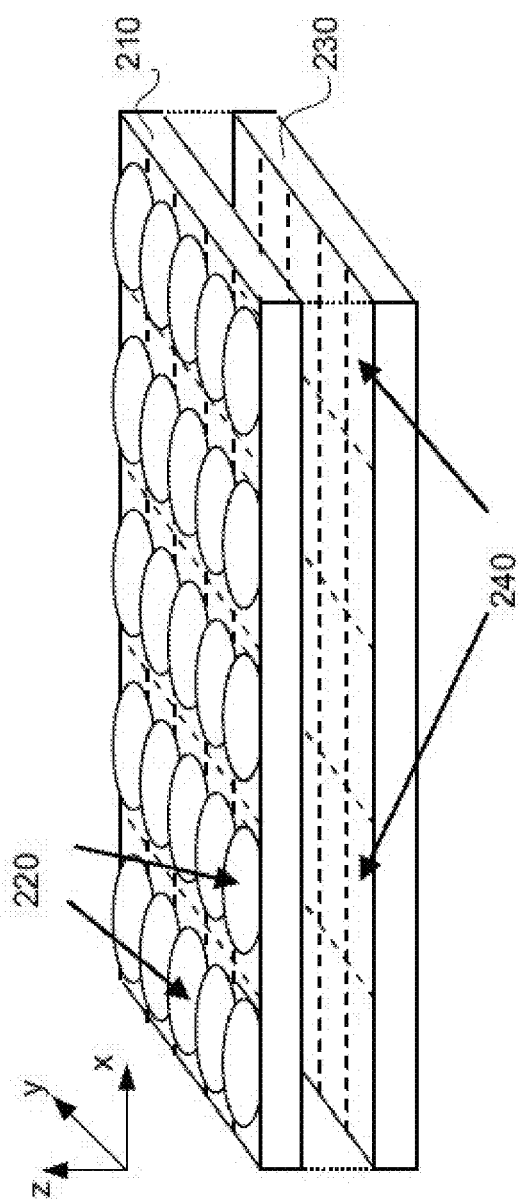
FIG. 2 conceptually illustrates an optic array and an imager array in an array camera module in accordance with an embodiment of the invention.

An array camera module in accordance with an embodiment of the invention is illustrated in FIG. 2. The array camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels within a corresponding focal plane 240. Each pairing of a lens stack 220 and focal plane 240 forms a single camera 104 within the camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes.

In the illustrated embodiment, the focal planes are configured in a 5×5 array. Each focal plane 240 on the sensor is capable of capturing an image of the scene. Typically, each focal plane includes a plurality of rows of pixels that also forms a plurality of columns of pixels, and each focal plane is contained within a region of the imager that does not contain pixels from another focal plane. In many embodiments, image data capture and readout of each focal plane can be independently controlled. In this way, image capture settings including (but not limited to) the exposure times and analog gains of pixels within a focal plane can be determined independently to enable image capture settings to be tailored based upon factors including (but not limited to) a specific color channel and/or a specific portion of the scene dynamic range. The sensor elements utilized in the focal planes can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of each focal plane have similar physical properties and receive light via the same optical channel and color filter (where present). In other embodiments, the sensor elements have different characteristics and, in many instances, the characteristics of the sensor elements are related to the color filter applied to each sensor element.

In several embodiments, color filters in individual cameras can be used to pattern the camera module with π filter groups as further discussed in U.S. Provisional Patent Application No. 61/641,165 entitled "Camera Modules Patterned with pi Filter Groups" filed May 1, 2012, the disclosure of which is incorporated by reference herein in its entirety. These cameras can be used to capture data with respect to different colors, or a specific portion of the spectrum. In contrast to applying color filters to the pixels of the camera, color filters in many embodiments of the invention are included in the lens stack. For example, a Green color camera can include a lens stack with a Green light filter that allows Green light to pass through the optical channel. In many embodiments, the pixels in each focal plane are the same and the light information captured by the pixels is differentiated by the color filters in the corresponding lens stack for each filter plane. Although a specific construction of a camera module with an optic array including color filters in the lens stacks is described above, camera modules including π filter groups can be implemented in a variety of ways including (but not limited to) by applying color filters to the pixels of the focal planes of the camera module similar to the manner in which color filters are applied to the pixels of a conventional color camera. In several embodiments, at least one of the cameras in the camera module can include uniform color filters applied to the pixels in its focal plane. In many embodiments, a Bayer filter pattern is applied to the pixels of one of the cameras in a camera module. In a number of embodiments, camera modules are constructed in which color filters are utilized in both the lens stacks and on the pixels of the imager array.

Although specific array cameras and imager arrays are discussed above, many different array cameras can be utilized to capture image data and synthesize images using restricted depth of field depth maps as appropriate to the requirements of specific applications in accordance with embodiments of the invention. Imager arrays in accordance with embodiments of the invention are discussed further below.

Capturing Image Data with Subsets of Active Cameras

Figure 3:
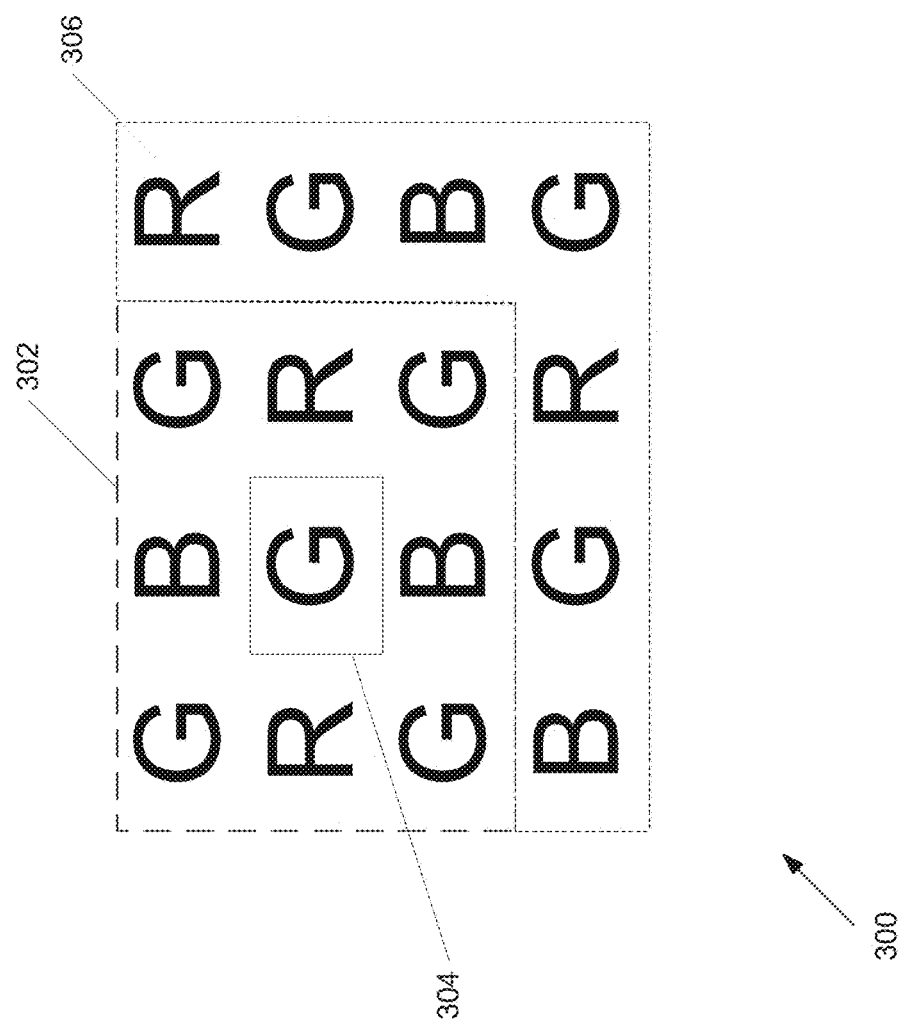
FIG. 3 conceptually illustrates a layout of color filters and the location of a reference camera in an array camera module in accordance with an embodiment of the invention.

Active cameras in an array camera module in accordance with embodiments of the invention can be grouped into subsets for capturing image data. In many embodiments, a single 3×3 π filter group is used to capture image data from which frames of video are synthesized. A 4×4 array camera module including a subset of active cameras configured to capture image data used to synthesize an image from the viewpoint of a reference camera in accordance with an embodiment of the invention is illustrated in FIG. 3. The 4×4 camera module 300 includes a first subset 302 of 3×3 active cameras patterned using a π filter group and utilized to capture image data that can be utilized to synthesize color images and/or video sequences. In the illustrated embodiment, a π filter group includes a Green camera at each corner, a Green reference camera in the center indicated by a box 304, Blue cameras above and below the reference camera, and Red cameras to the left and right sides of the reference camera. In several embodiments, the locations of the Red and Blue cameras within the π filter group are swapped and/or an alternative collection of cameras can be utilized to capture image data to synthesize images. In various embodiments, a second subset 306 of active cameras includes a row of Blue, Green, and Red cameras placed below the π filter group and a column of Blue, Green, and Red cameras placed to the right side of the π filter group with a Green camera connecting the row and the column. In various embodiments, the second subset of active cameras is configured to capture image data for measuring scene information as is described in U.S. Patent Application Ser. No. 61/775,395 entitled "Systems and Methods for Measuring Scene Information While Capturing Images Using Array Cameras" filed Mar. 8, 2013, the disclosure of which is hereby incorporated by reference in its entirety. Although only a subset of the cameras in the array camera module illustrated in FIG. 3 are shown as capturing image data for use in synthesizing video, in many embodiments more cameras than a single π filter group are used to capture image data from which video can be synthesized. Processes for synthesizing video from image data captured using an array camera module in accordance with embodiments of the invention are discussed further below.

Determining Parallax/Disparity

Figure 4A:
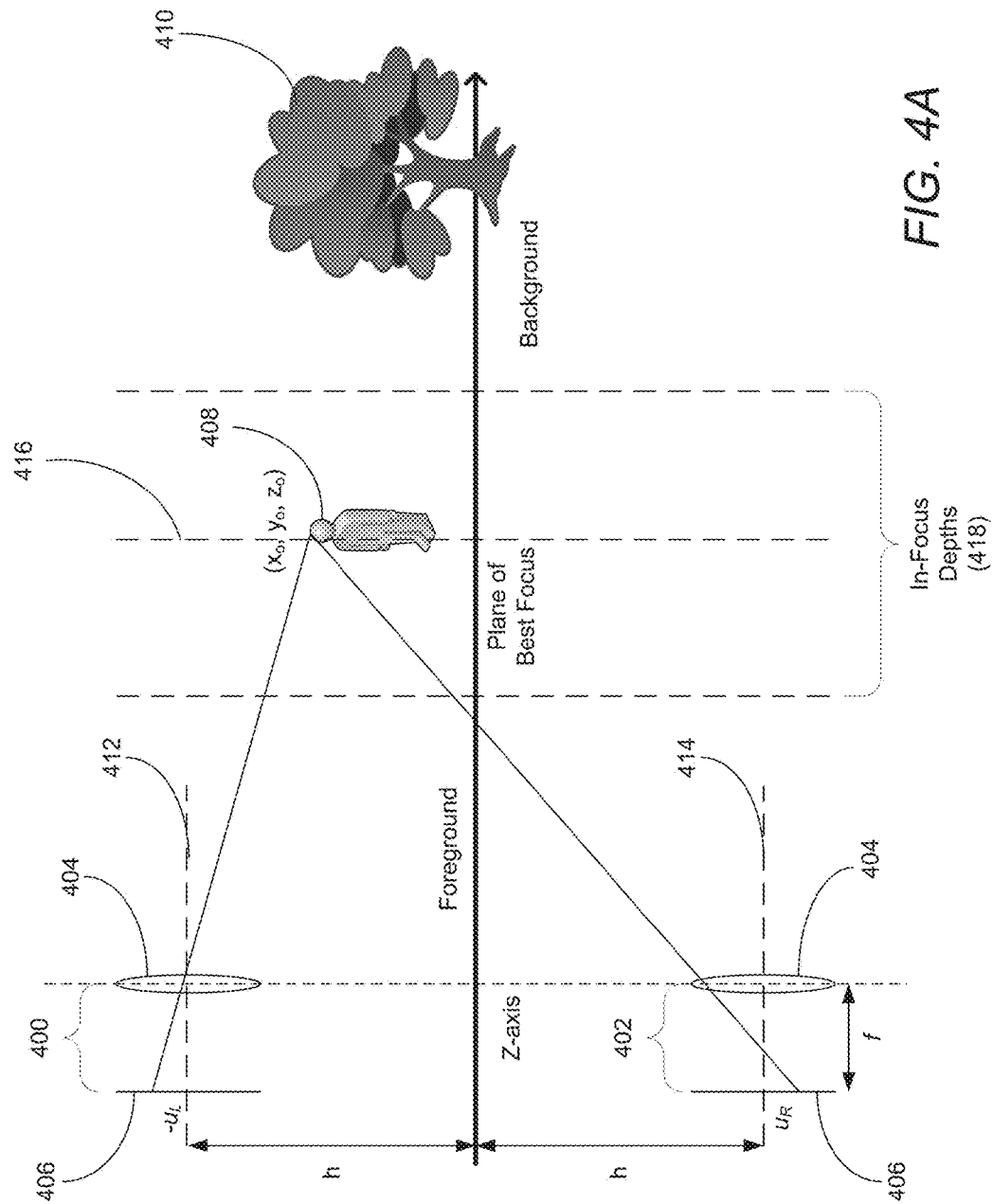

In a number of embodiments, the individual cameras in the array camera module used to capture a light field have similar fields of view, fixed apertures, and focal lengths. Parallax in a two camera system is illustrated in FIG. 4A. The two cameras 200, 202, include a lens stack 204 and a focal plane 206. Each camera has a back focal length f, and the two cameras are separated by the baseline distance of 2h. The field of view of both cameras encompasses a scene including a foreground object 408 and a background object 410. The scene from the viewpoint of the first camera 400 is illustrated in FIG. 4B. In the image 450 captured by the first camera, the foreground object 408 appears located slightly to the right of the background object 410. The scene from the viewpoint of the second camera 402 is illustrated in FIG. 4C. In the image 452 captured by the second camera, the foreground object 408 appears shifted to the left hand side of the background object 410. The disparity introduced by the different fields of view of the two cameras 400, 402, is equal to the difference in location of the foreground object 408 between its location in the image captured by the first camera (indicated in the image captured by the second camera by ghost lines 454) and its location in the image captured by the second camera. As is discussed further below, the distance from the two cameras to the foreground object can be obtained by determining the disparity of the foreground object in the two captured images.

Referring again to FIG. 4A, the point $(x_o, y_o, z_o)$ on the foreground object will appear on the focal plane of each camera at an offset from the camera's optical axis. The offset of the point on the focal plane of the first camera 400 relative to its optical axis 412 is shown as $-u_L$. The offset of the point on the focal plane of the second camera 402 relative to its optical axis 414 is shown as $u_R$. Using similar triangles, the offset between the images captured by the two cameras can be observed as follows:

$$\frac{h-x_o}{z_o} = \frac{-u_L}{f}$$

$$\frac{h+x_o}{z_o} = \frac{u_R}{f}$$

$$\frac{h-x_o}{z_o} = \frac{-u_L}{f}$$

$$\frac{h+x_o}{z_o} = \frac{u_R}{f}$$

Combining the two equations yields the disparity (or parallax) between the two cameras as:

$$\Delta_{parallax} = u_R - u_L = \frac{2hf}{z_o}$$

From the above equation, it can be seen that disparity between images captured by the cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene.

Occlusions in Array Cameras

When multiple images of a scene are captured from different perspectives and the scene includes foreground objects, the disparity in the location of the foreground object in each of the images results in portions of the scene behind the foreground object being visible in some but not all of the images. A pixel that captures image data concerning a portion of a scene, which is not visible in images captured of the scene from other viewpoints, can be referred to as an occluded pixel. Referring again to FIGS. 4B and 4C, when the viewpoint of the second camera is selected as a reference viewpoint the pixels contained within the ghost lines 454 in the image 452 can be considered to be occluded pixels (i.e. the pixels capture image data from a portion of the scene that is visible in the image 452 captured by the second camera 402 and is not visible in the image 450 captured by the first camera 400). In the second image, the pixels of the foreground object 408 can be referred to as occluding pixels as they capture portions of the scene that occlude the pixels contained within the ghost lines 454 in the image 452. Due to the occlusion of the pixels contained within the ghost lines 454 in the second image 452, the distance from the camera to portions of the scene visible within the ghost lines 454 cannot be determined from the two images as there are no corresponding pixels in the image 450 shown in FIG. 4B.

As is discussed further below, increasing the number of cameras capturing images of a scene from different viewpoints in complimentary occlusion zones around the reference viewpoint increases the likelihood that every portion of the scene visible from the reference viewpoint is also visible from the viewpoint of at least one of the other cameras. When the array camera uses different cameras to capture different wavelengths of light (e.g. RGB), distributing at least one camera that captures each wavelength of light in the quadrants surrounding a reference viewpoint can significantly decrease the likelihood that a portion of the scene visible from the reference viewpoint will be occluded in every other image captured within a specific color channel. The distribution of color filters in array cameras to reduce the likelihood of occlusions in accordance with embodiments of the invention is discussed further in U.S. Provisional Patent Application Ser. No. 61/641,164 entitled "Camera Modules Patterned with π Filter Groups", to Nisenzon et al., filed May 1, 2012, the disclosure of which is incorporated herein by reference in its entirety.

Using Disparity to Generate Depth Maps in Array Cameras

Array cameras in accordance with many embodiments of the invention use disparity observed in images captured by the array cameras to generate a restricted depth of field depth map. A depth map is typically regarded as being a layer of meta-data concerning an image that describes the distance from the camera to specific pixels or groups of pixels within the image (depending upon the resolution of the depth map relative to the resolution of the image). Array cameras in accordance with a number of embodiments of the invention use depth maps for a variety of purposes including (but not limited to) generating scene dependent geometric shifts during the synthesis of a high resolution image and/or performing dynamic refocusing of a synthesized image.

Based upon the discussion of disparity above, the process of determining the depth of a portion of a scene based upon pixel disparity is theoretically straightforward. When the viewpoint of a specific camera in the array camera is chosen as a reference viewpoint, the distance to a portion of the scene visible from the reference viewpoint can be determined using the disparity between the corresponding pixels in some or all of the images captured by the camera array. In the absence of occlusions, a pixel corresponding to a pixel in the image captured from the reference viewpoint will be located in each image along an epipolar line (i.e. a line parallel to the baseline vector between the two cameras). The distance along the epipolar line of the disparity corresponds to the distance between the camera and the portion of the scene captured by the pixels. Therefore, by comparing the pixels in the captured images that are expected to correspond at a specific depth, a search can be conducted for the depth that yields the pixels having the highest degree of similarity. The depth at which the corresponding pixels in the captured images have the highest degree of similarity can be assumed to be the most likely distance between the camera and the portion of the scene captured by the pixel. Similar processes can be utilized when synthesizing a depth map from a virtual viewpoint.

Many challenges exist, however, in determining an accurate depth map using the method outlined above. In several embodiments, the cameras in an array camera are similar but not the same. Therefore, characteristics including (but not limited to) optical characteristics, different sensor characteristics (such as variations in sensor response due to offsets, different transmission or gain responses, non-linear characteristics of pixel response), noise in the captured images, and/or warps or distortions related to manufacturing tolerances related to the assembly process can vary between the images reducing the similarity of corresponding pixels in different images. In addition, super-resolution processes rely on sampling diversity and/or aliasing in the images captured by an imager array in order to synthesize higher resolution images. However, increasing sampling diversity can also involve decreasing similarity between corresponding pixels in captured images in a light field. Given that the process for determining depth outlined above relies upon the similarity of pixels, the presence of photometric differences and sampling diversity between the captured images can reduce the accuracy with which a depth map can be determined.

The generation of a depth map is further complicated by occlusions. As discussed above, an occlusion occurs when a pixel that is visible from the reference viewpoint is not visible in one or more of the captured images. The effect of an occlusion is that at the correct depth, the pixel location that would otherwise be occupied by a corresponding pixel is occupied by a pixel capturing another portion of the scene (typically an object closer to the camera). The occluding pixel is likely very different to the occluded pixel. Therefore, a comparison of the similarity of the pixels at the correct depth is less likely to result in a significantly higher degree of similarity than at other depths. Effectively, the occluding pixel acts as a strong outlier masking the similarity of those pixels, which correspond. Accordingly, the presence of occlusions can introduce a strong source of error into a depth map and processes for determining depth maps such as those disclosed in U.S. Patent Application Ser. No. 61/691,666, incorporated by reference above, involve detecting occlusions and determining depths using non-occluded pixels. Systems and methods for generating restricted depth of field depth maps in accordance with embodiments of the invention are discussed further below.

Synthesizing Images Using Restricted Depth of Field Depth Maps

When synthesizing an image using image data captured from different viewpoints in a manner similar to that conceptually illustrated in FIG. 4A, a focal depth 416 can be defined with an associated range of in-focus depths 418. The plane of best focus and range of in-focus depths can be utilized to determine a depth search that can be performed in such a way that depth is estimated with a lower precision at depths outside the range of in-focus depths in an L0 (highest resolution) depth map. Additional depth maps can be determined with respect to a pyramid of images generated by downsampling the captured images (e.g. L1, L2, etc. images). The depth maps of these lower resolution images can involve determining depth with greater precision at depths outside the range of in-focus depths than the precision of the L0 depth estimates at the corresponding depths. Accordingly, the precision of the depth information available in the L0 depth map may be reduced at depths in the out-of-focus region and the spatial resolution of the L1, and lower resolution depth maps in the out-of-focus regions is lower despite higher precision. Therefore, a single depth map can be constructed by first searching for the depth of a pixel in the L0 image and using the depth in an L1 or lower spatial resolution depth map (e.g. L2, L3, etc.) depending upon the depth of the pixel in the L0 image (and the depth of the pixel location in other higher levels, e.g. L2, L3, etc., within the depth map pyramid). It is worth noting that the spatial resolution of the depth map is often indicated by the descending indices of the depth maps, with increasing indices indicating decrease spatial resolution (i.e. L0 is higher spatial resolution than L1, L2, etc. and L2 is lower spatial resolution than L0, and L1). In other embodiments, a low spatial resolution depth map can be constructed and the low spatial resolution depth map used to determine when to perform a depth search with respect to a specific pixel or pixels that have a depth in the next-lowest or a lower level depth map (i.e. a higher spatial resolution depth map) that is within the in-focus depth range or outside the subset of the out-of-focus range mapped to the current level of spatial resolution. In several embodiments, depth is determined by performing uniform depth sampling with respect to disparity irrespective of whether the disparity corresponds to a range of in-focus or out-of-focus depths. In this way, a coarse precision disparity search can be performed using lower resolution images and the precision of the disparity search increased as disparity searches are performed with respect to pixels from higher spatial resolution images. In a number of embodiments, the depth estimates from coarse precision disparity searches can be used to identify pixels that are likely to be in-focus and modify and/or bound a higher precision disparity search for in-focus pixels, where the higher precision disparity search is performed using pixels from the higher spatial resolution images. The disparities searched using the higher spatial resolution images can be predetermined based upon the coarse precision disparity estimate for the pixel. In several embodiments, the disparities searched using the higher spatial resolution images are determined based upon the coarse precision disparity estimates of pixels within the neighborhood of the pixel.

Figure 5:
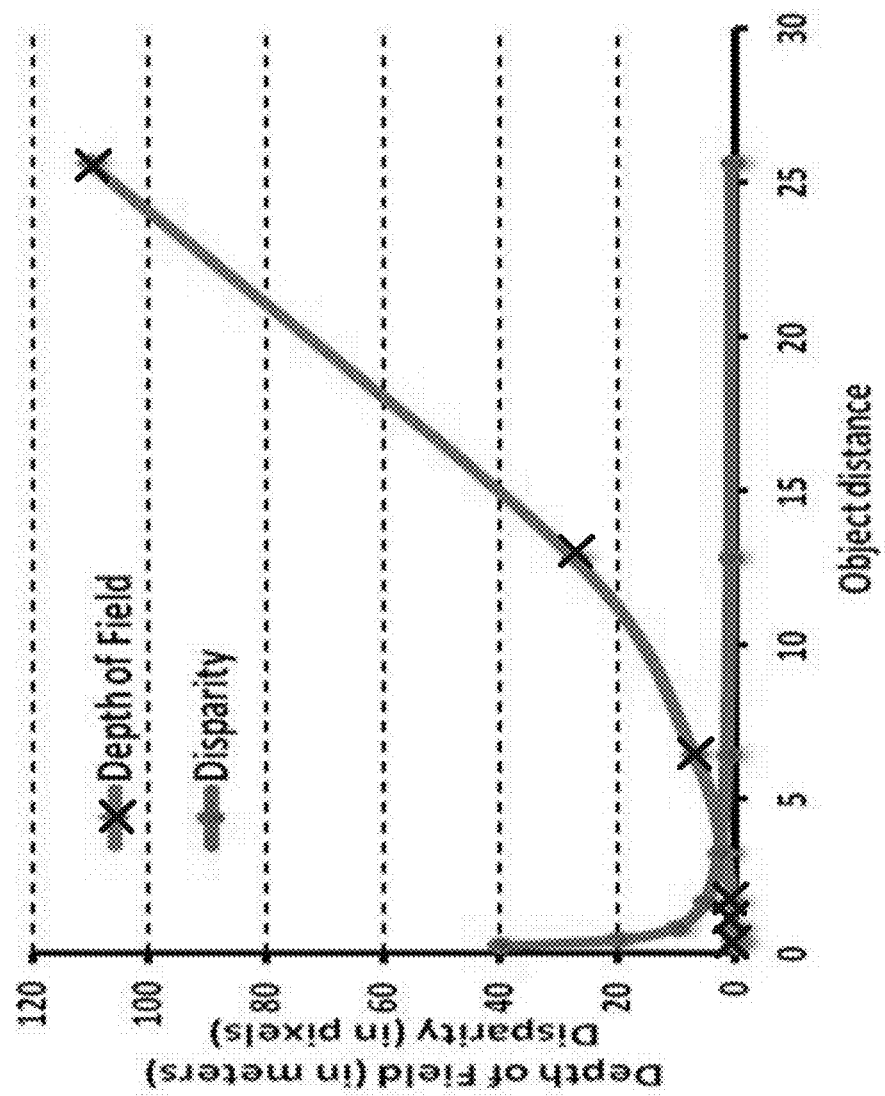
FIG. 5 is a chart illustrating the effect of object distance within a sampled scene on disparity and on depth of field when the focal depth is located at the object distance.

As is discussed further below, a best focus depth can be defined based upon the distance of an object within a region of interest from the array camera. In the embodiment illustrated in FIG. 4A, the desired best focus depth 416 is determined to be the distance from the array camera to the foreground object 408. The depths which are considered in-focus 418 can then be determined relative to the best focus depth in any of a variety of ways appropriate to the requirements of a specific application. In several embodiments, the range of depths which are considered in focus is automatically determined based upon a synthetic aperture parameter provided to the pipeline which specifies how much blur should be applied for objects which are increasing distances from the best focus depth. For example, a setting to mimic F2.8 will result in more blur at a particular distance from the best focus depth than will a setting for F5.6 at the same distance. In other embodiments, the range of in-focus depths can be dependent based upon factors including (but not limited to) the content of the scene and user input. The observed disparity and depth of field associated with an object located at specific focal depths (object distances) is illustrated in FIG. 5. As can readily be appreciated by reviewing the curve of pixel disparity with respect to object distance in FIG. 5, the precision with which object distance can be determined decreases rapidly with increased object distance. In addition, the range of depths which are in focus increases as the best focus distance increases. As one can see, at a focal depth of 30 cm, the range of depths in focus is much smaller than if the desired best focus depth is set to a farther distance such as 10 meters.

In several embodiments, the array camera automatically identifies regions of interest within a scene and determines an appropriate focal depth. In one embodiment, the confident pixels in the region of interest can be determined by calculating edge gradients within the same region of interest in the reference image and selecting pixels as confident which have edge gradients that are stronger than a particular threshold. In several embodiments, the map of confident pixels in the depth map of the region-of-interest can be determined using any metric indicating the reliability of specific depth measurements within the region of interest. In one embodiment, an SNR estimator is applied to the reference image (within the region-of-interest), and pixels which are determined to have high SNR relative to a known or characterized noise floor or otherwise with respect to a threshold are deemed confident and likely to have reliable depth estimates. In certain embodiments, edge maps can also be generated and confident pixels that lie on edges can be utilized to determine depth. Once the pixels with confident depths within the region of interest are marked, a histogram is formed which counts how many of these confident pixels in the region of interest belong to each possible depth. From the resulting histogram, the desired focal depth can be selected using statistical measures or other measures applied to the histogram. In one embodiment, the depth which is confident and occurs most frequently in the region of interest (i.e. the mode of the histogram) is selected as the desired best focal plane. In many embodiments, temporal hysteresis can be utilized to control the extent to which the desired best focal plane and/or range of in-focus depths changes from one frame of video to the next. In several embodiments, time based filtering of the best focal plane and/or range of in-focus depths is utilized to smooth transitions between different best focal planes and/or ranges of in-focus depths during the capture of video using an array camera. In several embodiments, the damping of the rate of temporal change of the desired best focal point is a function of the number of confident depth measurements within the region of interest. If the number of confident pixels within the region is low, the resulting 'best focus depth' may be discarded or may influence the temporal hysteresis by a discounted amount to avoid introducing spurious temporal changes in the best focal point due to low-confidence depth measures. In an alternate embodiment, depth information for pixels within the region of interest can be used in any of a variety of ways to select a best focal plane including (but not limited to) selecting the depth which appears as the median of the histogram distribution as the desired focal depth. In several embodiments, a user can specify one or more regions of interest containing objects from which a focal depth can be determined. In a number of embodiments, the user is provided with the ability to modify the plane of best focus and/or the range of in-focus depths utilized by the array camera to synthesize images from image data captured by the array camera. In many embodiments, a plane of best focus and an in-focus range of depths are selected, and these are utilized to synthesize video or still image data in real or near-real time and the raw image data can be reprocessed post capture to generate video sequences having different planes of best focus and ranges of in focus depths including (but not limited to) synthesizing all in focus images. In many embodiments, the raw image data can be processed post capture to generate a higher resolution depth map and/or a restricted depth of field depth map in which pixels that sample objects at different depths are uniformly processed (i.e. the process for determining the depth of a given pixel is not determined in a depth dependent manner).

Figure 6:
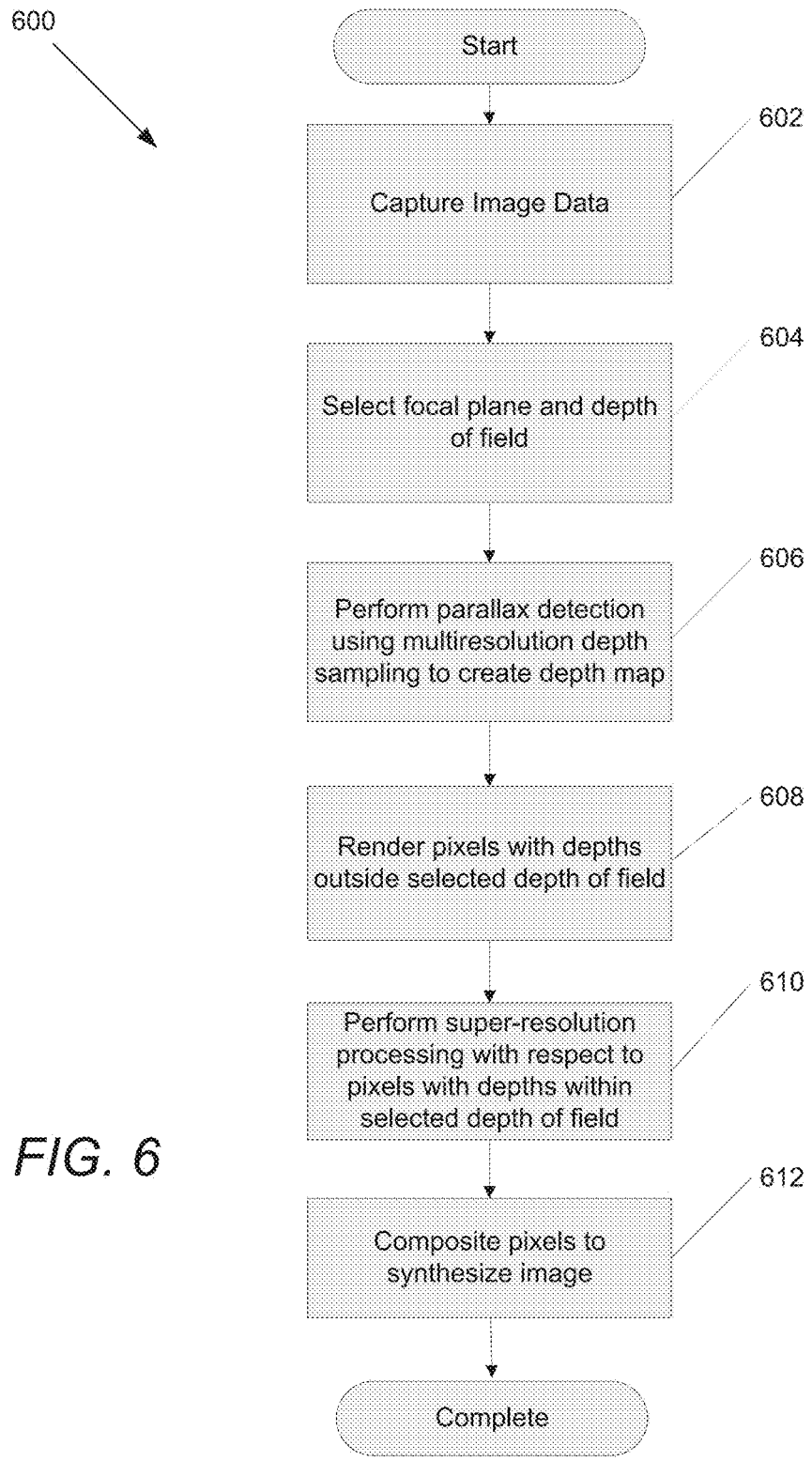
FIG. 6 is a flow chart illustrating a process for synthesizing images using depth maps that determine disparity with varying levels of precision and varying resolution in accordance with embodiments of the invention.

A process for synthesizing images from image data captured by array cameras using restricted depth of field depth maps to reduce computation and provide a synthetic depth of field effect in accordance with an embodiment of the invention is illustrated in FIG. 6. The process 600 includes capturing (602) image data using multiple active cameras within an array camera. A selection is made (604) of a desired plane of best focus and based on a parameter provided to the pipeline which specifies how blur should be increased with distance from the best focus point, the ranges of depths which are considered 'in-focus' and 'out-of-focus' can be determined. As was noted above, pixels at the transition between 'in-focus' and 'out-of-focus' depths can be treated in a similar manner to 'in-focus' pixels to reduce artifacts associated with incorrect depth estimates. As is described further below, the selection can be made based upon direct user input (e.g. using a manual slider user interface element) and/or based upon an automatic determination of a relevant object distance. A process similar to the processes described in U.S. Patent Application Ser. No. 61/691,666, incorporated by reference above, can be used to detect disparity associated with parallax between viewpoints of the active cameras in the array. By controlling the manner in which disparity searches are performed, a restricted depth of field depth map which incorporates depth values drawn from different spatial resolutions and/or searches of varying precision which take into account relaxed rendering constraints to reduce computational requirements can be generated (606) in accordance with embodiments of the invention. The depth maps can include multiple levels. At the highest resolution level L0 the depth map can be determined using a lower precision at depths outside the range of in-focus depths. Lower resolution depth maps can include higher precision depth estimates at depths outside the range of in-focus depths determined with a lower spatial resolution. The depth estimate utilized at a specific object depth can be determined using any of a variety of factors that are discussed further below.

Restricted depth of field depth maps in which precision of depth estimation and/or spatial resolution vary that are generated in accordance with embodiments of the invention can be utilized to synthesize images from the captured image data. In several embodiments, a restricted depth of field depth map in which precision of depth estimation and spatial resolution vary is used to render (608) pixels that sample objects located at depths outside of the selected depth of field (out-of-focus regions). The restricted depth of field depth map can then be used to perform super-resolution processing (610) with respect to pixels that sample objects located within the selected depth of field (in-focus regions). The rendered pixels (608) and the pixels synthesized using super-resolution processes (610) can then be composited (612) to produce the final synthesized image. Out-of-focus regions are intentionally rendered to be blurry, and so an image is formed in these regions can use less computationally complex techniques and/or contributions from fewer cameras than are used in the in-focus region. In many embodiments, out-of-focus regions can be rendered using pixels from the pyramid of images generated by downsampling the captured images (e.g. L1, L2, etc. images). In certain embodiments, the number of levels of the pyramid of images used to generate the restricted depth of field depth map is different from the number of levels of the pyramid of images used to render the out-of-focus regions of the image. For example, two levels (e.g. L0 and L1) of the pyramid of images can be utilized to generate the restricted depth of field depth map and three levels (e.g. L0, L1 and L2) can be utilized to render the out-of-focus regions of the image. As can readily be appreciated, any number of levels of a pyramid of images generated by downsampling the captured images can be utilized to generate a restricted depth of field depth map and/or to render out-of-focus regions of an image as appropriate to the requirements of specification applications in accordance with embodiments of the invention. In in-focus regions, the provided restricted depth of field depth map has higher resolution and this is used for super-resolution processing to achieve increased sharpness compared to the out-of-focus regions. In the composited image, pixels in in-focus regions that sample objects located within the selected depth of field are super-resolved.

In many embodiments, the process illustrated in FIG. 6 can be repeated with sets of image data to synthesize a sequence of video frames that can then be encoded and stored. In many embodiments, the raw image data is also stored and/or compressed for storage. In this way, the raw image data can be used to synthesize additional images and/or video sequences utilizing alternative viewpoints, focal depths and/or depths of field. Although specific processes for synthesizing images from image data captured by array cameras using restricted depth of field depth maps to render a synthetic depth of field effect within a selected depth of field are described above with respect to FIG. 6, any of a variety of processes can be utilized to synthesize images from image data captured by array cameras using restricted depth of field depth maps in accordance with embodiments of the invention. Image processing pipelines that can be implemented in the software of an array camera in order to synthesize images from image data captured by the array camera using restricted depth of field depth maps to provide synthetic depth of field effects within selected depths of field are discussed below.

Varying Depth Estimation Precision Image Processing Pipeline

Figure 7:
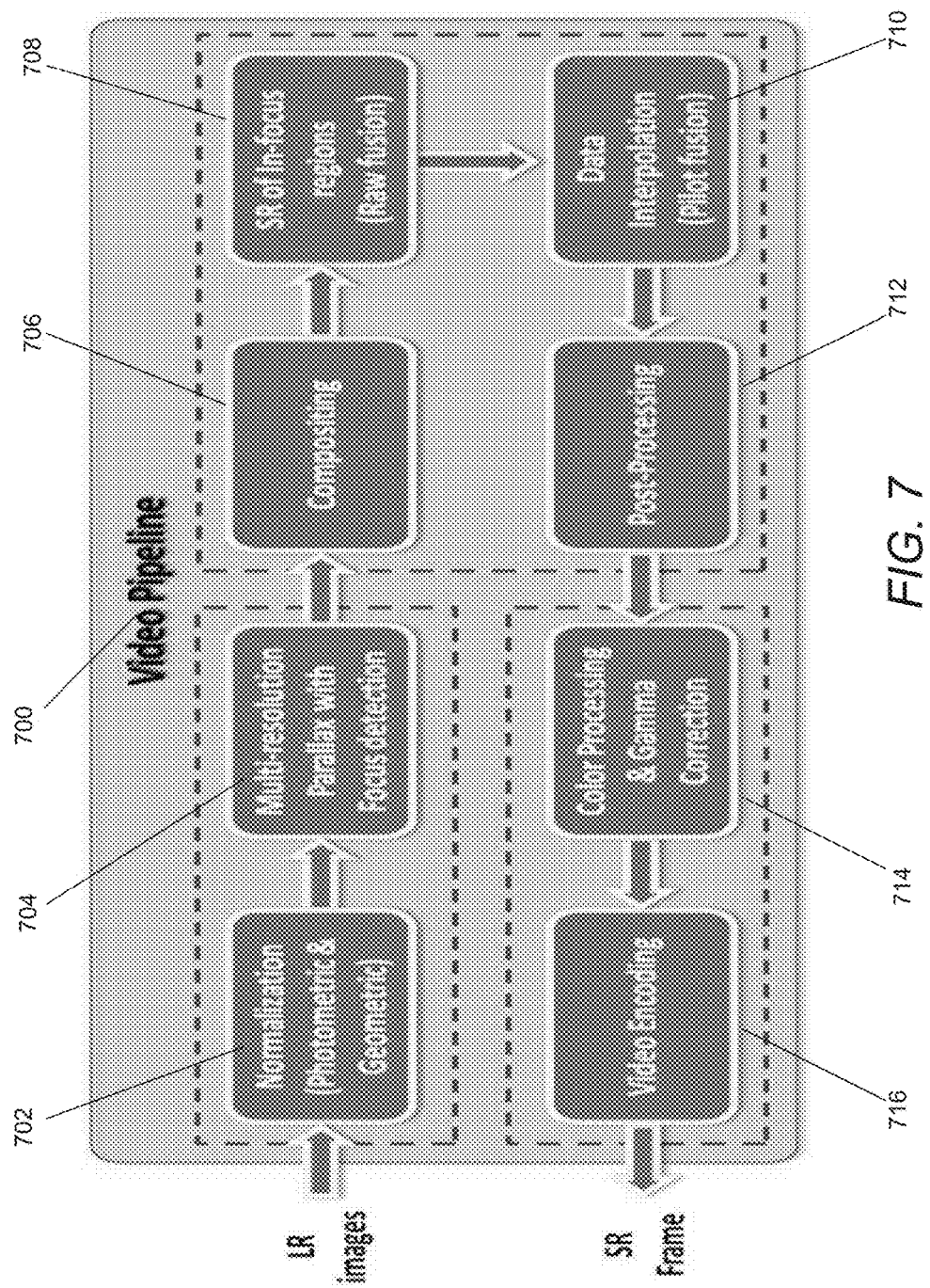
FIG. 7 is a flow chart illustrating a video processing pipeline in accordance with an embodiment of the invention.

An image processing pipeline that can be implemented using an image processing application or a video processing application configured to execute on a processor within an array camera is illustrated in FIG. 7. The image processing pipeline 700 receives low resolution image data and performs normalization (702) on the low resolution image data. In several embodiments, the normalization involves performing photometric and/or geometric corrections with respect to image data received from different cameras in the array camera module. Photometric differences and scene-independent geometric distortions can be corrected through calibration. Photometric calibration data used to perform photometric normalization and scene-independent geometric corrections that compensate for scene-independent geometric distortions can be generated using an off line calibration process and/or a subsequent recalibration process. The photometric calibration data can be provided to a photometric normalization module or process that can perform any of a variety of photometric adjustments to the images captured by an array camera including (but not limited to) Black Level calculation and adjustments, vignetting correction, and lateral color correction. In several embodiments, the photometric normalization module also performs temperature normalization. The scene-independent geometric corrections determined using a calibration process can also be applied to the captured images to increase the correspondence between the images. When the captured images are used to synthesize a higher resolution image using super-resolution processing, the scene-independent geometric corrections applied to the images are typically determined at a sub-pixel resolution. Accordingly, the scene-independent geometric corrections are typically determined with a higher degree of precision than the corrections utilized during registration in conventional stereoscopic 3D imaging. In many embodiments, the scene-independent geometric corrections also involve rectification to account for distortion and rotation of the lenses of the array camera relative to the focal planes so that the epipolar lines of the alternate view images are easily aligned with those of the image captured from the reference viewpoint. By normalizing geometrically in this way, the searches performed to determine the depths of corresponding pixels can be simplified to be searches along straight lines in various cameras, and the precision of depth measurements can be improved.

The image processing pipeline 700 can perform focus detection and varying depth estimation precision parallax detection 704. As is described further below varying depth estimation precision parallax detection processes can involve performing disparity searches with greater precision at depths which are to be rendered in-focus. In addition, the varying depth estimation precision parallax detection process can involve filtering and downsampling captured image data to reduce the resolution of the image data. Lower spatial resolution disparity searches can then be performed with respect to the downsampled image data to produce one or more low resolution depth maps. Where the varying depth estimation precision parallax detection process involves generating multiple depth maps, the image processing pipeline 700 can composite the depth maps to produce a single restricted depth of field depth map which combines estimates from multiple levels of spatial resolution and/or precision of depth estimation that can be used to synthesize the final rendered image.

A restricted depth of field depth map can then be used to synthesize a high resolution image from the low resolution image data received by the image processing pipeline 700. The process of synthesizing a high resolution image can involve compositing 706 pixels from different viewpoints that sample objects located outside the selected depth of field (out-of-focus regions) by applying scene dependent geometric corrections based upon pixel depth. Super-resolution processes can then be utilized to synthesize portions of a high resolution image corresponding to pixels that sample objects located within the selected depth of field (i.e. in in-focus regions). The super-resolution process can involve performing raw fusion 708 and pilot fusion 710 (i.e. combining pixels from individual cameras onto a higher resolution grid and filling in holes to form an initial estimate of the super-resolved image in preparation for additional processing and recovery). In many embodiments, additional super-resolution processing can be performed including processes similar to those described in U.S. patent application Ser. No. 12/967,807, incorporated by reference above, to achieve additional increases in resolution (potentially at the expense of additional computational complexity). In several embodiments, the low resolution image data can be produced in out-of-focus areas and used to generate out-of-focus parts of a high resolution image using a compositing mechanism as part of the post capture image processing. For in-focus areas additional super-resolution processes using restricted depth of field depth maps and portions of images from multiple cameras in the camera array may be used in order to obtain a final high resolution image.

The composited pixels (706) and the synthesized pixels (708, 710) in the synthesized image can then be post processed (712) to apply one or more filters to remove artifacts within the synthesized image associated with the image processing techniques utilized to synthesize the image. Color processing and gamma correction 714 can be applied to the synthesized image and sequences of images forming a sequence of video frames can be encoded 716 using any of a variety of well known video encoding techniques to reduce the maximum bitrate of the video stream output by the video processing pipeline 700. In many embodiments, out-of-focus pixels are blurred, therefore, any denoising and sharpening filter applied in the post processing 712 stage of the video processing pipeline 700 can be applied to the in-focus region(s) only. The final video frame can be generated through a color processing and gamma correction 714 stage of the video processing pipeline 700. The color correction matrix is computed per frame based on the histogram of the red, green and blue color channels, while the gamma correction function as well as the exposure compensation for the next frame is computed from luma information. To speed this process up, many embodiments of the invention use color information from lower spatial resolution images generated during the process of generating a restricted depth of field depth map 704. Flicker artifacts in color and exposure control can also be reduced by adding temporal hysteresis to the parameters.

Although specific image processing pipelines are described above with reference to FIG. 7, any of a variety of video processing pipelines involving the creation of restricted depth of field depth maps in which precision of depth estimation and spatial resolution vary can be utilized to provide synthetic depth of field effects when synthesizing images in accordance with embodiments of the invention. Processes for selecting pixels from the different images using the restricted depth of field depth map based upon the distance of a pixel from the plane of best focus in accordance with embodiments of the invention are discussed further below.

Determining Focal Depth and Depth of Field Using a Region of Interest

In many embodiments, the process of generating a restricted depth of field depth map involves definition of a best focus depth and the range of depths corresponding to the 'in-focus region.' In several embodiments, the best focus depth and blur characteristics which define the range of in-focus depths is selected by the user (e.g., as an F# setting). A preview image can be generated and a user interface cue, such as (but not limited to) the overlay of a small box or target similar to a conventional auto-focus reticle, can be presented to the user. The user can indicate an object using the user interface cue to guide the determination of a selected focal depth. In many embodiments, a full resolution parallax detection process is performed within the region of interest of the reference image indicated by the user to generate a depth map and a confidence map. Although, in several embodiments, a lower resolution depth map is utilized to determine the plane of best focus. Measured depths at pixels deemed to be confident with the confidence map within the indicated region of interest can then be used to determine a focal depth. As noted above a confidence map can be generated utilizing processes similar to those described in U.S. Patent Application Ser. No. 61/691,666, which is incorporated by reference above. An appropriate range of in-focus depths can be determined based upon the plane of best focus depth and or based upon further instructions received from the user. In many embodiments, the process of selecting a focal depth can be automated. In several embodiments, a depth map of the preview image is utilized to identify objects close to the center of the field of view shown in the preview image. In a number of embodiments, a box or an outline of the edge of the object used to determine the plane of best focus depth can be overlaid over the preview image and the user can provide an indication of a different region of interest in the event that the user wishes to modify the focal depth.

Figure 8:
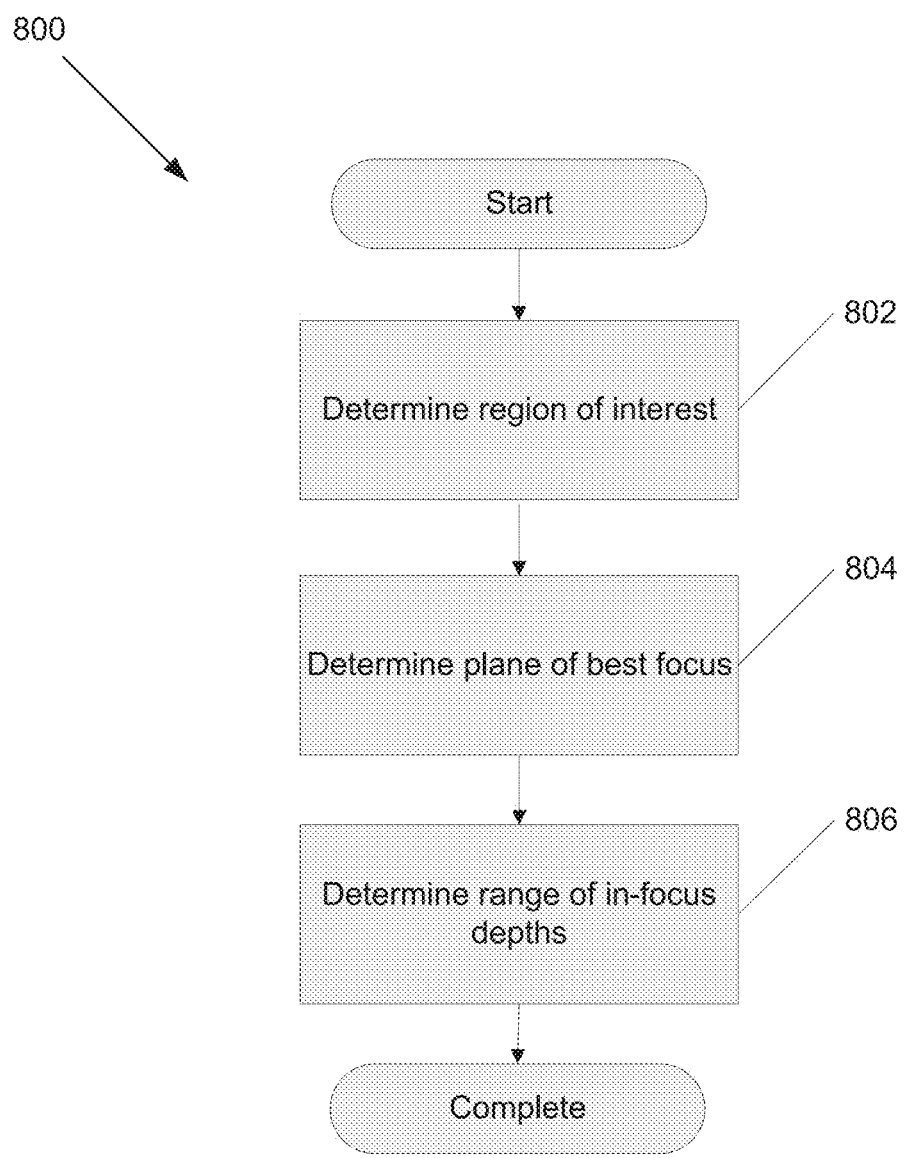
FIG. 8 is a flow chart illustrating a process for determining a focal depth and depth of field based upon a selected region of interest in accordance with an embodiment of the invention.

A process for selecting a focal depth and a depth of field based upon a region of interest is illustrated in FIG. 8. The process 800 includes determining (802) a region of interest. As noted above, the region of interest can be determined based upon user input received, for example, via a touch screen display on which a preview image is shown and/or an automated process that detects objects within the field of view. Objects can be located within the region of interest based upon pixels for which depths are confident and the distance to the object from the array camera can be used to select (804) the desired best focus depth. A range of in-focus depths can be selected (806) in accordance with any of a variety of criterion appropriate to a specific application. In several embodiments, the range of in-focus depths is determined based upon distances corresponding to a (symmetrical) range of disparity on either side of the disparity corresponding to the desired best focus depth. The size of range of in-focus depths is a parameter, which can be modified based upon user input.

Figure 9:
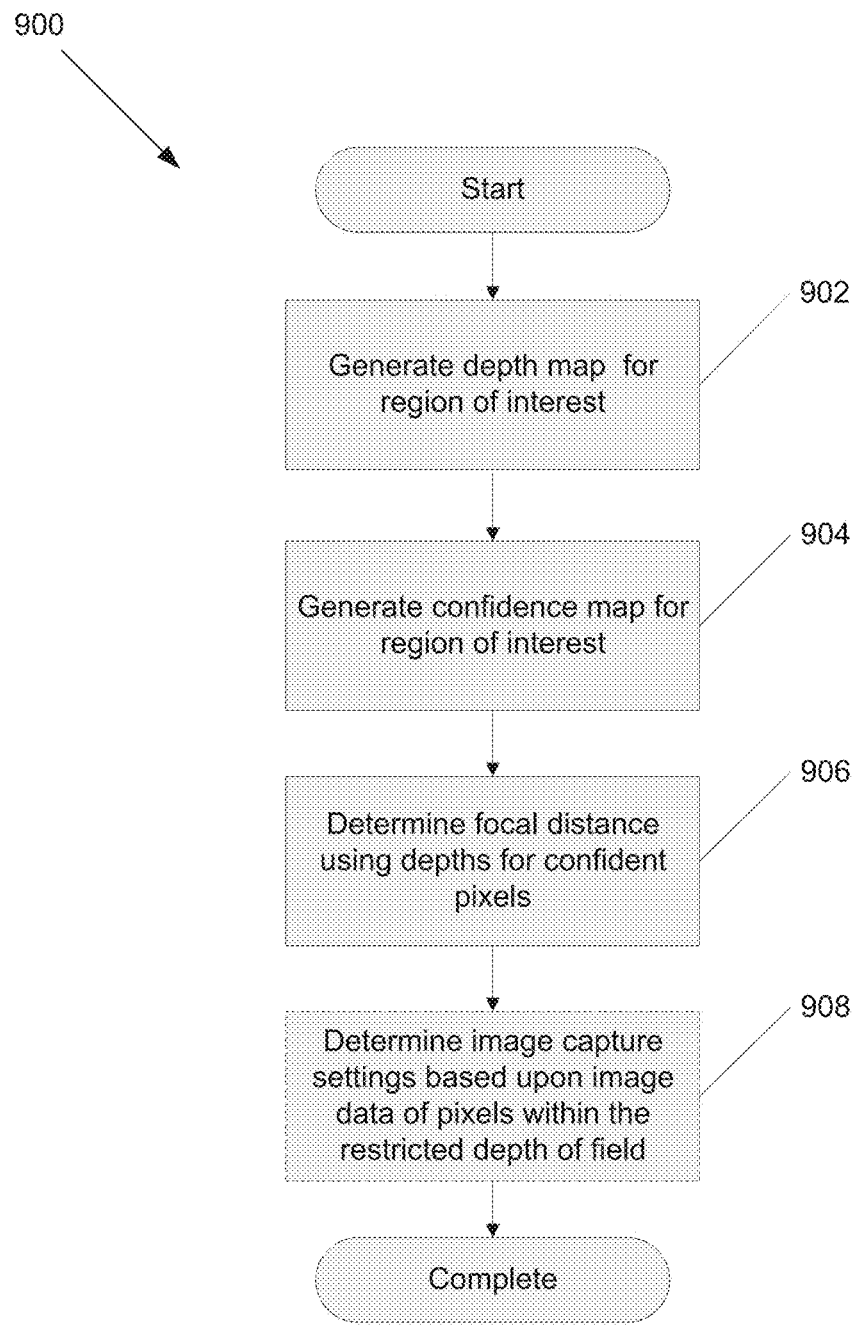
FIG. 9 is a flow chart illustrating a process for generating a depth map and confidence map in a region of interest and determining a plane of best focus within the region of interest in accordance with an embodiment of the invention.

A process for determining the depths of objects within a region of interest in accordance with an embodiment of the invention is illustrated in FIG. 9. The process 900 includes generating (902) a depth map for the region of interest and (904) a confidence map. The depth map and a confidence map can be utilized to identify the depth of objects within the region of interest for which depth is estimated with confidence (i.e. a confidence exceeding a predetermined threshold) that can be utilized to determine the depths of the objects and hence determine (906) an appropriate plane of best focus. In many embodiments, the plane of best focus can be determined to be the dominant depth of confident pixels located along intensity edges within the region of interest. In other embodiments, any of a variety of techniques can be utilized to select the desired best focus depth based upon the depths of pixels within a region of interest. In several embodiments, the determination of a plane of best focus and/or a restricted depth of field can be (optionally) utilized in determining (908) the image capture parameters that are utilized during image capture.

The mechanism of exposure provides adjustment of the device sensitivity to the light intensity in the scene. This is in part motivated by the limited dynamic range (ratio of highest to lowest light intensity) of the camera system compared to the dynamic range of intensities in the real world. In an image capture device, a metering and auto-exposure algorithm finds optimal values for the above parameters (some of these parameters may be specified or fixed). An auto-exposure algorithm aims to find the optimal exposure settings for the camera system by modifying a subset of the following parameters: exposure time, iris/lens aperture, sensor gain, and the use of neutral density filters. Auto-exposure algorithms may rely on external light meters/sensors or may evaluate optimal exposure time through the lens by successive image capturing as described above. In many legacy cameras auto-exposure algorithms run concurrently with image preview mode. Due to the fact that preview mode provides real time video, the auto-exposure algorithm is typically configured to make small adjustments in the exposure time since changes in exposure are immediately visible in the preview video. These small adjustments result in delays in identifying optimal exposure times. In a number of embodiments of the invention, a depth map is utilized to identify pixels within the restricted depth of field and the scene information obtained from the image data of the identified pixels is used to determine whether the image capture settings satisfy a set of predetermined criteria for parameters including (but not limited to) exposure, focus settings, shutter speed, aperture, and light sensitivity. In certain embodiments, an auto-exposure process performed based upon the image data of a subset of pixels with depths falling within the range(s) of distances corresponding to the restricted depth of field. In this way, the image capture parameters are determined based upon the pixels that are rendered at higher resolution. In many embodiments, processes are utilized that separately considers the impact of the image capture settings on pixels with depths within the range of distances corresponding to the restricted depth of field and for pixels with depths outside the range of distances corresponding to the restricted depth of field. For example, an initial set of image capture settings are determined based upon the pixels with depths within the range of distances corresponding to the restricted depth of field and then a verification process is performed to confirm that the image capture settings will not result in artifacts with respect to pixels with depths outside the range of distances corresponding to the restricted depth of field. As can readily be appreciated, any process that can be utilized in the determination of image capture settings can be applied to the subset of pixels with depths within the range of distances corresponding to the restricted depth of field and/or any verification process can be applied to confirm the image capture settings are appropriate to the overall scene as appropriate to the requirements of specific applications in accordance with embodiments of the invention.

Figure 10:
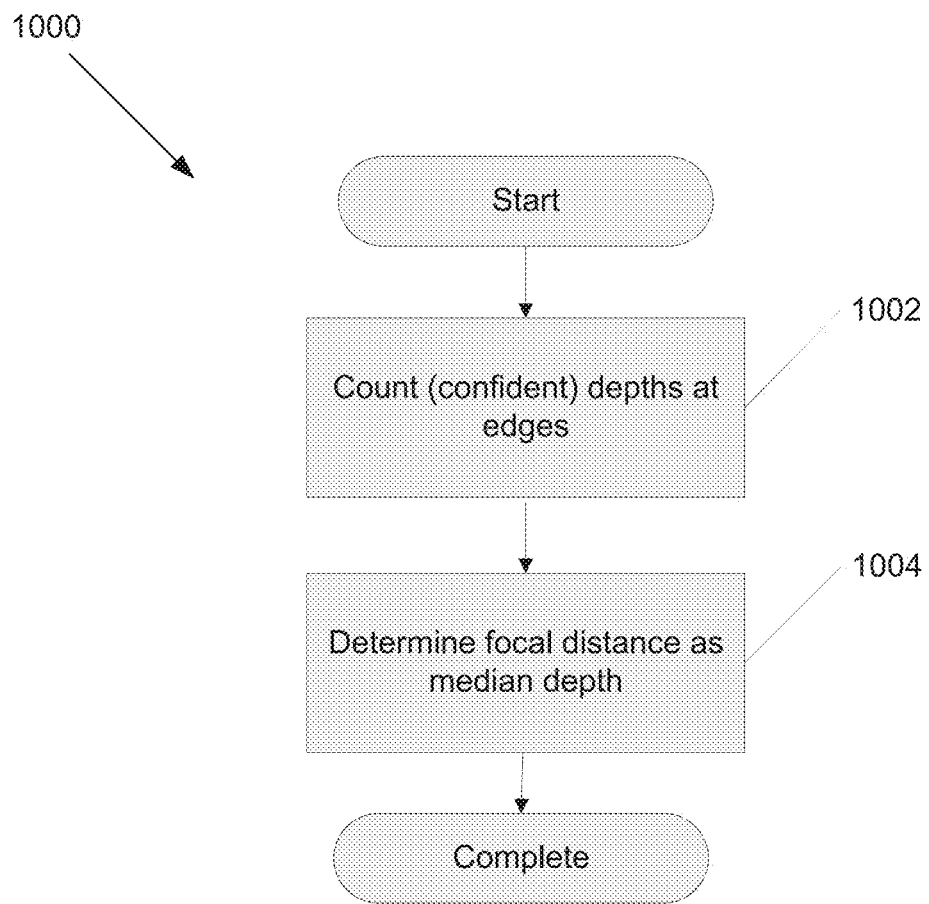
FIG. 10 is a flow chart illustrating a process for determining a plane of best focus based upon confident depths of objects within a region of interest in accordance with an embodiment of the invention.

A process for determining focal depth based upon depths of pixels located along intensity edges within a region of interest in accordance with an embodiment of the invention is illustrated in FIG. 10. The process 1000 includes counting (1002) the number of pixels located along intensity edges within the region of interest having specific depths or depths within specific ranges of depths. The focal depth can then be selected (1004) based upon the median pixel depth. In other embodiments, any of a variety of techniques can be utilized to determine focal depth based upon the depth of pixels located along edges within a region of interest.

Figure 11A:
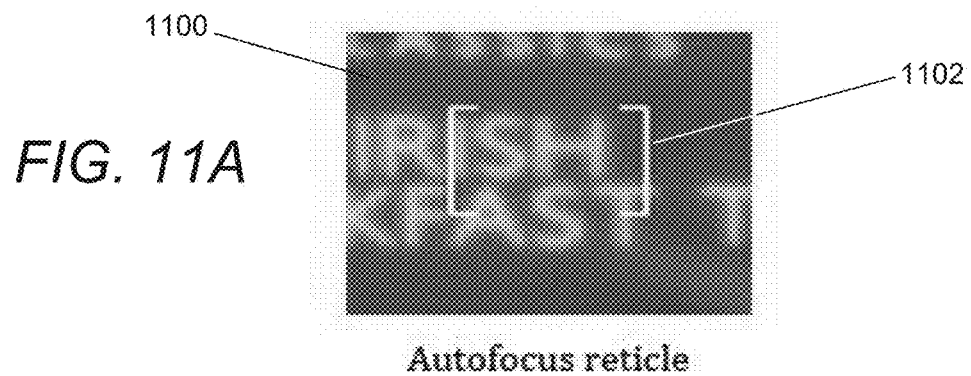
FIG. 11A illustrates a region of interest within a portion of an image captured by a Green camera within an array camera.
Figure 11B:
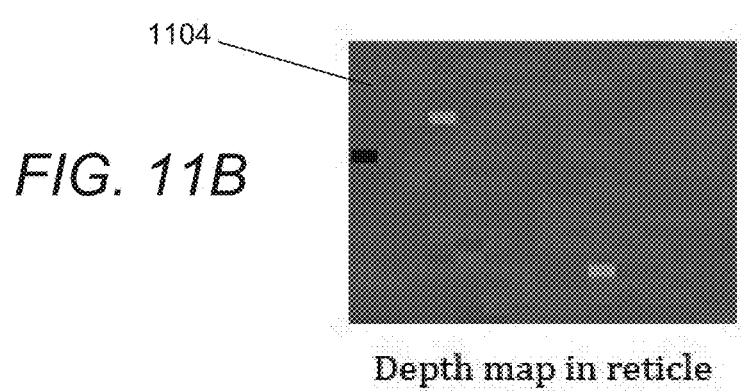
FIG. 11B illustrates a depth map for the region of interest shown in FIG. 11A.
Figure 11C:
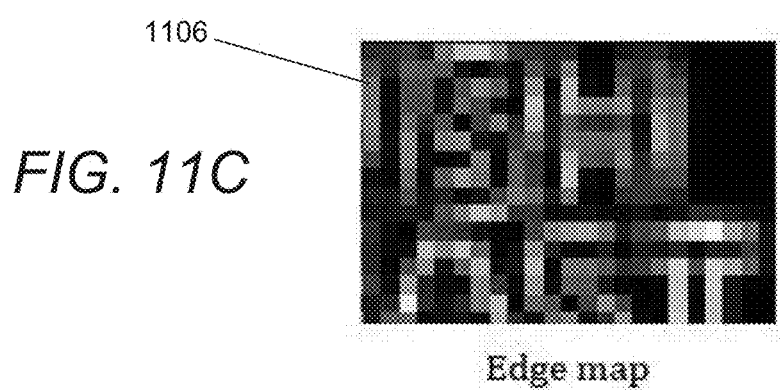
FIG. 11C illustrates an edge map for the region of interest shown in FIG. 11A.
Figure 11D:
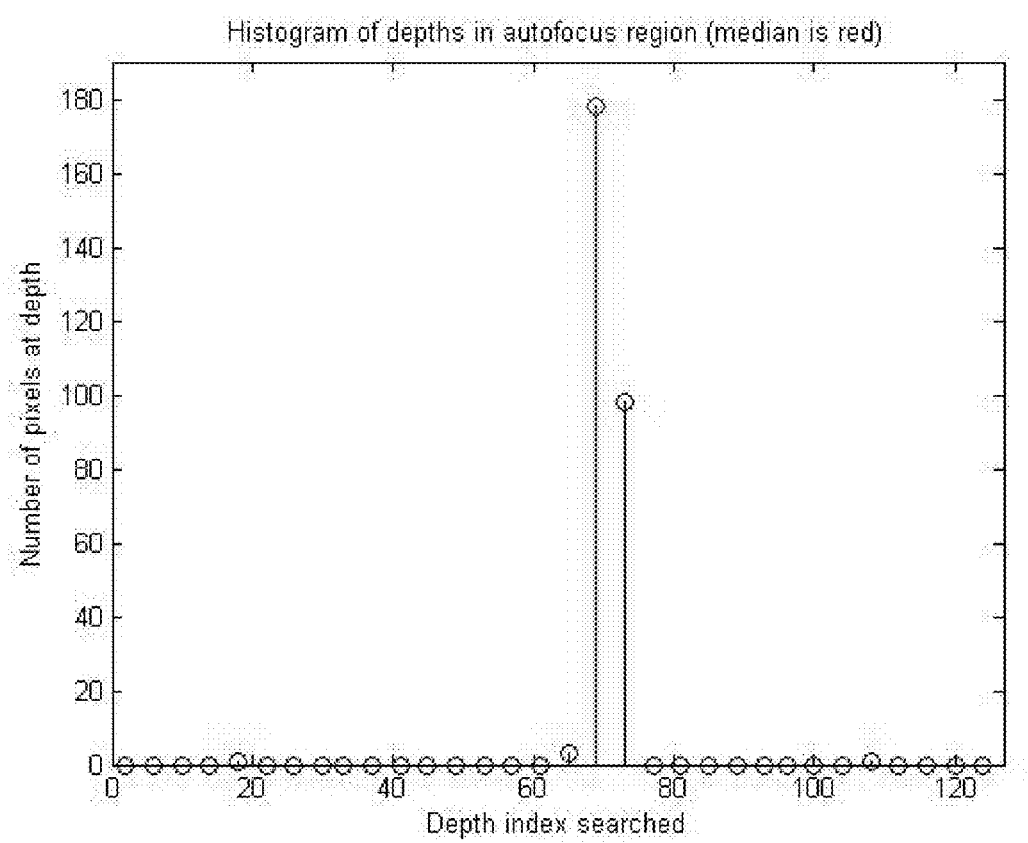
FIG. 11D is a chart showing a histogram of depth values for pixels within the region of interest shown in FIG. 11A.

The processes illustrated in FIGS. 9 and 10 can be understood with reference to FIGS. 11A-11D. A portion of an image constructed using image data captured by a Green reference camera in an array camera module in accordance with an embodiment of the invention is illustrated in FIG. 11A. The image portion 1100 includes a target 1102 defining a region of interest. A depth map of the region of interest shown in FIG. 11A is illustrated in FIG. 11B. Due to the resolution of the high resolution depth map 1104, the depth map contains a considerable amount of noise. The captured image 1100 can be utilized to generate the edge map 1106 shown in FIG. 11C. A histogram showing the depths of pixels within the edge map shown in FIG. 11C is illustrated in FIG. 11D. As noted above, any of a variety of techniques can be utilized to select a focal depth based upon the edge depth counts. In many embodiments, the median depth within the region of interest and/or of pixels along intensity edges within the region of interest is selected as the focal depth. In other embodiments, alternative criterion can be utilized to select focal depth based upon depth measurements of objects located within a region of interest as appropriate to the requirements of specific applications in accordance with embodiments of the invention.

Once a focal depth is determined, a depth of field can be automatically generated as described above and/or selected by the user. In many embodiments, focal depth is determined with respect to frames of video sequences captured by an array camera. Once a focal depth is determined based upon an edge and/or object in a first frame, object tracking can be utilized to determine focal depth for subsequent frames. Alternatively, a process for determining focal depth can be independently applied to each new set of frames in the set of video sequences. In many embodiments, time based filtering is applied to the focal depth to prevent rapid jumps in focal plane depth. In certain embodiments, focal plane depth information from one or more previous frames can be utilized to determine focal plane depth in a set of frames in which a distance to an intensity edge and/or object cannot be confidently determined. In this way, the automated process of determining a focal plane depth can leverage information from previously captured frames of video. Using the focal depth and the depth of field, a restricted depth of field depth map can be generated for image data captured by the array camera. Processes for generating restricted depth of field depth maps in accordance with embodiments of the invention are discussed further below.

Restricted Depth of Field Depth Maps

The process of generating a depth map is described in general above and in U.S. Patent Application Ser. No. 61/691,666, incorporated by reference above. The computational complexity of generating a depth map can be reduced in a variety of ways including (but not limited to) varying the resolution and/or precision of depth estimation of the depth map. The precision of depth estimation of a depth map for a given reference image can be varied by changing the sampling frequency of the depth range that objects in the scene span. The spatial resolution of the depth map can be varied by modifying the resolution of the areas within the reference image for which depth information is computed within the depth map. Processes for varying the precision of depth estimation of depth measurements and/or for varying the spatial resolution of the areas within the reference image for which depth information is obtained based upon whether pixels in a reference image sample an object within the scene that is located within a selected depth of field are discussed further below.

Varied Precision Depth Sampling

The process of determining depth using disparity between corresponding pixels in image data captured by a reference camera and an alternate view camera can involve searching (i.e. performing comparisons between a pixel from a reference image and pixels in an alternate view image) along an epipolar line. The number of depth samples (i.e. comparisons performed) taken along the epipolar line typically depends upon the array camera geometry and the camera baselines. An appropriate number of samples for a monolithic array camera can be in the order of 32 samples, but the number can change based upon quality criteria appropriate to the requirements of a specific application as well as the particular design parameters for the array being considered. For example, the number of depth samples taken along the epipolar line can depend on the size of the baselines, focal length, pixel size, number of cameras in the array, desired nearest resolvable depth, and the targeted super-resolution factor. In one embodiment, the depth samples are evenly distributed in disparity, which means that the samples are spaced the same distance apart along the epipolar line (which does not correspond to samples being taken at uniform object distances). For example, referring to the disparity relationship with respect to object distance measured for the array camera illustrated in FIG. 5, a maximum disparity of 40 pixels is observed at an object distance of 20 cm (i.e. the minimum focal distance for the array camera). Dividing the maximum disparity of 40 pixels by 32 samples suggests sampling every 1.25 pixels along the epipolar line from the minimum anticipated disparity, which in the case of the array camera illustrated in FIG. 5 is 0.8 pixels at infinity. Therefore, depth samples can be performed initially at 0.8 pixels along the epipolar line, and then at 2.05, 3.3, etc. up to 40 pixels. As can readily be appreciated, reducing the number of depth samples (a technique for reducing depth estimation precision) reduces the number of computations needed to generate the depth map. In many embodiments, selection of a desired best focus depth and a limited range of in-focus depths enables one to limit higher density depth sampling to only occur within the in-focus regions and allows lower density depth sampling in the range of out-of-focus depths.

Figure 12:
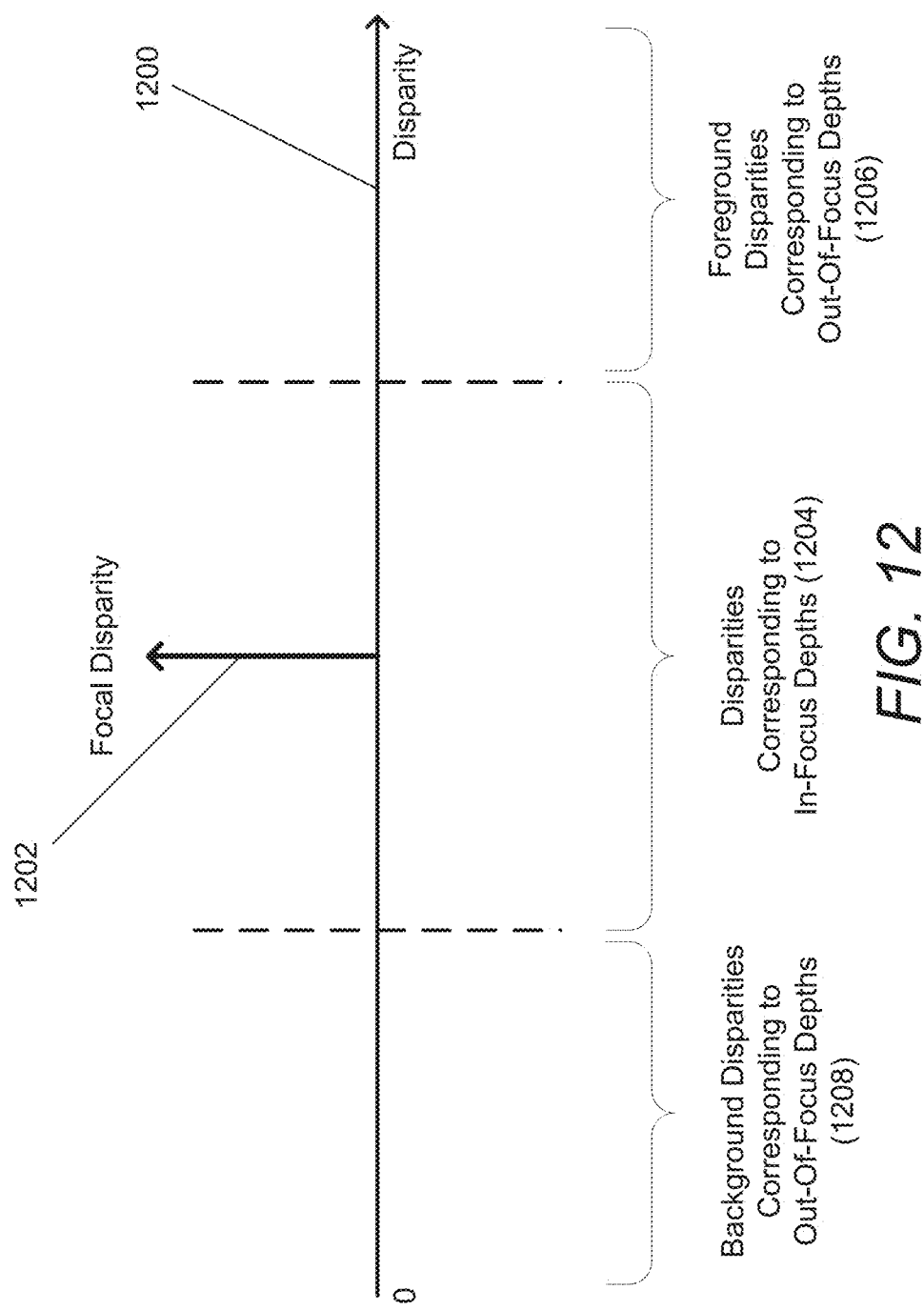
FIG. 12 conceptually illustrates the selection of a focal depth and depth of field when capturing image data using an array camera in accordance with embodiments of the invention.

A process of determining the precision of depth searches by performing higher density depth samples within a selected range of disparities corresponding to a range of in-focus depths can be appreciated with reference to FIG. 12. The disparity along the epipolar line 1200 corresponding to a selected desired depth of best focus 1202 can be determined as can the range of disparities along the epipolar line corresponding to a selected range of in-focus depths 1204. Disparities corresponding to a foreground range of out-of-focus depths (1206) and a background range of out-of-focus depths (1208), which are both outside of the range of in-focus depths (1204), can be determined. In several embodiments, the density with which depth samples are taken can be greater within the range of in-focus depths than within the foreground and background (i.e. the range of disparities corresponding to out-of-focus depths). Consequently, the depth map can be considered to have different precisions of depth estimation within the range of disparities corresponding to in-focus and out-of-focus ranges. As discussed further below, the reduced computational complexity of performing a depth search along the epipolar line results in increased blur or lack of sharpness for pixels that image objects within the out-of-focus regions of the scene. In many embodiments, the density of depth sampling is gradually increased and decreased in the transition along the epipolar line between disparities corresponding to depths that are bordering the ranges of in-focus and out-of-focus disparities.

Figure 13:
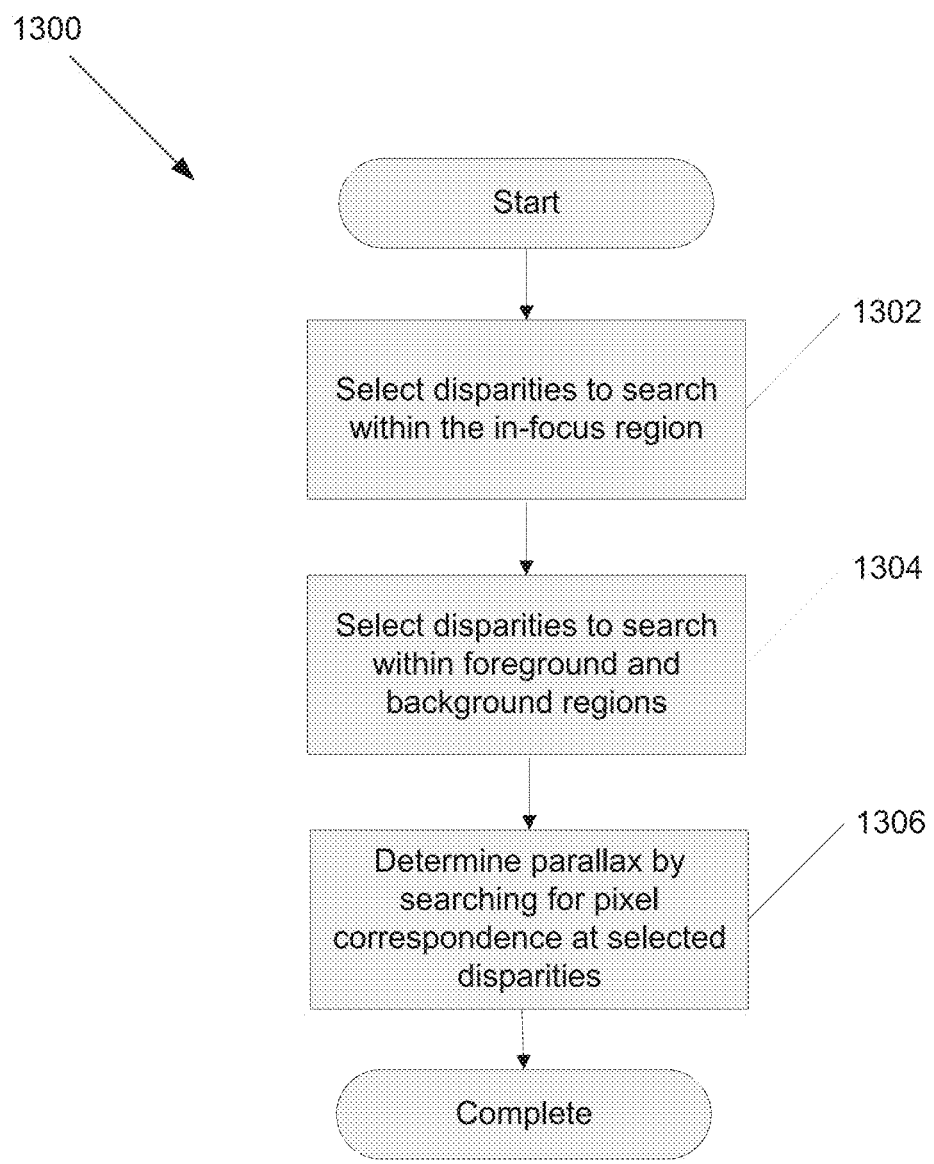
FIG. 13 is a flow chart illustrating a process for selecting disparities to search during the creation of a depth map based upon a selected focus depth and depth of field in accordance with an embodiment of the invention.

A process for performing a parallax detection search using different depth sample densities along an epipolar line based upon a selected focal depth and depth of field in accordance with an embodiment of the invention is illustrated in FIG. 13. The process 1300 includes selecting (1302) disparities to search within the in-focus region. The selected disparities can be uniformly distributed across the range of disparities within a range of in-focus depths or can be distributed with spacing that provides a smooth transition across disparities at the edges of the range of disparities corresponding to the in-focus region. Similarly, disparities to search within the disparity ranges corresponding to disparities outside the range of in-focus depths can also be determined (1304). By performing depth samples at the selected disparities, parallax can be detected (1306). In many embodiments, the disparities are selected in an offline process and are retrieved from memory based upon the selected focal depth and/or depth of field. In a number of embodiments, the disparities are selected during the synthesis of an image based upon the selected focal depth and/or depth of field.

Figure 14:
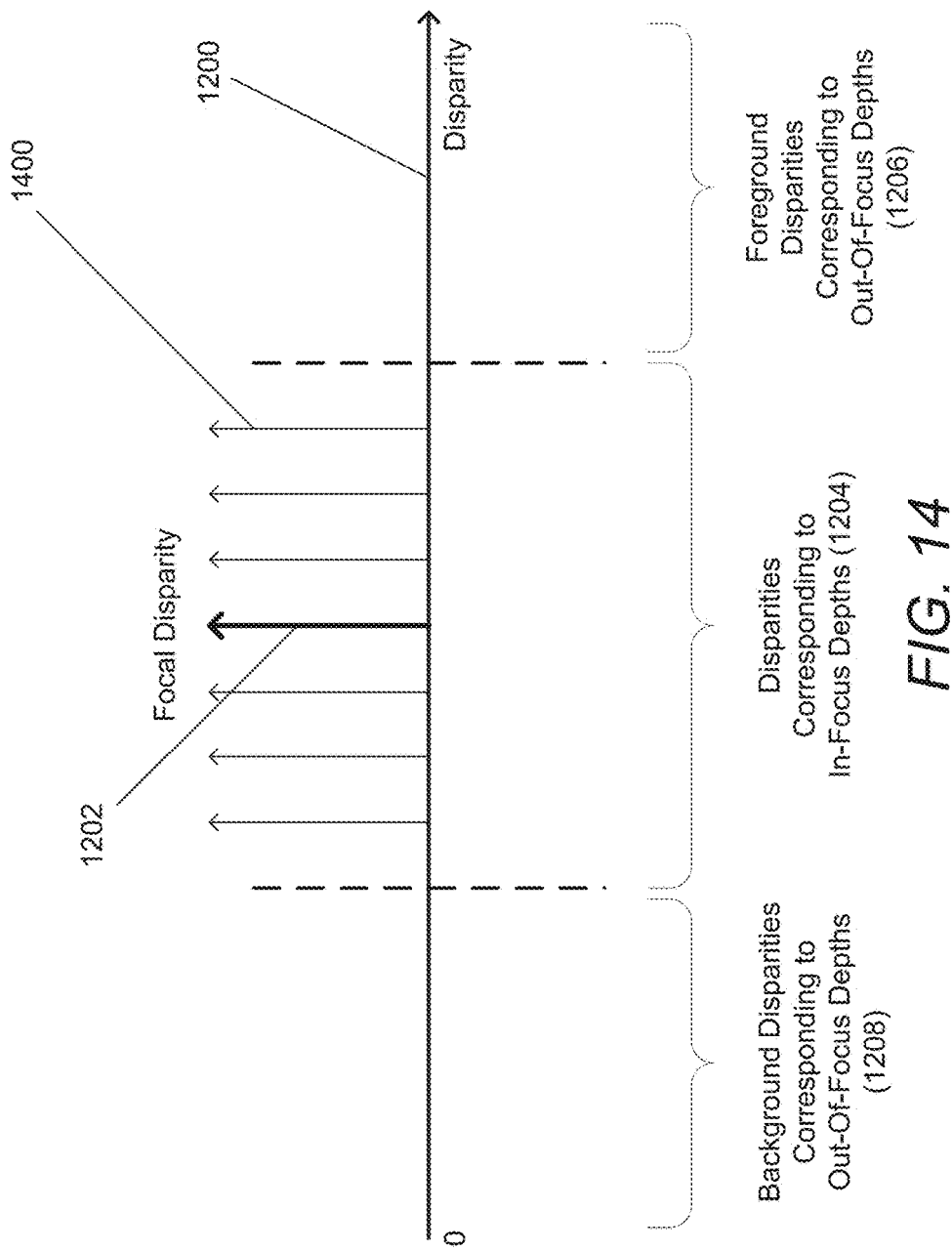
FIG. 14 conceptually illustrates pixel locations searched along an epipolar line corresponding to depths within a selected depth of field when determining depth in accordance with embodiments of the invention.
Figure 15:
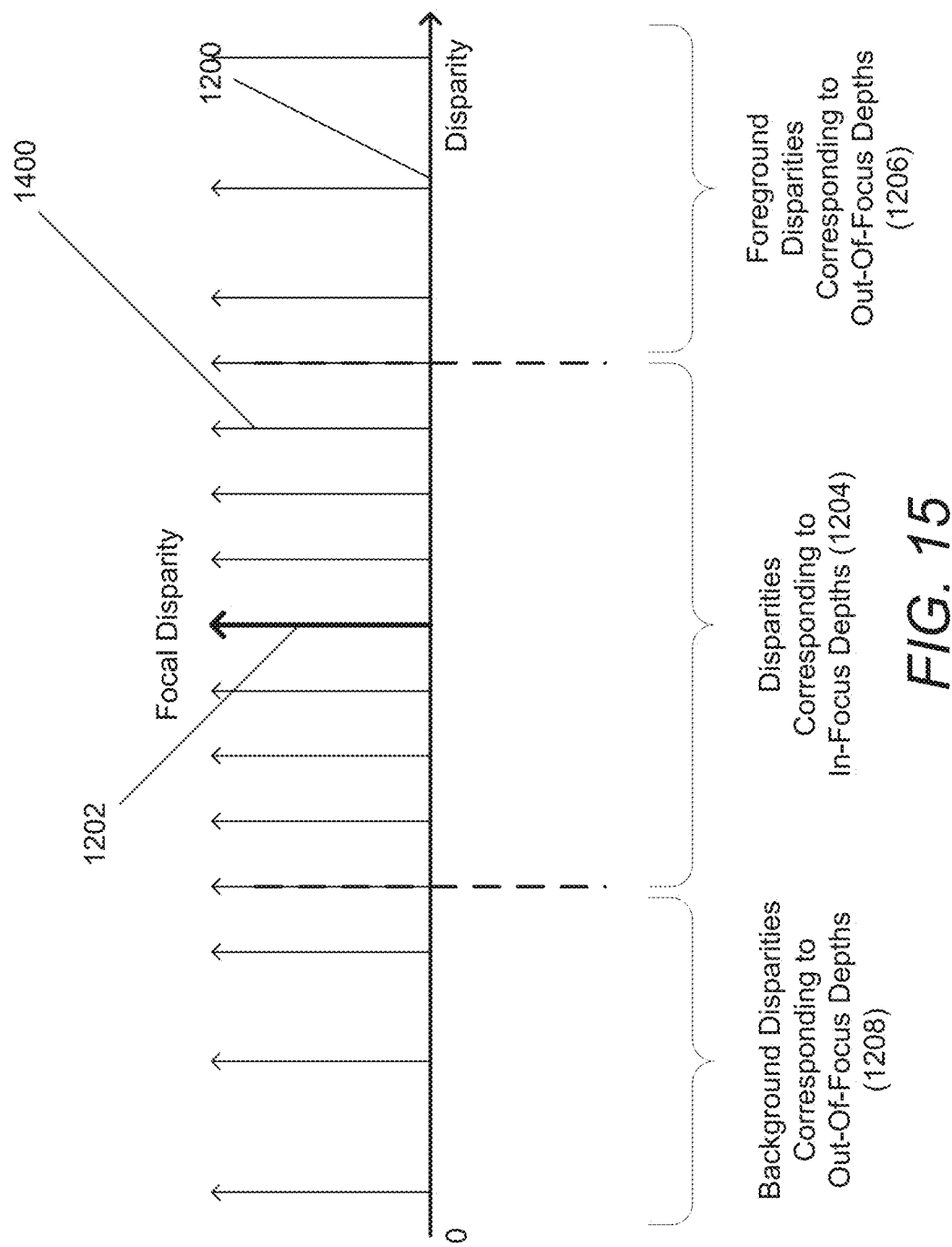
FIG. 15 conceptually illustrates pixel locations searched along an epipolar line corresponding to depths within a selected depth of field and locations corresponding to depths outside the selected depth of field when determining depth in accordance with embodiments of the invention.

The processes described above with reference to FIG. 13 can be understood with reference to FIGS. 14 and 15. Selection of uniform depth samples 1400 across the range of disparities corresponding to a selected depth of field is conceptually illustrated in FIG. 14. In many embodiments, rendering the in-focus region of an image involves placing pixels onto a higher level fusion grid and the precision with which depth is sampled is determined based upon the resolution of the higher level fusion grid. For example, super-resolution processes that increase resolution by a factor of two utilize a fusion grid with pixel spacing equivalent to 0.5 a low resolution pixel. Therefore, a disparity search with at least a 0.5 low resolution pixel resolution can be performed to generate a restricted depth of field depth map with sufficient precision to perform super-resolution processing of pixels that sample objects within the scene located within the selected depth of field. In many embodiments, the array camera estimates depth by performing depth samples at distances separated by a distance equal to or less than the size of a pixel multiplied by the inverse of a super-resolution factor by which the super-resolution process increases the resolution of the synthesized images relative to the resolution of the captured low resolution image data within a disparity range corresponding to the selected depth of field, and by performing depth samples at distances separated by a distance equal to more than the size of a pixel multiplied by the inverse of the super-resolution factor within disparity ranges outside the selected depth of field. Typically, the super-resolution ratio can be determined as the ratio of the resolution of the reference image data and resolution of the grid on which the synthesized image is formed within the selected depth of field of the image.

A lower density of depth sampling can be performed with respect to disparities corresponding to depths outside of the range of depths which are rendered in-focus. Selection of additional depth samples 1500 in a foreground region and a background region to smoothly transition between regions of the image containing objects within the depth of field and regions of the image that do not contain objects within the depth of field is illustrated in FIG. 15. In several embodiments, a minimum number of depth samples is performed in each of the regions outside of the depth of field to provide a threshold level of registration so that pixels from different color channels can be aligned with sufficient precision to reduce the incidence of color artifacts within the out-of-focus regions in a synthesized image. In other embodiments, any of a variety of factors can be utilized in selecting depth samples within disparity ranges corresponding to depths outside of a selected range of in-focus depths. Although specific depth sample selections involving depth samples that are evenly spaced with respect to disparity within the range of in-focus depths and are unevenly spaced with respect to disparity outside the range of in-focus depths are conceptually illustrated in FIG. 15, any of a variety of processes can be utilized to select depth samples to achieve a higher density of depth samples with respect to disparity within a selected restricted depth of field in accordance with embodiments of the invention. In many embodiments, processing efficiencies can be achieved by generating an initial depth map in which a coarse depth estimation precision is utilized. A determination can then be made as to which pixels are likely to image objects located at in-focus depths based upon the depth estimates in the initial depth map and higher precision depth estimates obtained for at least some of those pixels. In this way, the number of disparities searched for pixel locations that image objects located at out-of-focus depths can be reduced, reducing overall computation within the image processing pipeline.

Parallax Detection at Multiple Spatial Resolutions

The discussion of FIGS. 12-15 above describes how the number of depth samples used when generating a depth map can be reduced by reducing the number of depth samples searched with respect to disparities corresponding to object depths falling outside of a selected range of in-focus depths. Ideally, the out-of-focus regions possess smoothly increasing blur as distance from the focal depth increases. The smoothness of the transition is largely dependent upon the number of depth samples performed with respect to disparities corresponding to object depths falling outside of a selected range of in-focus depths. In many embodiments, computational efficiencies can be achieved when performing disparity searches with respect to pixels with disparities corresponding to object depths falling outside of a selected restricted depth of field by performing the depth searches at lower pixel resolutions. In several embodiments, these depth searches are performed by downsampling the captured image data and performing depth searches in these downsampled images. For example, a depth search in the manner described above can be performed with respect to the captured image data, a second depth search can be performed with respect to downsampled image data having a resolution of one quarter the resolution of the original image data, and a third depth search can be performed with respect to downsampled image data having a resolution of one sixteenth the resolution of the original image data. Alternatively, a depth search can first be performed with the downsampled image data and additional depth searches performed with the original image data (and/or downsampled but higher spatial resolution image data) based upon the initial coarse depth estimates obtained with the downsampled image data. In other embodiments, any number of depth searches involving any combination of downsampled image resolutions can be performed. The resulting depth information can be composited and the depth measurements in the composited depth map can provide higher precision compared to using only a few depth samples without incurring considerable computational overhead. By performing depth estimation using lower spatial resolutions in portions of the depth map corresponding to regions of a reference image that sample portions of the object space that lie outside of the selected depth of field, a greater number of disparities can be searched for a given computational budget. In this way, smoother transitions in blur can be obtained at a given computational load through multi-resolution image compositing in the out-of-focus regions of the synthesized image.

Figure 16:
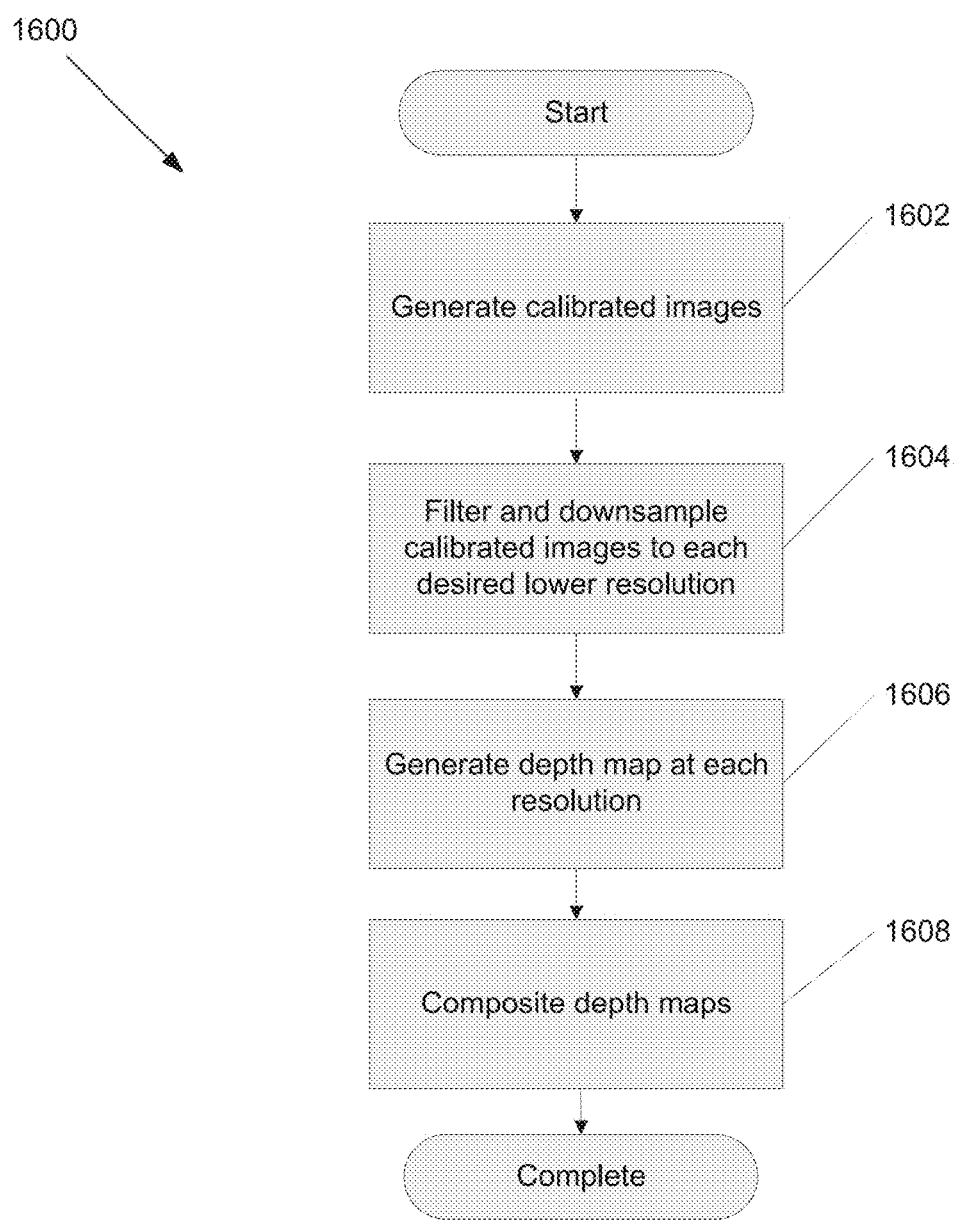
FIG. 16 is a flow chart illustrating a process for generating restricted depth of field depth maps by compositing depth maps generated using downsampled image data captured from a reference viewpoint and from alternate viewpoints in accordance with an embodiment of the invention.

A process for generating a restricted depth of field depth map using different spatial resolution depth estimates in accordance with an embodiment of the invention is illustrated in FIG. 16. The process 1600 includes generating (1602) calibrated images by performing processes including (but not limited) to applying scene independent geometric corrections to the image data captured from different viewpoints to facilitate parallax detection using searches for corresponding pixels along epipolar lines. The calibrated image data can be down-sampled (1604) and then (portions of) depth maps generated (1606) at each resolution. The resulting (portions of) depth maps can then be composited (1608) to obtain a single restricted depth of field depth map for use in the synthesis of a higher resolution image.

Figure 17:
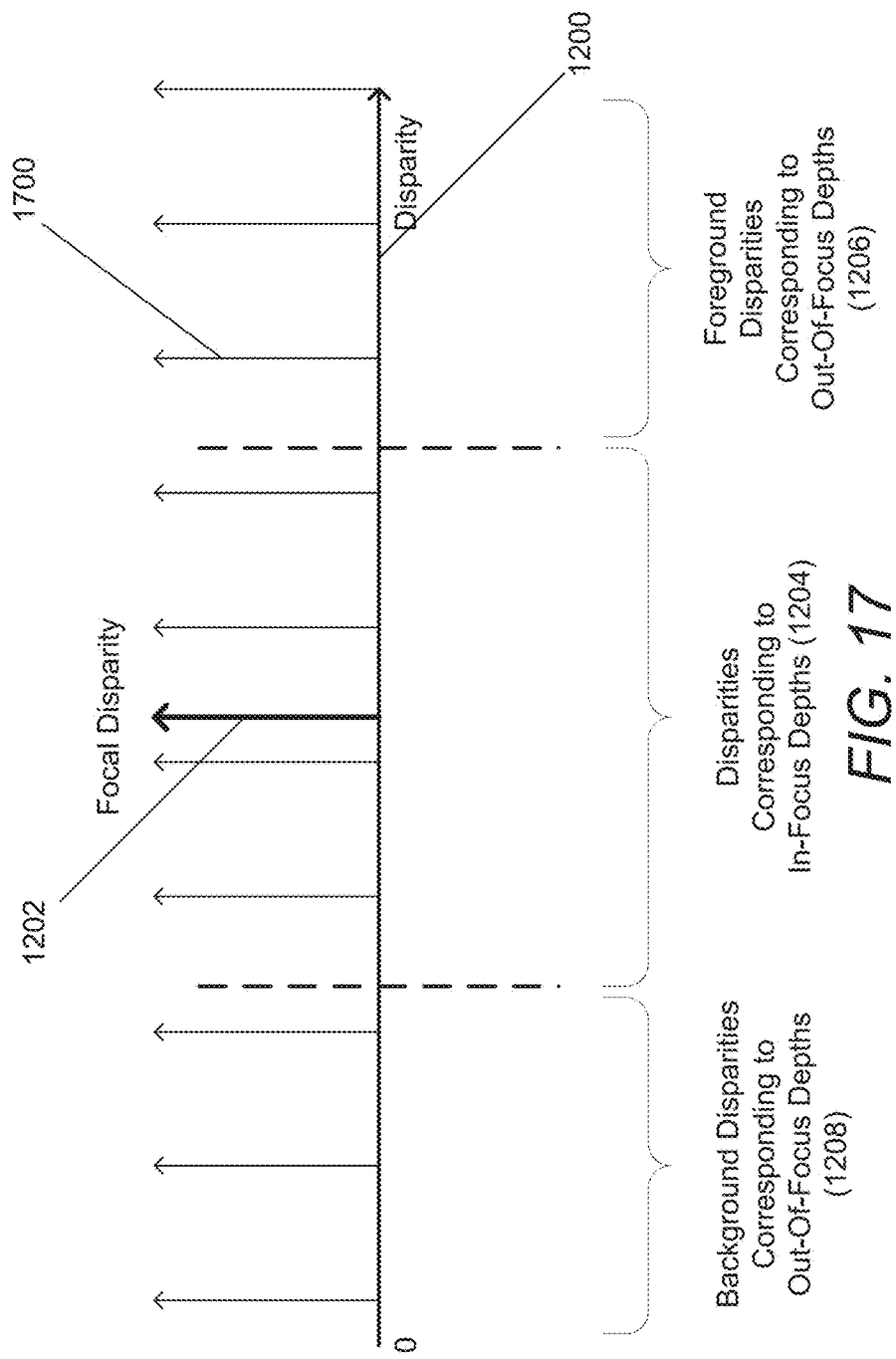
FIG. 17 conceptually illustrates pixel locations within a downsampled image searched along an epipolar line when determining depth in accordance with an embodiment of the invention.

In several embodiments, the finest spatial resolution depth map can be generated using the approach to varying precision of depth estimates when performing depth sampling described above. In other embodiments, the finest resolution depth map can be generated using depth samples that are uniformly distributed with respect to disparity. Similarly, depth maps with respect to down-sampled images can be generated using the approach to varying precision of depth estimates when performing depth sampling described above or using depth samples that are uniformly distributed with respect to disparity. Depth samples used to determine depth with respect to down-sampled pixels that are uniformly distributed with respect to disparity are conceptually illustrated in FIG. 17. In several embodiments, the low spatial resolution depth samples 1700 are selected to provide depth information at one or more depths that may or may not be sampled during the generation of a higher spatial resolution depth map. Combining these additional depth measurements from lower spatial resolution images with the sparsely sampled depth map at the highest image pyramid resolution, a final L0 level depth map can be constructed with additional precision than the sparsely sampled depth map alone. This increased precision obtained with only marginal computational overhead allows for gradual blur differences along smoother depth transitions in out-of-focus regions of the image. In the illustrated embodiment the depth samples are performed at disparities that are not uniformly distributed around the plane of best focus. In many embodiments, the depth samples are performed at disparities that are uniformly distributed around the plane of best focus.

Figure 18A:
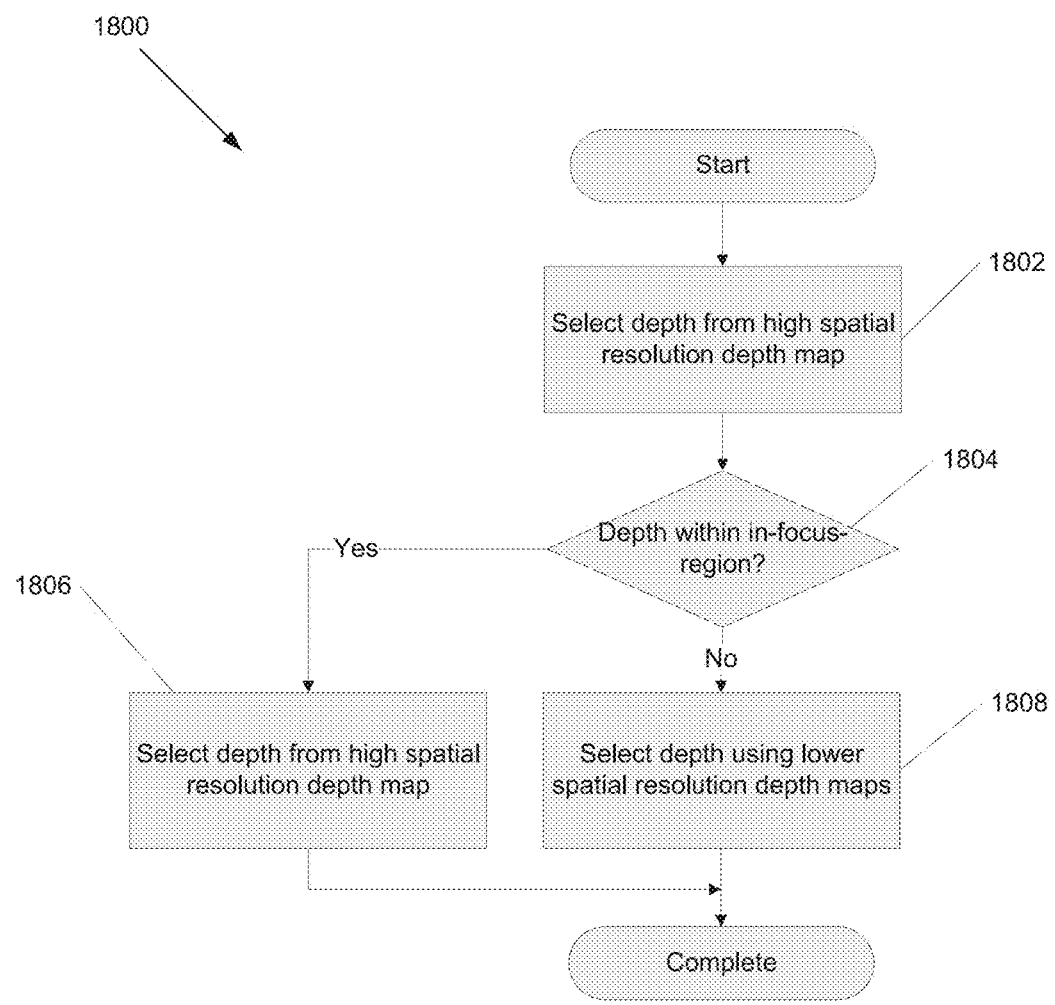
FIG. 18A is a flow chart illustrating a process for determining the depth to assign to a pixel based upon a plurality of depth maps having different resolutions in accordance with an embodiment of the invention.

Another process for assigning a depth measurement from a plurality of depth maps determined at different resolutions is illustrated in FIG. 18A. The process 1800 includes selecting (1802) a depth for a pixel location within a reference image from the high resolution depth map. A determination (1804) is made concerning whether the depth is within a selected depth of field. When the estimated depth is within the selected depth of field, the highest resolution depth map will provide the highest precision depth measurement and so the depth from the highest resolution depth map is used (1806) to populate the depth map for the selected pixel location in the reference image. When the depth is outside the selected depth of field where the disparity sampling density in the L0 level is sparse, the confidence of the depth estimate may be low. In such cases a lower resolution depth map (i.e. a depth map generated using down-sampled image data) is likely to contain a more accurate depth measurement and the depth of the pixel can be utilized to select the specific lower resolution depth map to use. Typically, the further the depth estimate for the pixel is from the depth in focus, the larger the desired level of blur for the pixel in the synthesized image. To obtain this effect, depth estimates of pixels with depths increasingly further from in-focus depth regions are composited from lower resolution images formed with larger downsampling factors. The depth measurement from the lower resolution depth map can then be assigned (1808) to the pixel location within the reference image.

In many embodiments, a confidence map quantifying the level of accuracy expected with the depth estimate at each pixel location is generated with respect to each of the depth maps within the pyramid of depth maps and these confidence maps can be utilized when selecting a depth to assign to a pixel.

In many embodiments, the computational complexity of generating a pyramid of depth maps at different resolutions can be reduced by eliminating the need to recalculate the depth at every pixel location. In many embodiments, this can be achieved by selectively propagating depth measurements from one or more lower spatial resolution depth maps to one or more higher spatial resolution depth maps. The selectivity criteria for propagating depths across one or more pyramid levels can be highly beneficial in speeding up the depth calculation process for finer precision of depth estimation and/or resolution pyramid levels without sacrificing accuracy of the depth estimates. In many embodiments, the selective criterion for propagating depths across pyramid levels is the depth estimate for a pixel and/or the (confident) depth estimates for pixels in a neighborhood surrounding a pixel. In other embodiments, the selective criterion can be based on the position of the pixel with respect to the amount of texture in the neighborhood. If a pixel lies in a region devoid of considerable high frequency content such as edge transitions or textures, we can classify the pixel to belong to a "textureless region" of the image. In an embodiment, such regions can be identified by their low signal-to-noise ratio (SNR). There are typically a much larger number of such low SNR pixels in an image than the number of edge or texture pixels in an image. In the varying depth estimation precision framework described above, the reduction of noise in the coarser pyramid levels of the image data can lead to reduction of random variations in the corresponding depth estimates, especially in the textureless regions of a reference image. However, reducing variation does not necessarily imply a statistically more accurate estimate of depth (estimation variance may be exchanged for bias). Achieving a smoother depth map in flat areas, however, can provide for more localized data access patterns when performing super-resolution operations. Therefore, significant computational savings can be achieved by utilizing depth estimates obtained at a coarser resolution layer of a depth map pyramid as the depth estimates in a higher resolution depth map for pixels within regions of the higher resolution image that exceed a specific smoothness threshold.

Figure 18B:
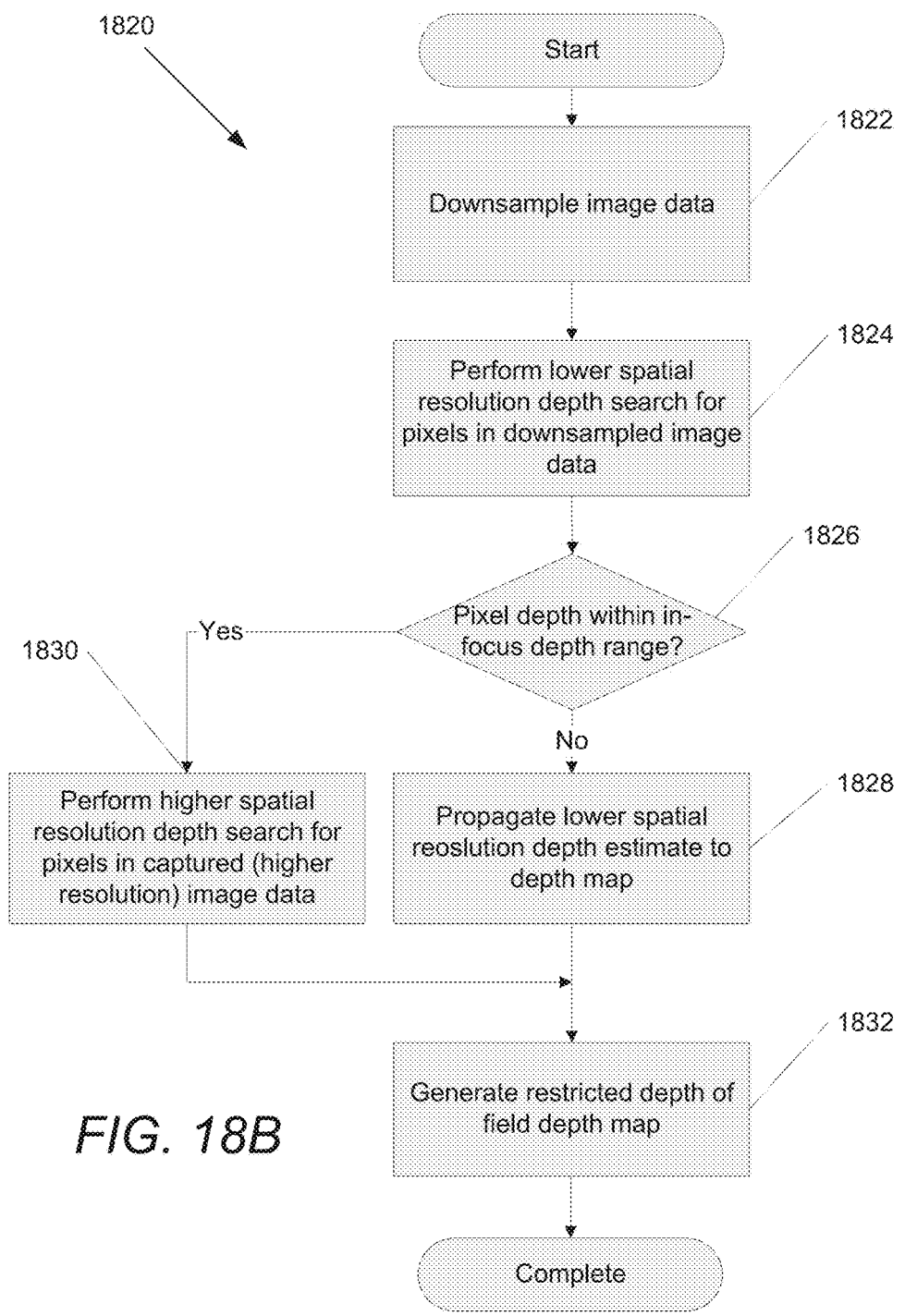
FIG. 18B is a flow chart illustrating a process for propagating depth estimates from coarser spatial resolution depth maps to higher spatial resolution depth maps based upon the values of the lower spatial resolution depth estimates in accordance with an embodiment of the invention.

A process for propagating depth estimates from coarser spatial resolution depth maps to higher spatial resolution depth maps based upon the values of the lower spatial resolution depth estimates in accordance with an embodiment of the invention is illustrated in FIG. 18B. The process 1820 includes downsampling (1822) captured image data to obtain at least one set of lower resolution images that can be used to perform (1824) a lower spatial resolution depth search. In many instances, the lower spatial resolution depth search is also a coarser precision depth search (i.e. larger steps in disparity along the epipolar line are searched than are performed in later higher spatial resolution depth searches). For each pixel in the restricted depth of field depth map, a decision (1826) is made using the lower spatial resolution depth estimates as to whether the pixel depth is within the in-focus range of depths. The decision can be based upon the depth and/or confidence of the lower spatial resolution depth estimate for the pixel location. In a number of embodiments, the decision is based upon the depth and/or confidence of the lower spatial resolution depth estimates of pixels in a neighborhood surrounding the pixel location. When a determination is made that a pixel is outside of the in-focus range of depths, then the lower spatial resolution depth estimate is propagated (1828) to the higher spatial resolution depth map. When a determination is made that a pixel is within the in-focus range of depths, then a higher spatial resolution depth search is conducted (1830). As noted above, pixels in a transition zone adjacent the desired depth of field can be treated as in-focus to reduce artifacts. Furthermore, other criteria including (but not limited to) the pixels being located within a textureless region of the image can be utilized to identify low spatial resolution depth estimates that can be utilized as the depth estimates for the same pixels in the higher spatial resolution depth map(s). In a number of embodiments, the higher spatial resolution depth search is also a higher precision depth search (i.e. the depth estimate is performed by searching narrower disparity intervals). In several embodiments, the higher spatial resolution depth search is accelerated by searching a bounded range or range(s) of disparities. The bounded range(s) can be determined based upon the depth and (optionally) confidence of the lower spatial resolution depth estimate for the pixel, or the depth and/or confidence of the lower spatial resolution depth estimates of pixels in a neighborhood surrounding the pixel location. A restricted depth of field depth map can be generated by combining the propagated lower spatial resolution depth estimates for pixels determined to have depths outside the in-focus range of depths and the higher spatial resolution depth estimates for pixels determined to have depths within the in-focus range of depths.

Figure 18C:
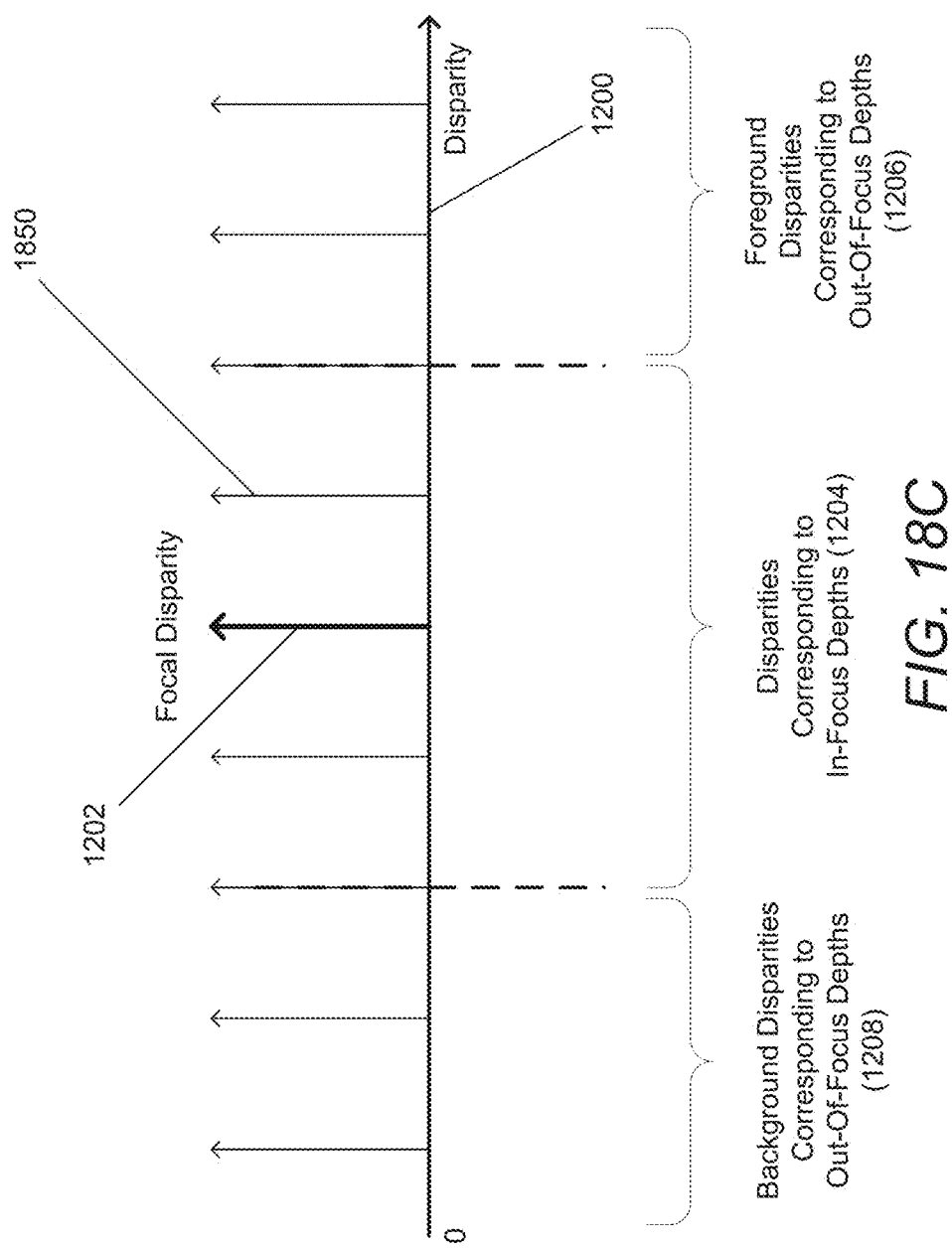
FIG. 18C conceptually illustrates a first coarse precision disparity search (optionally) performed using downsampled images.
Figure 18D:
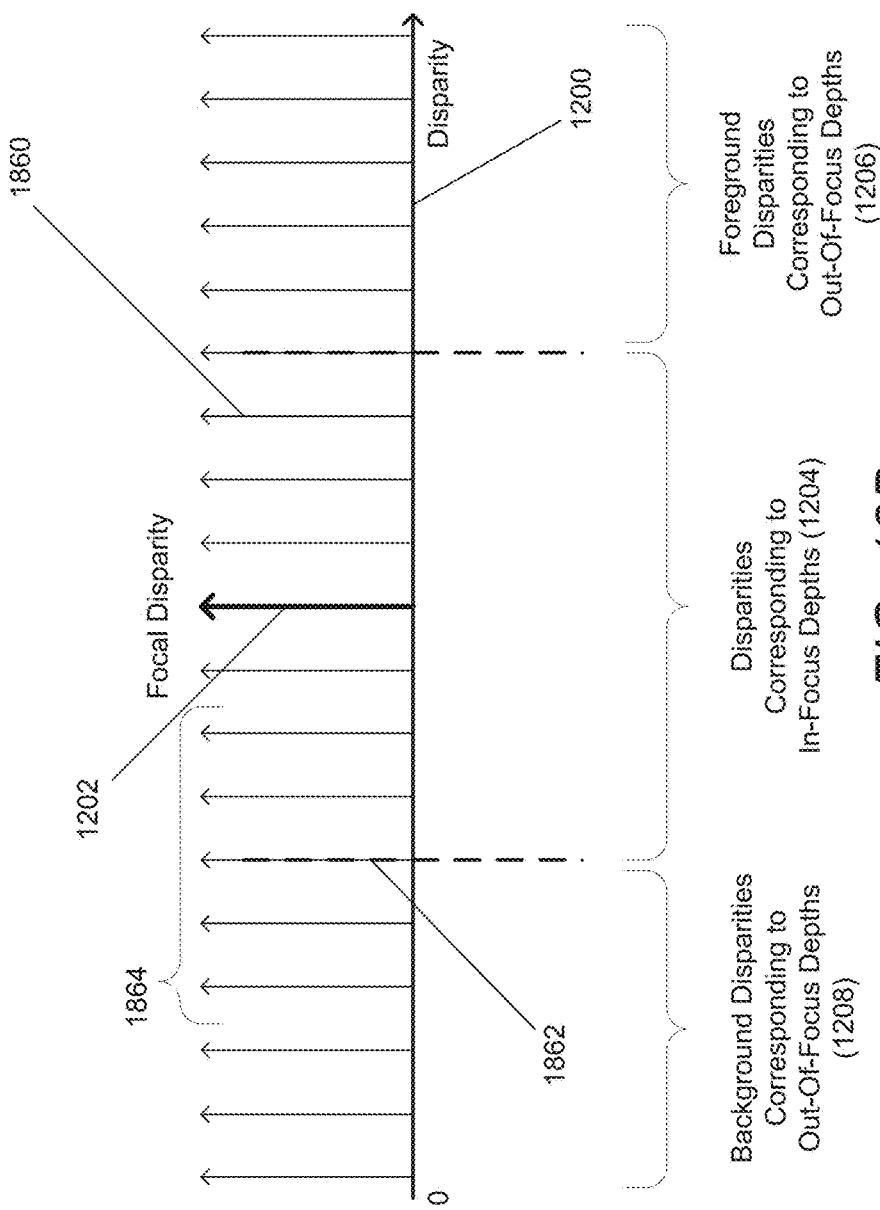
FIG. 18D conceptually illustrates a second higher precision disparity search performed within (at least) a range of distances corresponding to a restricted depth of field.

Depth sampling in a process that performs coarse depth estimates using a set of downsampled images and performs higher precision depth estimates using higher resolution images in a manner similar to that described above with respect to FIG. 18B is illustrated in FIGS. 18C and 18D. FIG. 18C conceptually illustrates a first coarse precision disparity search (optionally) performed using downsampled images. Based upon a determination concerning whether the pixel is within an in-focus range of depths, a higher precision disparity search is performed using the original resolution of the captured image data. A comparison of the disparities 1850 searched in FIG. 18C and the disparities searched in FIG. 18D reveals that the disparities 1850 illustrated in FIG. 18C are spaced further apart than the disparities 1860 illustrated in FIG. 18D. Although the disparities are shown as evenly spaced, non-uniform spacing can also be utilized in either disparity search. As noted above, the higher precision disparity search can be accelerated by seeding the search with the coarser precision depth estimate (e.g. 1862). Furthermore, the search can be bounded (e.g. 1864) based upon factors including (but not limited to) depth and/or confidence of the lower spatial resolution depth estimate for the pixel, or the depth and/or confidence of the lower spatial resolution depth estimates of pixels in a neighborhood surrounding the pixel location.

Although specific processes are described above with respect to FIGS. 18B-18D for generating a restricted depth of field depth map by generating an initial lower spatial resolution and/or coarser precision depth map, propagating depth estimates for pixels determined to image objects located at depths outside an in-focus range of depths, and generating higher spatial resolution and/or higher precision depth estimates for pixels within the in-focus range of depths, any of a variety of processes can be utilized to propagate depths from one or more lower spatial resolution and/or coarser precision depth map(s) to a higher spatial resolution and/or higher precision depth map to generate a restricted depth of field depth map in accordance with embodiments of the invention. A process for propagating depth estimates from lower spatial resolution and/or coarser precision depth maps to higher resolution and/or higher precision depth maps with respect to regions of an image satisfying a smoothness criterion in accordance with an embodiment of the invention is illustrated in FIG. 19.

Figure 19:
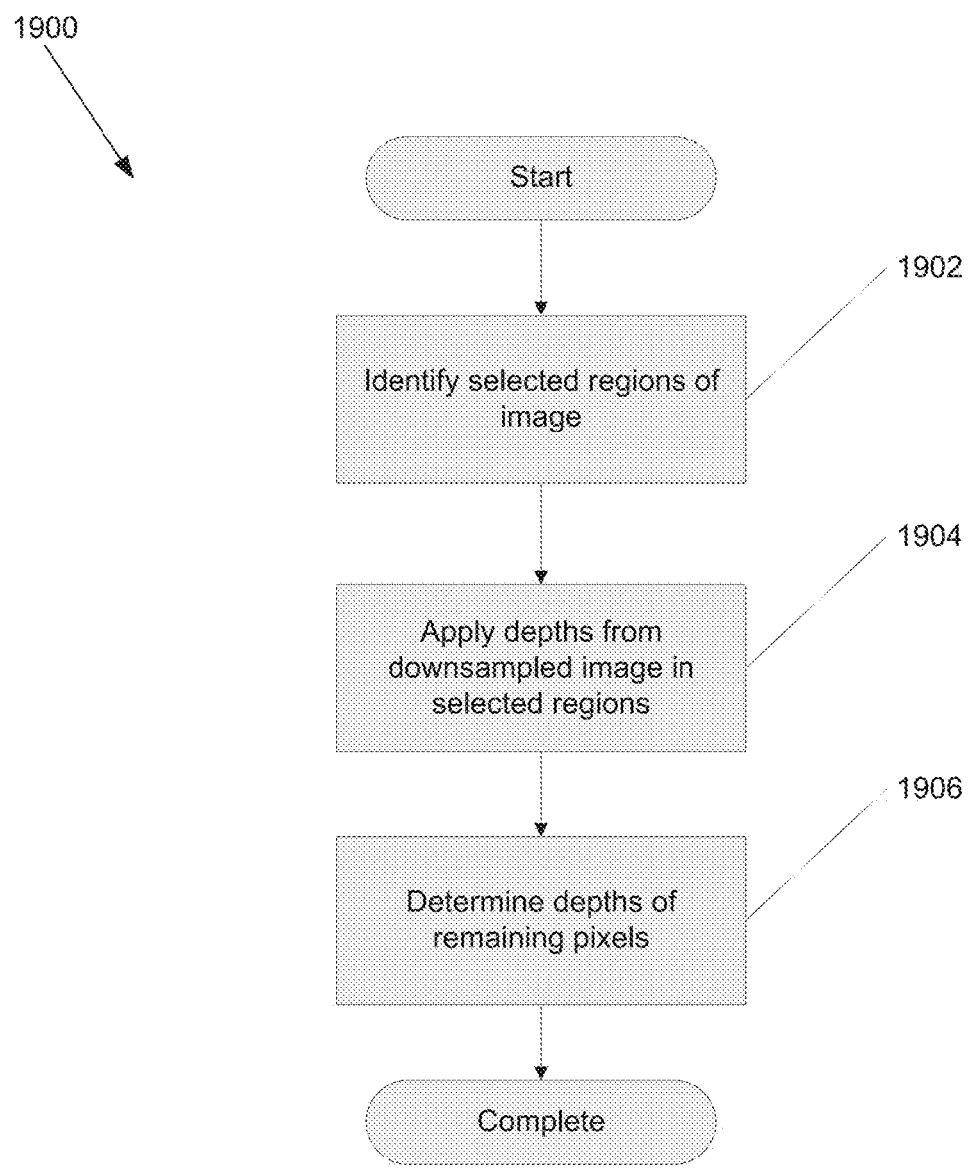
FIG. 19 is a flow chart illustrating a process for applying depths determined from downsampled images to selected regions of higher resolution images in accordance with embodiments of the invention.

The process 1900 illustrated in FIG. 19 includes identifying (1902) regions of the image in accordance with one or more smoothness criteria. In several embodiments, the smoothness criteria is designed to detect textureless regions. In a number of embodiments, any of a variety of criteria are used to select regions for which depth information is propagated in the manner outlined below. Depth estimates obtained from a downsampled version of the image are propagated (1904) into the higher resolution depth map for pixels within the identified regions of the image. The depths of pixels outside the selected regions are then determined (1906) and inserted into the higher resolution depth map.

Many of the depth propagation processes described above utilizes the ability to identify low SNR regions. This can be done for each resolution level (e.g., $L_0, L_1, \ldots, L_{N-1}$). The distribution of textureless regions within captured image data is typically scene dependent. Moreover, the level of noise in the image also influences the accurate identification of such regions. However, the noise level in any given pixel in the image can be, to some extent, estimated from a noise level curve that can be obtained from the calibration process of the array camera module. The noise level curve enables estimation of the noise variance for different intensity levels, given a certain analog gain (which corresponds to the light level in the scene). The estimated noise variance can guide selection of a threshold for classifying each pixel as positioned in a textured or textureless region.

Estimating the SNR at each pixel to identify the smooth regions can be computationally taxing for a real-time video image processing pipeline. Consequently, a threshold on the edge magnitude can be applied. In several embodiments, edge gradients in the horizontal and vertical directions are obtained from convolving the reference image with a low complexity edge detection kernel, such as a 3×3 Scharr operator. In other embodiments, any of a variety of approaches can be utilized to obtain information concerning edge magnitude. A conservative threshold can be selected to provide a low rate of false negatives (pixels identified as belonging to a textureless region when they actually do not). This reduces the likelihood that depths at finer edges of a finer resolution grid are populated from a coarser image as such edges may potentially not be present in the coarser resolution image leading to an erroneous depth estimate. Note that the decision of whether a particular depth is propagated to a finer resolution depth map can be based on the image gradient magnitude of the pixel intensity values of the finer as well as coarser resolution levels, while the depth estimate is obtained from one or more corresponding coarser resolution level in the depth map pyramid. In many embodiments, the decision can be based upon the depth and edge map of multiple corresponding levels in a pyramid of images and associated depth and edge maps.

In a particular implementation of the array camera, where a reference camera captures only a shallow range of light frequencies (for example, green color component only), the edge map from this limited scene information may not be adequate in ensuring accurate depths being propagated. Although not very prevalent, this may occur when two objects, one partially occluding the other in the line of vision of the reference camera, exhibit very similar signatures at frequencies which are captured by a reference camera, even though their actual colors can be considerably different (e.g. a green object on certain yellow backgrounds). If the reference camera captures predominantly green intensities, objects with a narrow range of intensity variation in the green channel may not be captured as an edge in the reference image despite possibly having a wider range of intensity variation in one or more other different color channels (e.g. red or blue). When identifying pixels for which depth need not be recalculated in the finer resolutions in a depth map pyramid, pixels that sample objects that have a narrow range of intensity variation in a single color channel can be incorrectly classified as low SNR regions for which depth will be propagated across pyramid levels. When depth is propagated across pyramid levels in the green channel in this manner, edges present in either (or both) of the red and blue color channels may not line up for these propagated depths during image synthesis, which can result in color bleeding and/or artifacts. As can readily be appreciated, similar effects can be observed in other color spaces. Additionally, pixels associated with such incorrect depths may lead to an unnatural level of blur, which can manifest visually as objectionable artifacts. In order to suppress such artifacts, the confidence of a depth estimate at a lower resolution can also be considered during propagation as an additional check to increase the likelihood that correct depths are propagated through to the finer resolution levels. Thus, in many embodiments, the depth for a pixel in the finer resolution is populated from a lower resolution grid when the pixel under consideration does not lie on or close to an edge, and when the depth being propagated has a high confidence, and this confidence map may take into account detections of possible regions that exhibit narrow intensity variation in some color channels but not in other color channels.

Using the mechanism outlined above, for any pyramid level (except the coarsest one), an image can be scanned to specify a mask of pixels for which the depth need not be recomputed. Depending on the scene content, and lighting conditions, the mask may not be very contiguous leading to a loss of parallelization (especially on an embedded platform). To further enhance speed, and retain the ability to translate and compute costs for a group of pixels at a time, the mask can be dilated so that the depth estimate for a group of pixels is computed or propagated from a lower resolution estimate. While this does reduce the number of pixels for which the depth needs to be recomputed, an overall gain in speed can be achieved through the ability to parallelize computations and lower memory reads.

Although various processes are described above for generating a restricted depth of field depth map using a pyramid of depth maps determined at different resolutions and/or by propagating depth estimates between the depth maps, any of a variety of processes for generating a restricted depth of field depth map providing depth information determined using different spatial resolutions and/or precisions can be utilized as appropriate to the requirements of specific applications in accordance with embodiments of the invention. In addition, while much of the above discussion references compositing of depth maps to create a restricted depth of field depth map incorporating smooth depth transitions, many embodiments of the invention utilize the pyramid of depth maps at different spatial resolutions and associated confidence maps (optionally) during image synthesis. Processes for synthesizing images using restricted depth of field depth maps in accordance with embodiments of the invention are discussed further below.

Synthesizing Images Using Restricted Depth of Field Depth Maps

A restricted depth of field depth map and/or pyramid of depth maps generated using the techniques discussed above can be used to generate a synthesized image with a high resolution in-focus region and blurry out-of-focus regions. The level of blur can mimic the behavior of a chosen F-stop or may implement an arbitrary blur profile (e.g. a blur characteristic that may not be physically realizable by a traditional camera architecture). Referring again to the process 600 illustrated in FIG. 6, an image can be synthesized by rendering (608) pixels with depths outside of a selected restricted depth of field and performing super-resolution processing (610) with respect to pixels with depths within the selected restricted depth of field. The rendered pixels (608) and the pixels synthesized through super-resolution processing (610) are composited (612) to obtain an image. In several embodiments, pixels in the out-of-focus regions of the image are rendered using scene dependent geometric corrections based upon depth information of each pixel and the distance of the object sampled by the pixel from a selected focal depth. The further the distance, the coarser the image data resolution levels used to render the pixel. In this way, successively higher levels of blur with distance from the selected focal depth are achieved in the rendering of pixels in the out-of-focus regions of an image. In many embodiments, the process of rendering a pixel involves blending one or more down-sampled versions of the pixel to increase the smoothness of blur within the out of focus regions.

Figure 20:
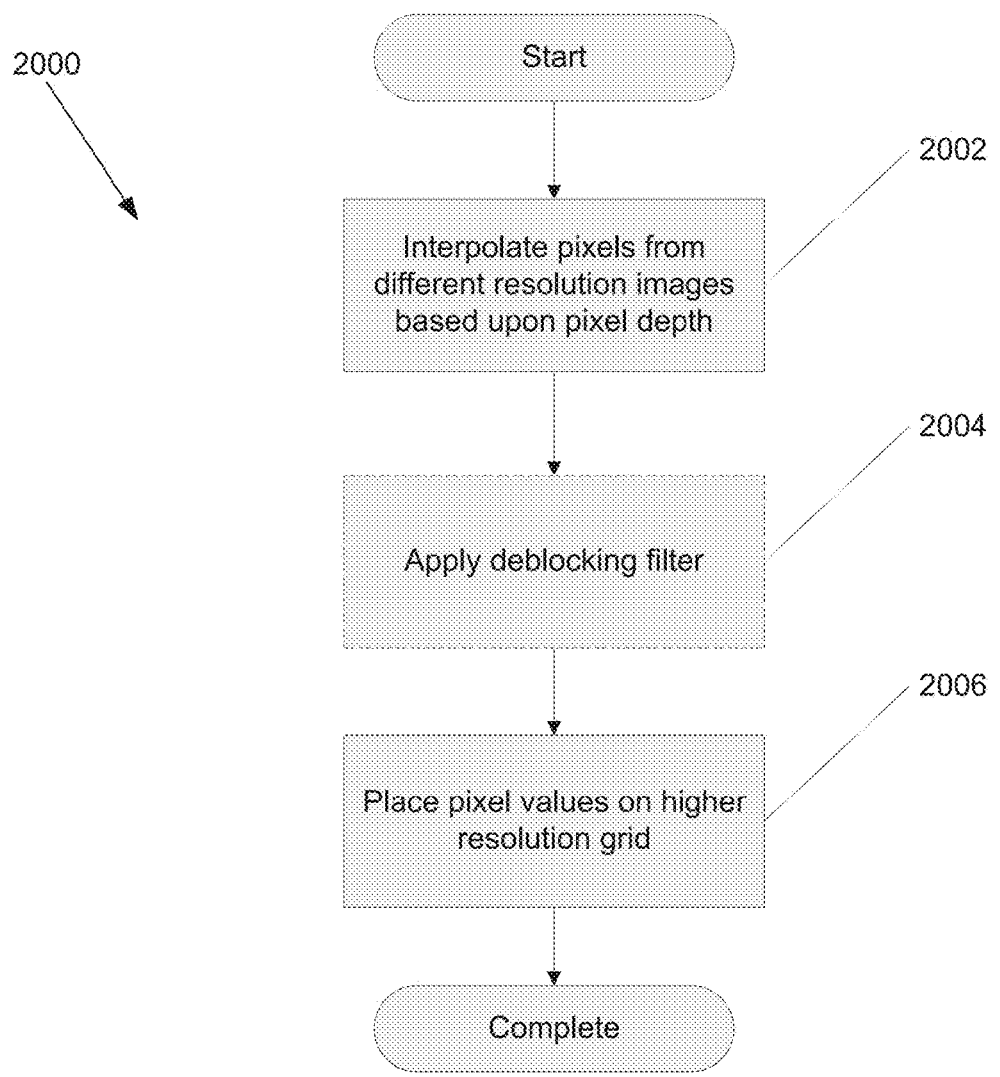
FIG. 20 is a flow chart illustrating a process for rendering pixels having an associated depth that is outside the selected depth of field in accordance with an embodiment of the invention.

A process for rendering a pixel in an out-of-focus region of a synthesized image in accordance with an embodiment of the invention is illustrated in FIG. 20. The process 2000 includes selecting pixels for rendering and interpolating (2002) the selected pixels with corresponding pixels in one or more down-sampled images based upon the depth of the pixel to obtain updated pixel values. A deblocking filter can be applied (2004) to the updated pixel values to reduce blockiness resulting from the interpolation and the updated pixel values are placed (2006) in appropriate pixel locations in the synthesized high resolution image using scene dependent geometric corrections determined based upon the depths of the updated pixels.

The above process can be considered in the context of pairs of pyramid levels, where the first step is to divide the entire range of sampled depths into discrete levels of blur, based on the range of the in-focus depths. In keeping with the intention to have gradually increasing blur for pixels with increasing distance from the in-focus depth range, the in-focus region is associated with the highest resolution of the image data pyramid. The in-focus depth range divides the entire range of depths sampled into a foreground and background region. In each region, level of detail mappings are constructed to associate depth planes with particular blur levels. The number of such mappings is dependent on the number of pyramid levels selected and the amount of blur in out-of-focus regions desired based on the desired synthetic aperture as well as the method used to blur the original pyramid. Typically the step size between depth planes mapping to adjacent blur levels is constant in disparity space (but not in actual distance space). Blurry pixels in out-of-focus regions can then be synthesized using one or more pixels from adjacent image data pyramids, where the image data pyramids are selected based on the depth of the pixel to be synthesized and the blur level mapping. In one particular embodiment, the blending function used can be trilinear interpolation.

Each lower resolution pixel can correspond to a number of (say n×n) pixels in the next finer resolution image, where n is a function of the decimation factor used to generate the image data pyramids. As a result, the newly updated image pixels can have some blockiness. To smoothen out such artifacts, a deblocking filtering process such as (but not limited to) Gaussian filtering can be performed on pixels that are updated in the compositing stage. In a particular embodiment, this process can be performed between the two coarsest pairs of pyramid levels using the corresponding levels from the depth map pyramid based on the level of detail mappings. This can then be repeated for each consecutive pair of pyramid levels, leading to the highest resolution mimicking the target reduced depth of field image at camera resolution. In another embodiment, only one (typically the finest resolution) depth map is used to select the pair of pyramid levels to blend and synthesize each input camera resolution pixel based on its depth and level of detail mapping.

In a particular embodiment where each camera of the camera array samples only a filtered version (typically red, green or blue color filters are used although in other embodiments array cameras sample other color spaces including but not limited to color spaces that image outside of the visible light spectrum) of the input light, and the reference camera does not contain enough information to synthesize the full color image, "virtual" reference images can be formed prior to the compositing process outlined above. To generate the full color image data pyramid needed for compositing, one or more image pyramids from non-reference cameras, encompassing the different color components captured by the image array but not sampled by the reference camera can be generated. Using the depth maps for different pyramid levels, these non-reference images are geometrically warped to synthesize each missing color component pyramid levels from the viewpoint of a reference camera. Alternatively, this process can be used to generate a high resolution virtual reference images that can be generated and the virtual reference images blurred and downsampled from each of the virtual reference pyramid levels. In a particular embodiment, this warping mechanism is the same as used in raw fusion (described in U.S. patent application Ser. No. 12/967,807), but with a scaling factor of 1 for each pyramid level. Compositing is then performed for these "virtual" color components, typically in the same way as that of the reference image data pyramid, to form the full color reduced depth of field synthetic image.

Although various processes for rendering pixels from out-of-focus regions of a reference image are described above, any of a variety of processes for compositing pixels from out-of-focus regions of a reference image can be utilized as appropriate to the requirements of a specific application in accordance with embodiments of the invention. Systems and methods for using super-resolution processes to synthesize pixels within in-focus regions within a synthesized image in accordance with embodiments of the invention are discussed further below.

Figure 21:
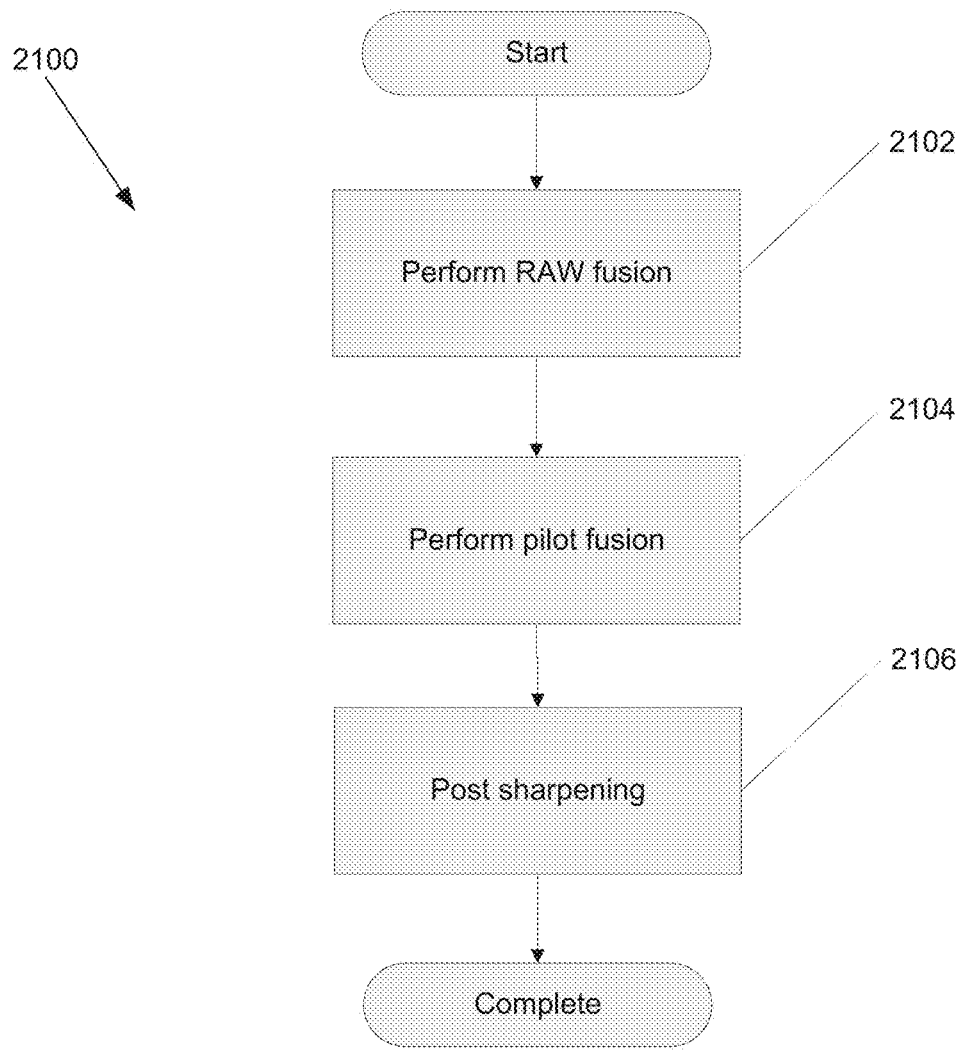
FIG. 21 is a flow chart illustrating a process for rendering pixels having an associated depth that is within the selected depth of field in accordance with an embodiment of the invention.

Super-Resolution Processing of Pixels within Depth of Field

Where a restricted depth of field depth map indicates that a pixel in a reference image is located within a selected in-focus depth of field, super-resolution processing can be utilized to place the pixel from the reference image on a high resolution grid for the synthesized image and to place pixels from image data captured from alternate viewpoints onto the high resolution grid to increase the overall resolution of in-focus regions of the synthesized image. A process for performing super-resolution processing in accordance with an embodiment of the invention is illustrated in FIG. 21. The process 2100 includes performing (2102) fusion of the raw camera data (henceforth called raw fusion) to place unoccluded pixels from the image data captured by the array camera onto the target high resolution grid based upon the scene dependent geometric corrections determined using the restricted depth of field depth map and/or any occlusion maps determined during the creation of the restricted depth of field depth map. The raw fusion creates a high resolution grid in which holes are likely to exist in various pixel locations. An additional pilot fusion process is then performed (2104), which fills the holes on the high resolution grid. A post sharpening process can also be applied that includes processes to enhance the synthesized image including (but not limited to) smoothing images along edges and sharpening the image perpendicular to edges. In a number of embodiments, the output of the pilot fusion process is utilized as an input to a super-resolution process that iteratively estimates higher resolution image data based upon information including (but not limited to) the image data captured by the array camera and/or an imaging prior. Systems and methods for performing iterative super-resolution processes in accordance with an embodiment of the invention are also described in U.S. patent application Ser. No. 12/967,807, incorporated by reference above.

Various processes for performing raw fusion and pilot fusion are described in U.S. patent application Ser. No. 12/967,807, incorporated by reference above. In other embodiments, any of a variety of processes for fusing pixel intensity from image data captured from various viewpoints onto a high resolution grid and/or for performing super-resolution processing can be utilized in accordance with embodiments of the invention. Furthermore, any of a variety of filtering techniques appropriate to the requirements of specific applications can be applied to the composited pixel information on the high resolution grid to achieve desired image sharpness within the in-focus region of the synthesized image and smooth transitions in blur of out-of-focus regions.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed:

1. An image processing system, comprising:
a processor;
memory containing a set of images captured from different viewpoints and an image processing pipeline application;
wherein the image processing pipeline application configures the processor to:
 determine a range of distances corresponding to a restricted depth of field;
 generate a restricted depth of field depth map from the reference viewpoint using the set of images captured from different viewpoints, where the restricted depth of field depth map is generated by performing a disparity search that is performed using a greater density of depth samples within the range of distances corresponding to the restricted depth of field and a lower density of depth samples for distances outside the range of distances corresponding to the restricted depth of field; and
 render a restricted depth of field image from the reference viewpoint using the set of images captured from different viewpoints and the restricted depth of field depth map.

2. The image processing system of claim 1, wherein the image processing pipeline application further configures the processor to render objects in the field image that are located away from the restricted depth of field to be blurred in an amount proportional to their distance from the plane of best focus.

3. The image processing system of claim 1, wherein the image processing pipeline application further configures the processor to automatically determine the range of distances corresponding to a restricted depth of field.

4. The image processing system of claim 3, wherein the image processing pipeline application further configures the processor to automatically determine the range of distances corresponding to the restricted depth of field by determining a distance to a surface of a scene object using the set of images captured from different viewpoints.

5. The image processing system of claim 4, wherein the image processing pipeline application further configures the processor to determine a distance to a surface of a scene object using the set of images captured from different viewpoints by:
 generating an initial depth map and a confidence map from at least a portion of the set of images captured from different viewpoints, where the confidence map indicates the reliability of pixel depth estimates in the initial depth map; and
 determining the depth of the surface of the scene object based upon at least one pixel depth estimate within the initial depth map marked as confident within the confidence map.

6. The image processing system of claim 4, wherein the image processing pipeline application further configures the processor to receive a user instruction identifying a surface of a scene object by:
 generating a preview image from the set of images captured from different viewpoints, where the preview image includes a user interface cue; and
 identifying a surface of a scene object visible within the set of images captured from different viewpoints based upon the location of the user interface cue.

7. The image processing system of claim 4, wherein the image processing pipeline application further configures the processor to determine the range of distances corresponding to the restricted depth of field based upon user instructions.

8. The image processing system of claim 1, wherein the image processing pipeline application further configures the processor to generate a restricted depth of field depth map by:
- generating an initial depth map using the set of images captured from different viewpoints;
- determining pixel locations with depth estimates from the initial depth map indicating that the pixel locations are likely to have depths within the range of distances corresponding to the restricted depth of field;
- generating higher depth estimation precision depth estimates for at least some of the pixel locations that are likely to have depths within the range of distances corresponding to the restricted depth of field using the set of images captured from different viewpoints; and
- generating a restricted depth of field depth map using at least some of the depth estimates from the initial depth map and at least some of the higher depth estimation precision depth estimates.

9. The image processing system of claim 8, wherein the image processing pipeline application further configures the processor to generate an initial depth map by:
- downsampling at least some of the images in the set of images captured from different viewpoints to obtain a set of lower spatial resolution images; and
- determining a low spatial resolution depth map using the set of lower spatial resolution images.

10. The image processing system of claim 9, wherein the image processing pipeline application further configures the processor to determine a low spatial resolution depth map using the set of lower spatial resolution images by:
- performing a disparity search with respect to a given pixel location using the set of lower spatial resolution images;
- wherein the disparity search is performed by searching a first set of disparities.

11. The image processing system of claim 10, wherein the image processing pipeline application further configures the processor to generate the higher precision depth estimates by:
- performing a disparity search with respect to a given pixel location using the set of images captured from different viewpoints;
- wherein the disparity search is performed by searching a second set of disparities that provides a greater density of depth samples than the first set of disparities; and
- wherein a search performed using the second set of disparities provides greater depth estimation precision within the range of distances corresponding to the restricted depth of field than the precision of a depth estimate obtained within the same range of distances by a search performed using the first set of disparities.

12. The image processing system of claim 11, wherein the first set of disparities is not uniformly distributed with respect to disparity.

13. The image processing system of claim 11, wherein the first set of disparities is uniformly distributed with respect to disparity.

14. The image processing system of claim 11, wherein the second set of disparities is not uniformly distributed with respect to disparity.

15. The image processing system of claim 11, wherein the second set of disparities is uniformly distributed with respect to disparity.

16. The image processing system of claim 8, wherein the image processing pipeline application further configures the processor to:
- generate an initial confidence map for the initial depth map; and
- determine pixel locations with depth estimates from the initial depth map indicating that the pixel locations are likely to have depths within the range of distances corresponding to the restricted depth of field based upon the depth estimate for the pixel location in the initial depth map and the confidence of the depth estimate for the pixel location indicated by the initial confidence map.

17. The image processing system of claim 8, wherein the image processing pipeline application further configures the processor to determine pixel locations with depth estimates from the initial depth map indicating that the pixel locations are likely to have depths within the range of distances corresponding to the restricted depth of field based upon the depth estimate for the pixel location and a determination that the pixel is not contained within a textureless region.

18. An image processing system, comprising:
- a processor;
- memory containing a set of images captured from different viewpoints and an image processing pipeline application;
- wherein the image processing pipeline application configures the processor to:
  - automatically determine a range of distances corresponding to a restricted depth of field by determining a distance to a surface of a scene object using the set of images captured from different viewpoints;
  - generate a restricted depth of field depth map from the reference viewpoint using the set of images captured from different viewpoints, where the restricted depth of field depth map is generated by performing a disparity search that is performed using a greater density of depth samples within the range of distances corresponding to the restricted depth of field and a lower density of depth samples for distances outside the range of distances corresponding to the restricted depth of field; and
  - render a restricted depth of field image from the reference viewpoint using the set of images captured from different viewpoints and the restricted depth of field depth map.

19. The image processing system of claim 18, wherein the image processing pipeline application further configures the processor to render objects in the field image that are located away from the restricted depth of field to be blurred in an amount proportional to their distance from the plane of best focus.

20. The image processing system of claim 18, wherein the image processing pipeline application further configures the processor to determine a distance to a surface of a scene object using the set of images captured from different viewpoints by:
- generating an initial depth map and a confidence map from at least a portion of the set of images captured from different viewpoints, where the confidence map indicates the reliability of pixel depth estimates in the initial depth map; and
- determining the depth of the surface of the scene object based upon at least one pixel depth estimate within the initial depth map marked as confident within the confidence map.

* * * * *